US012794793B2

(12) United States Patent
Yamada et al.

(10) Patent No.: US 12,794,793 B2
(45) Date of Patent: Nov. 10, 2026

(54) INFORMATION PROCESSING APPARATUS, INFORMATION PROCESSING METHOD, INFORMATION PROCESSING PROGRAM, AND INFORMATION PROCESSING SYSTEM

(71) Applicant: Sony Semiconductor Solutions Corporation, Atsugi (JP)

(72) Inventors: Kazuki Yamada, Kanagawa (JP); Ying Yang, Kanagawa (JP); Hareesh Gowtham Jagadeesh, Kanagawa (JP); Minoru Ishida, Kanagawa (JP); Hiroyuki Okumura, Kanagawa (JP); Kazuyuki Okuike, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 54 days.

(21) Appl. No.: 18/843,318

(22) PCT Filed: Mar. 13, 2023

(86) PCT No.: PCT/JP2023/009541
§ 371 (c)(1),
(2) Date: Sep. 3, 2024

(87) PCT Pub. No.: WO2023/176754
PCT Pub. Date: Sep. 21, 2023

(65) Prior Publication Data

US 2025/0202786 A1 Jun. 19, 2025

(30) Foreign Application Priority Data

Mar. 14, 2022 (JP) ................................ 2022-039541

(51) Int. Cl.
*H04L 43/08* (2022.01)
*H04L 41/082* (2022.01)
*H04L 41/16* (2022.01)

(52) U.S. Cl.
CPC ............ *H04L 43/08* (2013.01); *H04L 41/082* (2013.01); *H04L 41/16* (2013.01)

(58) Field of Classification Search
None
See application file for complete search history.

(56) References Cited

U.S. PATENT DOCUMENTS

2002/0023117 A1* 2/2002 Bernardin ............... G06F 9/465 718/104
2010/0122328 A1* 5/2010 Betzler ................. H04L 63/168 726/5

(Continued)

FOREIGN PATENT DOCUMENTS

JP 2020-047191 A 3/2020
JP 2021-196893 A 12/2021

OTHER PUBLICATIONS

International Search Report and Written Opinion mailed on May 23, 2023, received for PCT Application PCT/JP2023/009541, filed on Mar. 13, 2023, 8 pages including English Translation.

*Primary Examiner* — Raqiul A Choudhury
(74) *Attorney, Agent, or Firm* — XSENSUS LLP

(57) ABSTRACT

An information processing apparatus according to an embodiment includes: a controller that selects, from a plurality of networks, one or more first networks executed on a one-to-one basis by one or more first processors different from each other and selects, from the plurality of networks, a second network executed by a second processor; and a transmission unit that transmits each of the one or more first networks to each of the one or more first processors on a one-to-one basis and transmits the second network to the (Continued)

second processor. The second processor executes the second network by using, as an input, output data that is output as a result of executing a network selected from the one or more first networks for at least one processor among the one or more first processors. The controller selects the second network from the plurality of networks according to the output data.

24 Claims, 55 Drawing Sheets

(56) References Cited

U.S. PATENT DOCUMENTS

| | | | | |
|---|---|---|---|---|
| 2012/0072340 | A1* | 3/2012 | Amron | H04W 76/14<br>709/227 |
| 2013/0081132 | A1* | 3/2013 | Lee | H04L 63/0272<br>726/15 |
| 2013/0318528 | A1* | 11/2013 | Hirose | G06F 9/455<br>718/1 |
| 2014/0244846 | A1* | 8/2014 | Takehara | G06F 9/5083<br>709/226 |
| 2016/0216987 | A1* | 7/2016 | Burrell | G06F 9/45558 |
| 2018/0285168 | A1* | 10/2018 | Kono | G06F 11/3082 |
| 2018/0285169 | A1* | 10/2018 | Noguchi | G06F 11/1438 |
| 2019/0050714 | A1 | 2/2019 | Nosko et al. | |
| 2021/0232921 | A1 | 7/2021 | Parashar | |
| 2023/0269231 | A1* | 8/2023 | Mineikis | H04L 63/0272<br>726/15 |

* cited by examiner

FIG.13
(a)
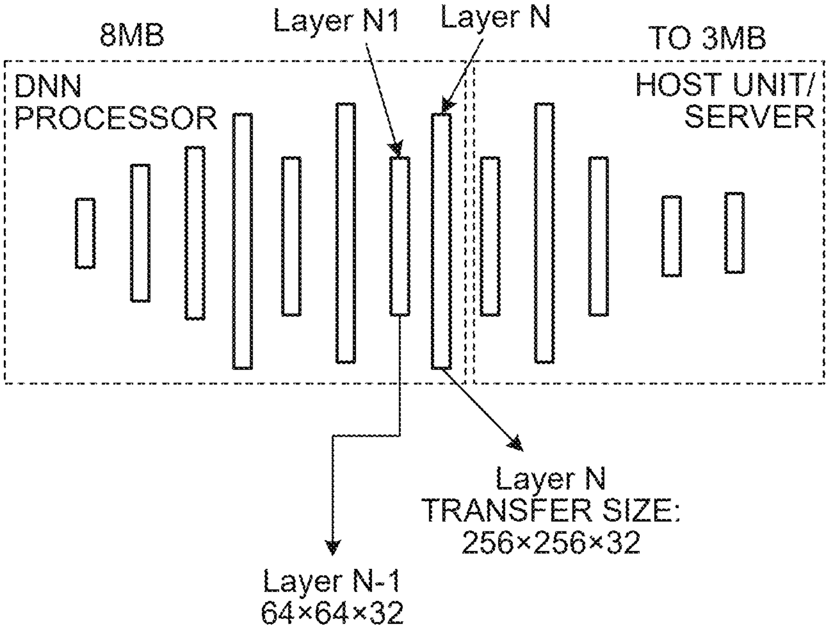
(b)
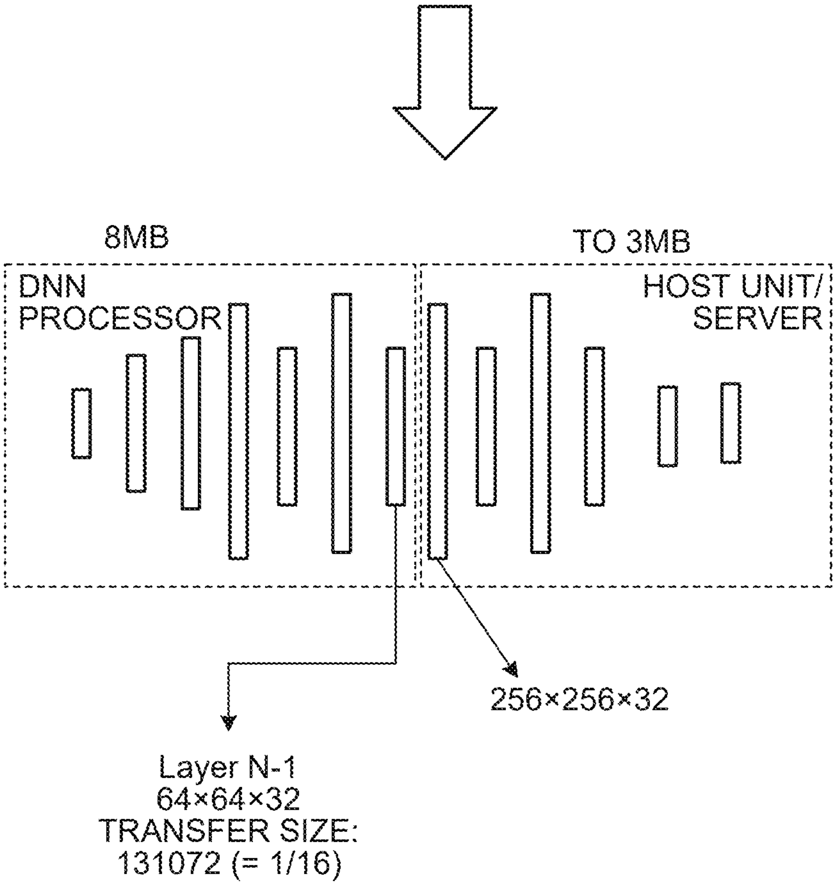

FIG.14

DNN Inference Energy (per frame): xxx nJ
DNN Inference Cycles (per frame):
DNN Variables Memory Size : kB
DNN Runtime Memory: kB
Total DNN Memory Size: kB
Layer Wise Memory, Cycle, Energy:
<layer1 type="Conv2D" memory="20000" cycles="132346" energy="56">
<layer2 type="ReLu" memory="100000" cycles="23879" energy="100">
<layer3 type="" memory="" cycles="" energy="">
<layer4 type="" memory="" cycles="" energy="">
<layer5 type="" memory="" cycles="" energy="">
<layer6 type="" memory="" cycles="" energy="">
⋮
<layerN type="" memory="" cycles="" energy="">

INFORMATION PROCESSING APPARATUS, INFORMATION PROCESSING METHOD, INFORMATION PROCESSING PROGRAM, AND INFORMATION PROCESSING SYSTEM

CROSS-REFERENCE TO RELATED APPLICATIONS

The present application is based on PCT filing PCT/JP2023/009541, filed Mar. 13, 2023, which claims priority from Japanese Patent Application No. 2022-039541, filed Mar. 14, 2022, the entire contents of each are incorporated herein by reference.

FIELD

The present disclosure relates to an information processing apparatus, an information processing method, an information processing program, and an information processing system.

BACKGROUND

Devices incorporating a deep neural network (DNN) function are known. In general, a DNN process involves a large calculation cost, and furthermore, a model size tends to be larger as a model becomes capable of executing a complicated and advanced DNN process. Therefore, a technique of dividing the DNN function, executing processing of some of divided DNN functions by the device, and executing processing of other DNN functions in an external server or the like has been proposed.

CITATION LIST

Patent Literature

Patent Literature 1: JP 2020-47191 A

SUMMARY

Technical Problem

When a DNN function is divided, it is necessary to perform appropriate division according to the function and processing amount.

An object of the present disclosure is to provide an information processing apparatus, an information processing method, an information processing program, and an information processing system capable of appropriately dividing a network function.

Solution to Problem

For solving the problem described above, an information processing apparatus according to one aspect of the present disclosure has a controller configured to select, from a plurality of networks, one or more first networks executed on a one-to-one basis by one or more first processors different from each other, and select, from the plurality of networks, a second network executed by a second processor; and a transmission unit configured to transmit the one or more first networks to the one or more first processors on a one-to-one basis, and transmit the second network to the second processor, wherein the second processor executes the second network using output data as an input, the output data being output as a result of executing a network selected from the one or more first networks for at least one processor among the one or more first processors, and the controller selects, from the plurality of networks, the second network according to the output data.

BRIEF DESCRIPTION OF DRAWINGS

FIG. 13 is a schematic diagram illustrating an example of a key performance indicator presented to a user.

FIG. 14 is a schematic diagram illustrating an example of a key performance indicator presented to a user.

DESCRIPTION OF EMBODIMENTS

Hereinafter, embodiments of the present disclosure will be described in detail with reference to the drawings. Note that, in the following embodiments, same parts are denoted by same reference signs to omit redundant description.

Hereinafter, the embodiments of the present disclosure will be described in the following order.

1. First Embodiment
1-1. Basic configuration according to first embodiment
1-2. Details of configuration according to first embodiment
1-3. System configuration according to first embodiment
2. Second Embodiment
2-1. Existing technology
2-2. Configuration and processing according to second embodiment
2-3. Effects according to second embodiment
3. Third Embodiment
3-1. Existing technology
3-2. Schematic configuration according to third embodiment
3-3. Examples of third embodiment
3-3-1. First example of third embodiment
3-3-2. Second example of third embodiment
3-3-3. Third example of third embodiment
3-3-4. Fourth example of third embodiment
3-3-5. Fifth example of third embodiment
4. Fourth Embodiment
5. Fifth Embodiment

1. First Embodiment

A first embodiment of the present disclosure will be described. In an information processing system according to the first embodiment of the present disclosure, a controller determines a first network, executed by a first processor, that performs processing on input data received and a second network, executed by a second processor, that performs processing on an output of the first network.

Note that, in the present disclosure, a neural network such as a deep neural network (DNN) is applicable to the network.

1-1. Basic Configuration According to First Embodiment

Figure 1:
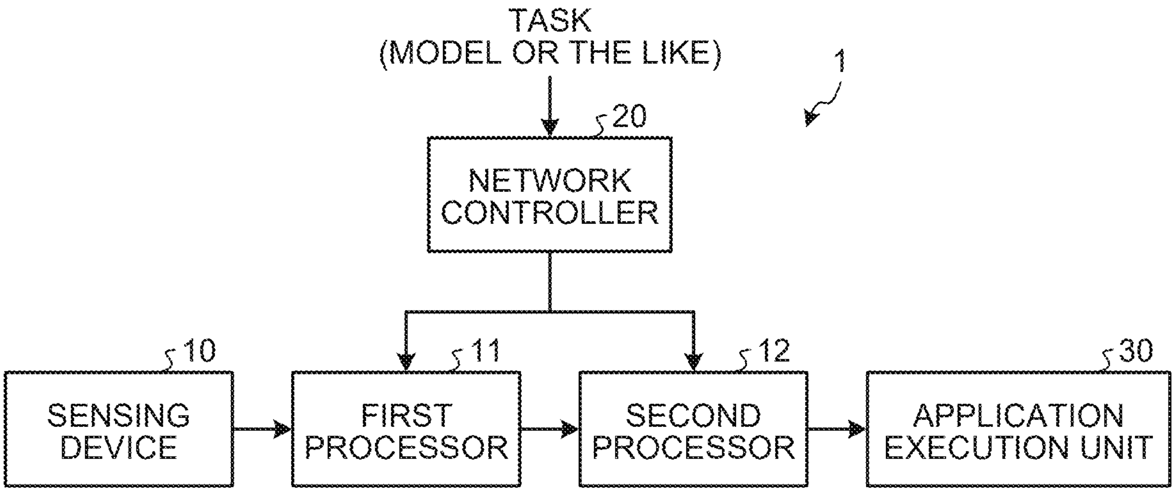
FIG. 1 is a block diagram of an example illustrating a schematic configuration of an information processing system according to a first embodiment.

First, a basic configuration according to the first embodiment will be described. FIG. 1 is a block diagram of an example illustrating a schematic configuration of the information processing system according to the first embodiment.

In FIG. 1, an information processing system 1 according to the first embodiment includes a first processor 11, a second processor 12, and a network controller 20.

The network controller 20 is configured in a server on a communication network such as the Internet, for example, and capable of communicating with the first processor 11 and the second processor 12 via the communication network. A specific example of an arrangement of the network controller 20, a sensing device 10, the first processor 11, the second processor 12, and an application execution unit 30 will be described later.

A task is input to the network controller 20. Here, the task refers to processing executed using the neural network (DNN or the like). The task is input to the network controller 20, for example, as a model in the neural network used for the task. The network controller 20 analyzes the task input and divides the task into at least two tasks. For example, when the task is divided into two tasks that are a first task and a second task, the network controller 20 assigns the first task to the first processor 11 and the second task to the second processor 12.

In other words, it can be said that the network controller 20 divides the neural network used by the task into the first neural network used by the first task and the second neural network used by the second task, and assigns the first neural network to the first processor 11 and the second neural network to the second processor 12.

For example, an output of the sensing device 10 is input to the first processor 11 as input data. When the sensing device 10 is an imaging device, the output of the sensing device 10 is a captured image (image signal) obtained by imaging using the imaging device. The input data to the first processor 11 is data to be processed by the task input to the network controller 20, and is not limited to the output of the sensing device 10. The first processor 11 executes the first task on the input data and outputs a processing result. The second processor 12 executes the second task on an output of the first processor and outputs a processing result as output data.

The output data output from the second processor 12 is supplied to the application execution unit 30. The application execution unit 30 may include, for example, an application program installed in an information processing apparatus such as a general computer.

Note that, in FIG. 1, the information processing system 1 divides one task into two and allocates the first processor 11 and the second processor 12 to respective divided tasks, but this not limited thereto. For example, the information processing system 1 may divide one task into three or more tasks. In this case, a different processor may be assigned to each of the three or more divided tasks. When one task is divided into three or more tasks, the information processing system 1 may determine at least one of the three or more divided tasks as a task to receive the input data. In addition, the information processing system 1 may determine, among the three or more divided tasks, a task different from the task receiving the input data as a task to output the output data according to the input data.

Figure 2:
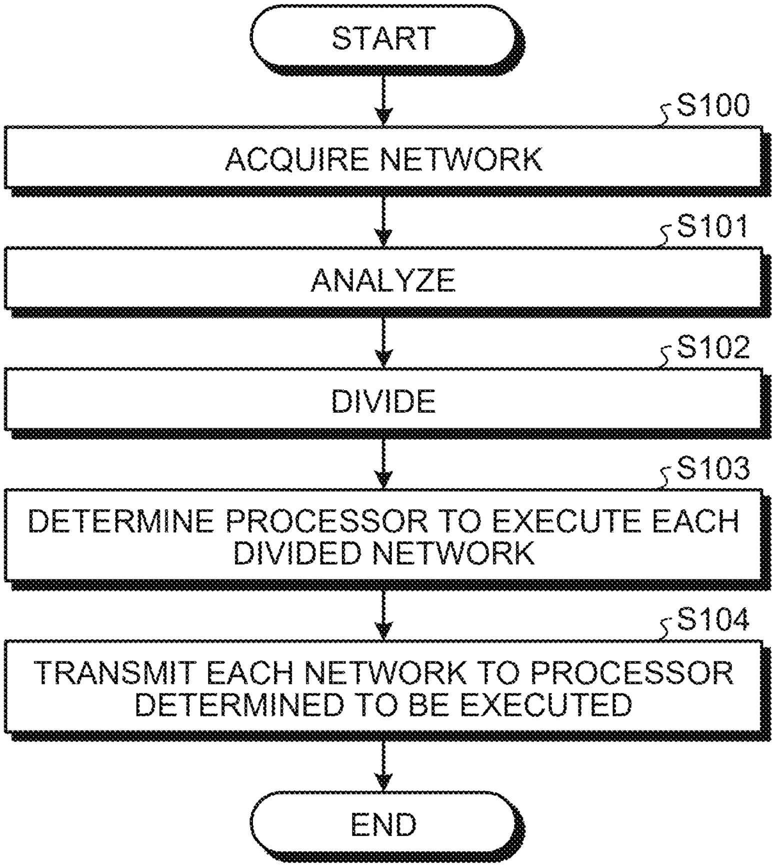
FIG. 2 is a flowchart of an example schematically illustrating processing by a network controller in the information processing system according to the first embodiment.

FIG. 2 is a flowchart of an example schematically illustrating processing by the network controller 20 in the information processing system 1 according to the first embodiment. In the following description, it is assumed that, as a task, a neural network is input to the network controller 20. In addition, hereinafter, the neural network is simply referred to as a "network" unless otherwise specified, and a DNN is applied as an example of the neural network.

In FIG. 2, in Step S100, the network controller 20 acquires the network. In next Step S101, the network controller 20 analyzes the network acquired in Step S100. In next Step S102, the network controller 20 divides the network acquired in Step S100 based on an analysis result in Step S101.

In Steps S101 and S102, the network controller 20 may analyze and divide the network based on a function of the network, a hardware element related to hardware that executes the network, an application element related to an application that uses an output of the network, and the like.

Hereinafter, unless otherwise specified, the description will be given on an assumption that the network controller 20 divides the network into a first network that performs processing in a preceding stage in the network and a second network that performs processing on an output of the first network.

In next Step S103, the network controller 20 determines a processor that executes each network divided in Step S102.

For example, the network controller 20 determines the first processor 11 as a processor that executes processing by the first network, and determines the second processor 12 as a processor that executes processing by the second network.

In next Step S104, the network controller 20 transmits each divided network to each processor determined to be executed. Specifically, the network controller 20 transmits the first network to the first processor 11 and transmits the second network to the second processor 12.

The first processor 11 uses the output of the sensing device 10 as input data and executes processing by the first network on the input data. The second processor 12 executes processing by the second network on an output of the first processor 11. An output of the second processor 12 is supplied to the application execution unit 30.

As described above, in the first embodiment, the network controller 20 determines the first network to be executed by the first processor and the second network to be executed by the second processor that performs processing on the output of the first processor 11. Therefore, by applying the first embodiment, the network can be appropriately divided and allocated to the first processor 11 and the second processor 12.

1-2. Details of Configuration According to First Embodiment

Figure 3:
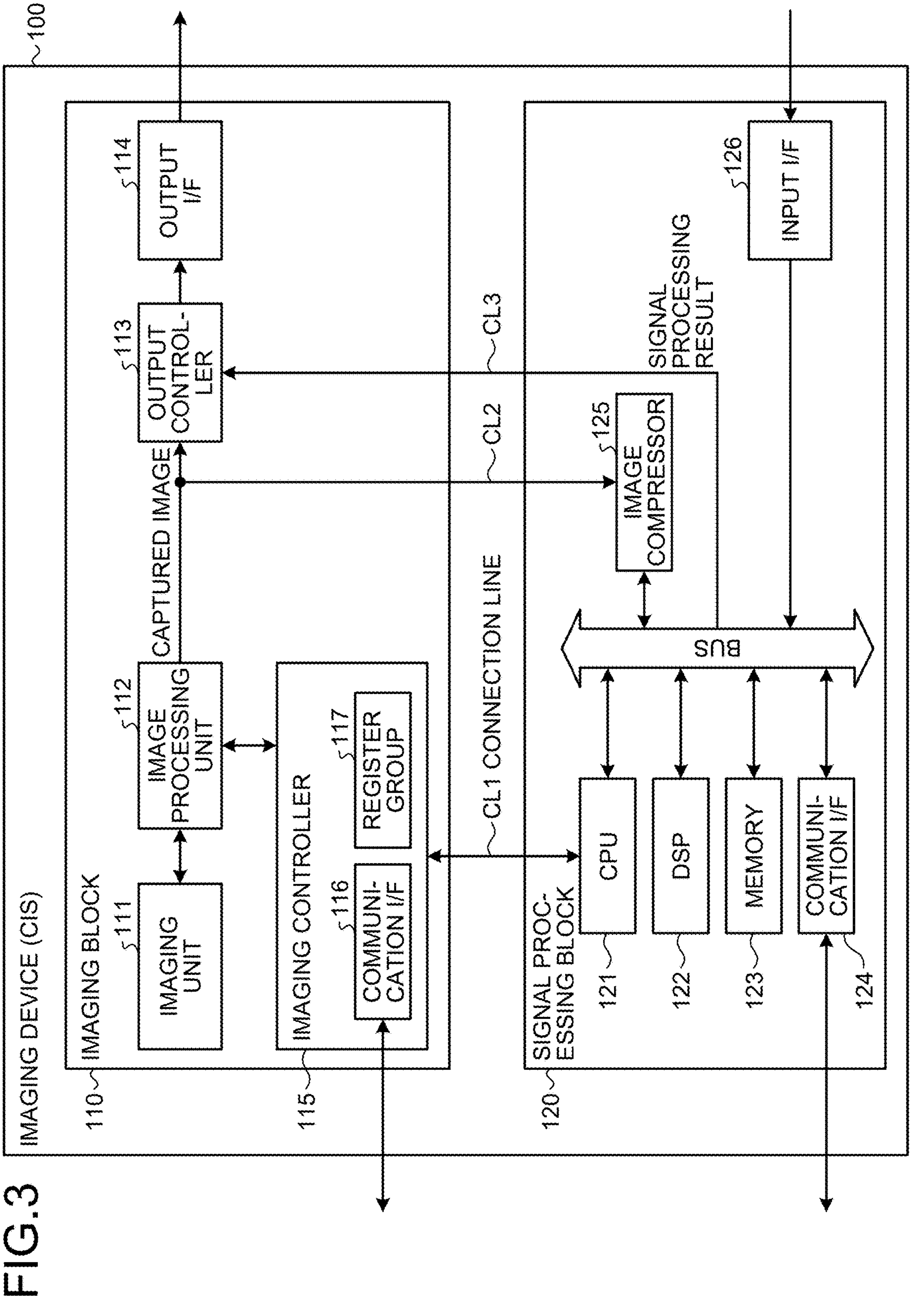
FIG. 3 is a block diagram illustrating a configuration of an example of an imaging device as a sensing device applicable to the first embodiment.

Next, the configuration according to the first embodiment will be described in more detail. FIG. 3 is a block diagram illustrating a configuration of an example of an imaging device including the sensing device 10 applicable to the first embodiment. In the example in FIG. 3, an imaging device 100 includes the sensing device 10 and the first processor 11 in the information processing system 1 described with reference to FIG. 1.

In FIG. 3, the imaging device 100 is configured as a complementary metal oxide semiconductor (CMOS) image sensor (CIS), and includes an imaging block 110 and a signal processing block 120.

The imaging block 110 and the signal processing block 120 are electrically connected by connection lines CL1 and CL2 and CL3 that are internal buses, respectively. As will be described later, the imaging block 110 may correspond to the sensing device 10 in FIG. 1. In addition, the signal processing block 120 may include the first processor 11 in FIG. 1.

The imaging block 110 includes an imaging unit 111, an imaging processing unit 112, an output controller 113, an output interface (I/F) 114, and an imaging controller 115, and images a subject to obtain a captured image.

The imaging unit 111 includes a pixel array in which a plurality of pixels is arranged according to a matrix array. Each of the pixels is a light receiving element that outputs a signal corresponding to light received by photoelectric conversion. The imaging unit 111 is driven by the imaging processing unit 112 and images the subject.

In other words, light from an optical system (not illustrated) enters the imaging unit 111. The imaging unit 111 receives incident light from the optical system in each pixel included in the pixel array, performs photoelectric conversion, and outputs an analog image signal corresponding to the incident light.

The size of an image according to the image signal output from the imaging unit 111 can be selected from, for example, a plurality of sizes such as, in width×height, 3968 pixels×2976 pixels, 1920 pixels×1080 pixels, and 640 pixels×480 pixels. The image size that can be output by the imaging unit 111 is not limited to this example. Furthermore, for the image output by the imaging unit 111, for example, it is possible to select whether to set a color image of red, green, and blue (RGB) or a monochrome image of only luminance. These selections for the imaging unit 111 may be performed as a type of shooting mode setting.

Note that information based on the output of each pixel arranged in a matrix in the pixel array is referred to as a frame. In the imaging device 100, the imaging unit 111 repeatedly acquires information on the pixels in the matrix at a predetermined rate (frame rate) in chronological order. The imaging device 100 collectively outputs the information acquired for each frame.

Under the control of the imaging controller 115, the imaging processing unit 112 performs imaging processing related to imaging of the image in the imaging unit 111, such as driving of the imaging unit 111, analog to digital (AD) conversion of an analog image signal output from the imaging unit 111, and imaging signal processing.

Examples of the imaging signal processing performed by the imaging processing unit 112 include processing of obtaining brightness for each of predetermined small regions by calculating an average pixel value for each of the small regions for an image output from the imaging unit 111, high dynamic range (HDR) processing to convert the image output from the imaging unit 111 into an HDR image, defect correction, and development.

As a captured image, the imaging processing unit 112 outputs a digital image signal obtained by AD conversion or the like of the analog image signal output from the imaging unit 111. Furthermore, the imaging processing unit 112 can also output a RAW image, as a captured image, that is not subjected to processing such as development. Note that an image in which each pixel has information on each color of RGB obtained by processing such as development on the RAW image is referred to as an RGB image.

The captured image output by the imaging processing unit 112 is supplied to the output controller 113 and also supplied to an image compressor 125 of the signal processing block 120 via the connection line CL2. In addition to the captured image supplied from the imaging processing unit 112, a signal processing result of signal processing using the captured image and the like is supplied from the signal processing block 120 to the output controller 113 via the connection line CL3.

The output controller 113 performs output control of selectively outputting the captured image from the imaging processing unit 112 and the signal processing result from the signal processing block 120 from (one) output I/F 114 to the outside (e.g., memory connected to the outside of the imaging device 100). In other words, the output controller 113 selects the captured image from the imaging processing unit 112 or the signal processing result from the signal processing block 120, and supplies the image or the result to the output I/F 114.

The output I/F 114 is an I/F that outputs the captured image and the signal processing result supplied from the output controller 113 to the outside. For example, a relatively high-speed parallel I/F such as a mobile industry processor interface (MIPI) can be adopted as the output I/F 114.

In the output I/F 114, the captured image from the imaging processing unit 112 or the signal processing result from the signal processing block 120 is output to the outside according to the output control of the output controller 113. Therefore, for example, when only the signal processing result from the signal processing block 120 is necessary outside and the captured image itself is not necessary, only the signal processing result can be output. As a result, an amount of data output from the output I/F 114 to the outside can be reduced.

Furthermore, in the signal processing block 120, signal processing for obtaining a signal processing result required outside is performed, and the signal processing result is output from the output I/F 114, so that it is not necessary to perform signal processing outside. As a result, a load on an external block can be reduced.

The imaging controller 115 includes a communication I/F 116 and a register group 117.

The communication I/F 116 is, for example, a first communication I/F such as a serial communication I/F such as an inter-integrated circuit (I2C), and exchanges necessary information, such as information read from and written to a group of registers 117, with the outside (e.g., controller that controls a device equipped with the imaging device 100).

The register group 117 includes a plurality of registers and stores imaging information related to imaging of an image by the imaging unit 111 and various other types of information. For example, the register group 117 stores the imaging information received from the outside in the communication I/F 116 and an imaging signal processing result (e.g., brightness for each small area of the captured image) of the imaging processing unit 112.

Examples of the imaging information stored in the register group 117 include ISO sensitivity (analog gain at the time of AD conversion in the imaging processing unit 112), exposure time (shutter speed), frame rate, focus, shooting mode, and clipping range (information).

The shooting mode includes, for example, a manual mode in which an exposure time, a frame rate, and the like are manually set, and an automatic mode in which the exposure time, the frame rate, and the like are automatically set according to a scene. Examples of the automatic mode include modes corresponding to various shooting scenes such as a night scene and a person's face.

Furthermore, the clipping range represents a range clipped from an image output by the imaging unit 111 when a part of the image output by the imaging unit 111 is clipped and output as a captured image in the imaging processing unit 112. By specifying the clipping range, for example, only a range in which a person is captured can be clipped from the image output by the imaging unit 111. Note that, as image clipping, there is a method of clipping only an image (signal) in the clipping range from the imaging unit 111 in addition to a method of clipping from the image output by the imaging unit 111.

The imaging controller 115 controls the imaging processing unit 112 according to the imaging information stored in the register group 117, thereby controlling imaging of an image by the imaging unit 111.

Note that the register group 117 may store output control information regarding output control by the output controller 113 in addition to the imaging information and the imaging signal processing result in the imaging processing unit 112. The output controller 113 can perform the output control of selectively outputting the captured image and the signal processing result according to the output control information stored in the register group 117.

Furthermore, in the imaging device 100, the imaging controller 115 and a CPU 121 of the signal processing block 120 are connected via the connection line CL1, and the CPU 121 can read and write information from and to the register group 117 via the connection line CL1. In other words, in the imaging device 100, reading and writing of information from and to the register group 117 can be performed not only from the communication I/F 116 but also from the CPU 121.

The signal processing block 120 includes the central processing unit (CPU) 121, a digital signal processor (DSP) 122, a memory 123, a communication I/F 124, the image compressor 125, and an input I/F 126, and performs predetermined signal processing using the captured image or the like obtained by the imaging block 110. Note that the CPU 121 is not limited thereto, and may be a micro processor unit (MPU) or a micro controller unit (MCU).

The CPU 121, the DSP 122, the memory 123, the communication I/F 124, and the input I/F 126 configuring the signal processing block 120 are connected to each other via a bus, and can exchange information as necessary.

The CPU 121 executes the program stored in the memory 123 to perform control of the signal processing block 120, reading and writing of information from and to the register group 117 of the imaging controller 115 via the connection line CL1, and other various processes.

For example, by executing the program, the CPU 121 functions as an imaging information calculation unit that calculates imaging information by using a signal processing result obtained by signal processing in the DSP 122, and feeds back new imaging information calculated by using the signal processing result to the register group 117 of the imaging controller 115 via the connection line CL1 to store new imaging information.

Therefore, as a result, the CPU 121 can control imaging by the imaging unit 111 and imaging signal processing by the imaging processing unit 112 according to the signal processing result of the captured image.

In addition, the imaging information stored in the register group 117 by the CPU 121 can be provided (output) to the outside from the communication I/F 116. For example, focus information in the imaging information stored in the register group 117 can be provided from the communication I/F 116 to a focus driver (not illustrated) that controls the focus.

By executing the program stored in the memory 123, the DSP 122 functions as a signal processing unit that performs signal processing using the captured image supplied from the imaging processing unit 112 to the signal processing block 120 via the connection line CL2 and information received by the input I/F 126 from the outside.

The memory 123 includes a static random access memory (SRAM), a dynamic RAM (DRAM), and the like, and stores data and the like necessary for processing in the signal processing block 120.

For example, the memory 123 stores a program received from the outside in the communication I/F 124, the captured image compressed by the image compressor 125 and used in signal processing in the DSP 122, the signal processing result of signal processing performed by the DSP 122, information received by the input I/F 126, and the like.

The communication I/F 124 is, for example, a second communication I/F such as a serial communication I/F such as a serial peripheral interface (SPI), and exchanges necessary information such as a program executed by the CPU 121 or the DSP 122 with the outside (e.g., memory and controller (not illustrated)).

For example, the communication I/F 124 downloads a program executed by the CPU 121 or the DSP 122 from the outside, supplies the program to the memory 123, and stores the program. Therefore, various processes can be executed by the CPU 121 or the DSP 122 by the program downloaded by the communication I/F 124.

Note that, in addition to programs, the communication I/F 124 can exchange arbitrary data with the outside. For example, the communication I/F 124 can output the signal processing result obtained by signal processing in the DSP 122 to the outside. In addition, the communication I/F 124 outputs information according to an instruction of the CPU 121 to an external device, whereby the external device can be controlled according to the instruction of the CPU 121.

The signal processing result obtained by the signal processing in the DSP 122 can be output from the communication I/F 124 to the outside and can be written in the register group 117 of the imaging controller 115 by the CPU 121. The signal processing result written in the register group 117 can be output from the communication I/F 116 to the outside. The same applies to the processing result of the processing performed by the CPU 121.

The captured image is supplied from the imaging processing unit 112 to the image compressor 125 via the connection line CL2. The image compressor 125 performs a compression process of compressing the captured image, and generating a compressed image having a smaller data amount than the captured image. The compressed image generated by the image compressor 125 is supplied to the memory 123 via a bus and stored therein.

Here, the signal processing in the DSP 122 can be performed using not only the captured image itself but also the compressed image generated from the captured image by the image compressor 125. Since the compressed image has the smaller amount of data than the captured image, it is possible to reduce the load of signal processing in the DSP 122 and to save a storage capacity of the memory 123 that stores the compressed image.

As the compression process in the image compressor 125, for example, scale-down for converting a captured image of 3968 pixels×2976 pixels into an image of 640 pixels×480 pixels can be performed. Furthermore, when the signal processing in the DSP 122 is performed on luminance and the captured image is an RGB image, YUV conversion for converting the RGB image into, for example, a YUV image can be performed as the compression process.

Note that the image compressor 125 can be realized by software or can be realized by dedicated hardware.

The input I/F 126 is an I/F that receives external information. The input I/F 126 receives, for example, an output of an external sensor (external sensor output) from the external sensor, and supplies the external sensor output to the memory 123 via a bus. Then, the memory stores the external sensor output. As the input I/F 126, for example, a parallel I/F such as an MIPI can be adopted similarly to the output I/F 114.

Furthermore, as the external sensor, for example, a distance sensor that senses information regarding a distance can be adopted. Furthermore, as the external sensor, for example, an image sensor that senses light and outputs an image corresponding to the light, i.e., an image sensor different from the imaging device 100, can be adopted.

In the DSP 122, in addition to using the captured image or the compressed image generated from the captured image, the input I/F 126 can perform signal processing using the external sensor output received from the external sensor and stored in the memory 123 as described above.

The DSP 122, or the DSP 122 and the CPU 121 may correspond to the first processor 11 in FIG. 1. The present disclosure is not limited thereto, and the CPU 121 may correspond to the first processor 11. For example, the first network transmitted from the network controller 20 is received by the communication I/F 124 or the input I/F 126, and stored in the memory 123. The DSP 122 reads the first network from the memory 123 according to an instruction of the CPU 121, and executes processing by the first network. The processing result by the first network is output to the outside of the imaging device 100 via the output controller 113 and the output I/F 114.

In the imaging device 100 configured as described above, signal processing using the captured image obtained by imaging by the imaging unit 111 or the compressed image generated from the captured image is performed by the DSP 122, and the signal processing result of the signal processing and the captured image are selectively output from the output I/F 114. Therefore, it is possible to downsize the imaging device that outputs the information required by the user.

Here, when the signal processing of the DSP 122 is not performed in the imaging device 100, and thus the signal processing result is not output from the imaging device 100 but the captured image is output, i.e., when the imaging device 100 is configured as an image sensor that merely captures and outputs an image, the imaging device 100 can be configured only with the imaging block 110 not provided with the output controller 113.

Figure 4:
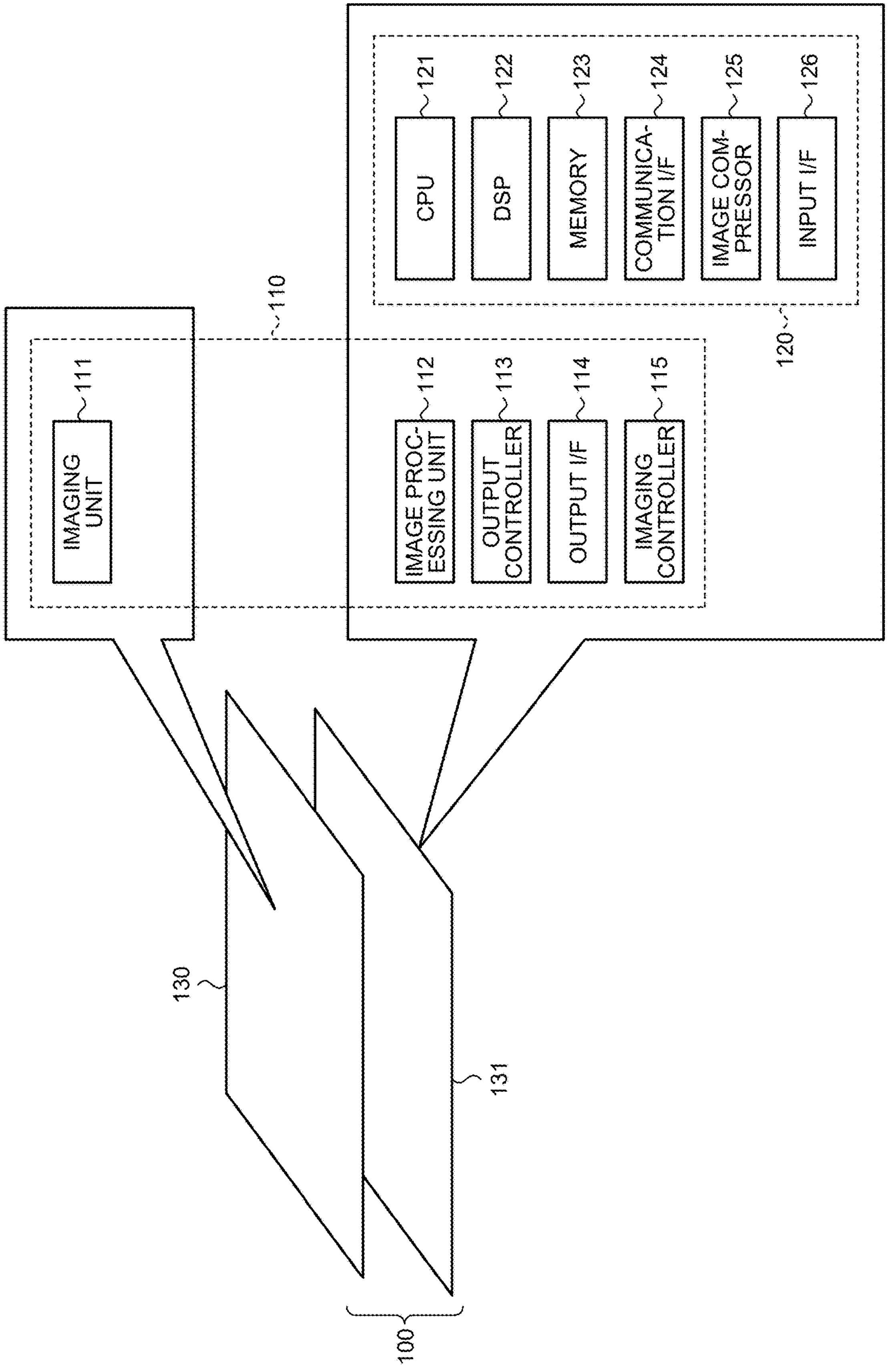
FIG. 4 is a perspective view schematically illustrating a structure of an example of the imaging device according to the first embodiment.

FIG. 4 is a perspective view schematically illustrating a structure of an example of the imaging device 100 according to the first embodiment described with reference to FIG. 3.

For example, as illustrated in FIG. 4, the imaging device 100 can be configured as a one-chip semiconductor device having a stacked structure in which a plurality of dies is stacked. In the example in FIG. 4, the imaging device 100 is configured as a one-chip semiconductor device in which two dies, dies 130 and 131, are stacked.

Note that the die refers to a small thin piece of silicon in which an electronic circuit is built, and a piece in which one or more dies are sealed is referred to as a chip.

In FIG. 4, the imaging unit 111 is mounted on the die 130 on a top side. Furthermore, the imaging processing unit 112, the output controller 113, the output I/F 114, and the imaging controller 115 are mounted on the die 131 on a bottom side. As described above, in the example in FIG. 4, the imaging unit 111 of the imaging block 110 is mounted on the die 130, and parts other than the imaging unit 111 are mounted on the die 131. Furthermore, the signal processing block 120 including the CPU 121, the DSP 122, the memory 123, the communication I/F 124, the image compressor 125, and the input I/F 126 is mounted on the die 131.

The die 130 on the top side and the die 131 on the bottom side are electrically connected, for example, by forming a through hole that penetrates the die 130 and reaches the die 131. The present disclosure is not limited thereto. The dies 130 and 131 may be electrically connected by performing metal-metal wiring such as Cu—Cu bonding that directly connects metal wiring such as Cu exposed on a bottom surface side of the die 130 and metal wiring such as Cu exposed on a top surface side of the die 131.

Here, in the imaging processing unit 112, as a method of performing AD conversion of the image signal output from the imaging unit 111, for example, a column-parallel AD method or an area AD method can be adopted.

In the column-parallel AD method, for example, an AD converter (ADC) is provided for a column of pixels configuring the imaging unit 111, and the ADC in each column is in charge of AD conversion of a pixel signal of a pixel in the column, whereby AD conversion of an image signal of a pixel in each column in one row is performed in parallel. When the column-parallel AD method is adopted, a part of the imaging processing unit 112 that performs AD conversion of the column-parallel AD method may be mounted on the die 130 on the top side.

In the area AD method, pixels configuring the imaging unit 111 are divided into a plurality of blocks, and the ADC is provided for each block. Then, the ADC of each block is in charge of AD conversion of the pixel signals of the pixels in the block, whereby AD conversion of the image signals of the pixels in the plurality of blocks is performed in parallel. In the area AD method, the block is a minimum unit, and the AD conversion (reading and AD conversion) of image signals can be performed only for necessary pixels among the pixels configuring the imaging unit 111.

Note that, when an area of the imaging device 100 is allowed to be large, the imaging device 100 can be configured with one die.

Furthermore, in the example in FIG. 4, the one-chip imaging device 100 is configured by stacking the two dies 130 and 131, but the one-chip imaging device 100 may be configured by stacking three or more dies. For example, when the imaging device 100 of one chip is configured by laminating three dies, the memory 123 mounted on the die 131 in FIG. 4 may be mounted on a die different from the dies 130 and 131.

Here, in an imaging device in which chips of a sensor chip, a memory chip, and a DSP chip are connected in parallel by a plurality of bumps (hereinafter also referred to as a bump-connected imaging device), a thickness is greatly increased and the device is increased in size as compared with the one-chip imaging device 100 configured in a stacked structure.

Furthermore, in the bump-connected imaging device, it may be difficult to secure a sufficient rate at which the captured image is output from the imaging processing unit 112 to the output controller 113 due to signal deterioration or the like at a connected portion of the bumps.

According to the imaging device 100 having the stacked structure, it is possible to prevent the above-described increase in size of the device and the inability to secure a sufficient rate between the imaging processing unit 112 and the output controller 113. Therefore, according to the imaging device 100 having the stacked structure, it is possible to downsize the imaging device that outputs information required for processing in a subsequent stage of the imaging device 100.

When the information required in the subsequent stage is the captured image, the imaging device 100 can output the captured image (RAW image, RGB image, etc.). Furthermore, when information required in the subsequent stage is obtained by signal processing using the captured image, the imaging device 100 can obtain and output the signal processing result as the information required by the user by performing the signal processing in the DSP 122.

As the signal processing performed by the imaging device 100, i.e., the signal processing of the DSP 122, for example, a recognition process of recognizing a predetermined recognition target from the captured image can be adopted.

Furthermore, for example, the imaging device 100 can receive, by the input I/F 126, an output of a distance sensor such as a time of flight (ToF) sensor arranged to have a predetermined positional relationship with the imaging device 100. In this case, as the signal processing of the DSP 122, for example, a fusion process can be adopted to integrate the output of the distance sensor and the captured image to obtain an accurate distance, such as a process of removing noise of the distance image obtained from the output of the distance sensor received by the input I/F 126 using the captured image.

Furthermore, for example, the imaging device 100 can receive, by the input I/F 126, an image output by an image sensor arranged to have a predetermined positional relationship with the imaging device 100. In this case, as the signal processing of the DSP 122, for example, a simultaneously localization and mapping (SLAM) process using the image received by the input I/F 126 and the captured image as stereo images can be adopted.

Figure 5:
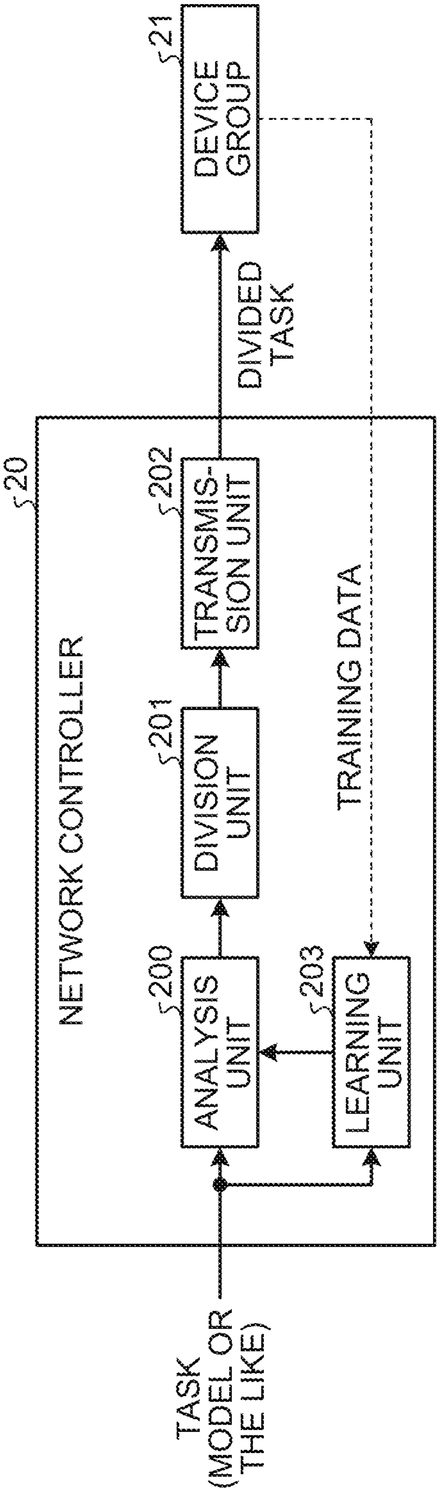
FIG. 5 is a functional block diagram of an example for illustrating functions of the network controller according to the first embodiment.

FIG. 5 is a functional block diagram of an example for illustrating functions of the network controller 20 according to the first embodiment. More specifically, FIG. 5 illustrates the functions of the network controller 20 described with reference to FIG. 1.

Note that, in FIG. 5, a device group 21 includes one or more devices that receive the network output by the network controller 20, such as the first processor 11 or the second processor 12 illustrated in FIG. 1, or the imaging device 100 illustrated in FIG. 3. In addition, each device included in the device group 21 includes a processor for executing processing by the network received from the network controller 20.

In FIG. 5, the network controller 20 includes an analysis unit 200, a division unit 201, a transmission unit 202, and a learning unit 203. Among them, the learning unit 203 can be omitted.

The analysis unit 200, the division unit 201, the transmission unit 202, and the learning unit 203 included in the network controller 20 are configured by executing an information processing program according to the first embodiment on the CPU. However, the present disclosure is not limited thereto. Some or all of the analysis unit 200, the division unit 201, the transmission unit 202, and the learning unit 203 may be configured by hardware circuits that operate in cooperation with each other.

The task is input to the network controller 20. The task is input as, for example, a model of the neural network used by the task. The task input to the network controller 20 is delivered to the analysis unit 200 and the learning unit 203.

The analysis unit 200 analyzes the task delivered. For example, by analyzing the task, the analysis unit 200 extracts processing performed in the preceding stage of the task and processing performed in the subsequent stage based on a processing result of the preceding stage. The analysis result by the analysis unit 200 is passed to the division unit 201 together with the task input to the network controller 20.

When the task is divided into two tasks, the division unit 201 divides the task into a preceding-stage network (first network) and a subsequent-stage network (second network) based on the analysis result received from the analysis unit 200. The division unit 201 further determines, from the processors included in the device group 21, a processor to which each of the first network and the second network is applied. The device group 21 includes, for example, the imaging device 100, a signal processing device that performs signal processing and the like on the output of the imaging device 100.

In this example, the division unit 201 determines the first processor 11, to which the input data is input as described with reference to FIG. 1, as a processor to apply the first network. In addition, the second processor 12, to which the output of the first processor 11 is input, is determined as a processor to apply the second network.

The division unit 201 passes, to the transmission unit 202, the first network and the second network obtained by dividing the task input to the network controller 20, and information indicating processors to apply the first network and the second network.

The transmission unit 202 transmits the first network and the second network transferred from the division unit 201 to respective processors determined. For example, the transmission unit 202 transmits the first network and the second network among the processors included in the devices included in the device group 21 to the respective processors determined. In this example, the transmission unit 202 transmits the first network to the first processor 11 and transmits the second network to the second processor 12.

The processors included in the device group 21 and to which the first network and the second network are applied can return, for example, a processing result of at least one of the first network and the second network to the network controller 20. The processing result is passed to the learning unit 203 in the network controller 20.

The learning unit 203 can retrain, using the processing result received, the network input as the task into the network controller 20. The learning unit 203 passes the retrained network to the analysis unit 200. The analysis unit 200 analyzes the retrained network received from the learning unit 203, and the division unit 201 divides the retrained network and updates the first network and the second network.

Figure 6:
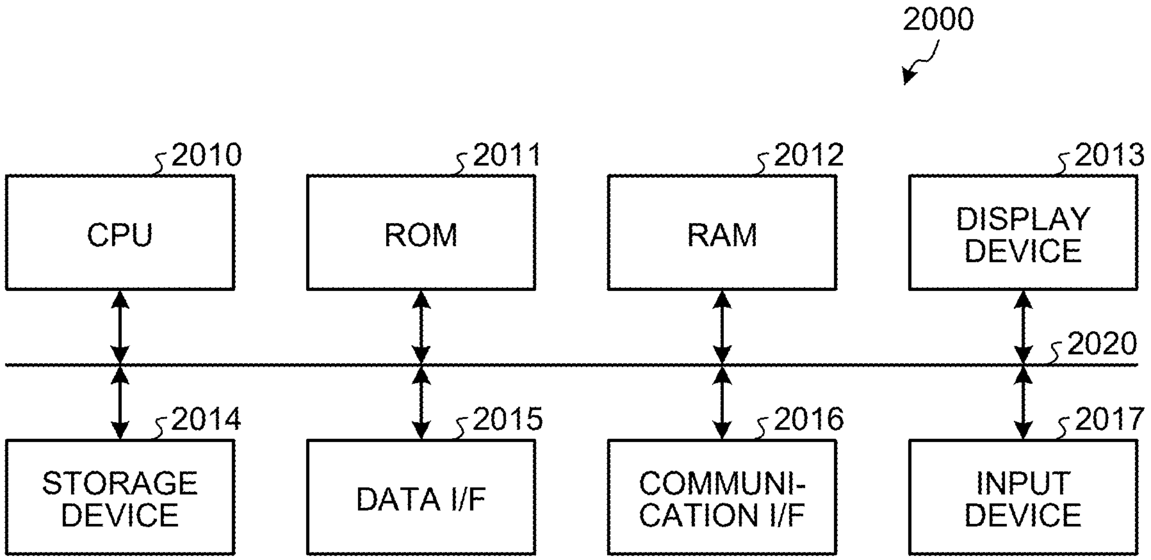
FIG. 6 is a block diagram illustrating a hardware configuration of an example of a server that can configure the network controller according to the first embodiment.

FIG. 6 is a block diagram illustrating a hardware configuration of an example of the server that can configure the network controller 20 according to the first embodiment.

In FIG. 6, a server 2000 includes a CPU 2010, a read only memory (ROM) 2011, a random access memory (RAM) 2012, a display device 2013, a storage device 2014, a data I/F 2015, a communication I/F 2016, and an input device 2017, which are communicably connected to each other via a bus 2020.

The storage device 2014 is a nonvolatile storage medium such as a hard disk drive or a flash memory. The CPU 2010 controls the entire operation of the server 2000 using the RAM 2012 as a work memory according to a program stored in the storage device 2014 or the ROM 2011.

The display device 2013 includes a display device that displays an image, and a display controller that converts a display control signal generated by the CPU 2010 into a display signal that can be displayed on the display device. The input device 2017 receives a user input, and a pointing device such as a mouse, a keyboard, or the like can be applied. Devices applicable to the input device 2017 are not limited thereto.

The data I/F 2015 is an interface for inputting/outputting data to/from an external device. A universal serial bus (USB) or the like can be applied as the data I/F 2015, but an applicable interface method is not particularly limited. The communication I/F 2016 controls communication via a communication network such as the Internet.

As described above, the server 2000 includes the CPU 2010, the ROM 2011, the RAM 2012, and the like, and is configured as a general computer. Not limited to this, the server 2000 may be configured using a cloud computing service by cloud computing.

In the server 2000, the CPU 2010 executes the information processing program for realizing the function according to the first embodiment, thereby configuring each of the analysis unit 200, the division unit 201, the transmission unit 202, and the learning unit 203 described above as, for example, a module on a main storage area in the RAM 2012.

The information processing program can be acquired from the outside via a communication network (not illustrated) by communication via the communication I/F 2016, for example, and can be installed on the server 2000. However, the present disclosure is not limited thereto, and the information processing program may be provided by being stored in a detachable storage medium such as a compact disk (CD), a digital versatile disk (DVD), or a universal serial bus (USB) memory.

1-3. System Configuration According to First Embodiment

Next, a system configuration according to the first embodiment will be described.

Figure 7A:
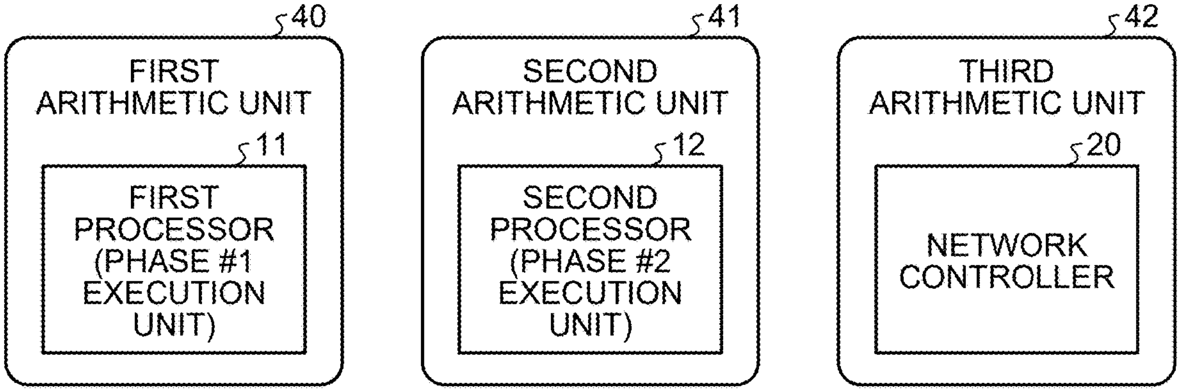
FIG. 7A is a schematic diagram schematically illustrating a first example of a system configuration according to the first embodiment.
Figure 7B:
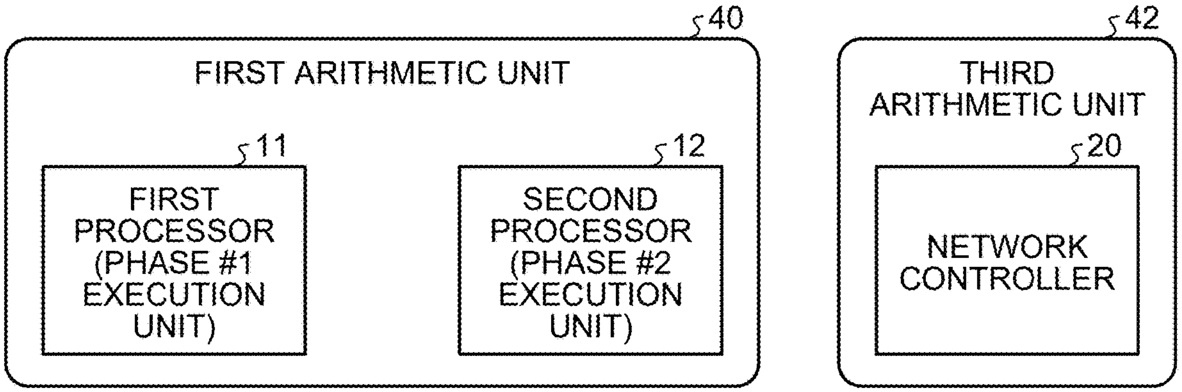
FIG. 7B is a schematic diagram schematically illustrating a system configuration according to the first embodiment.
Figure 7C:
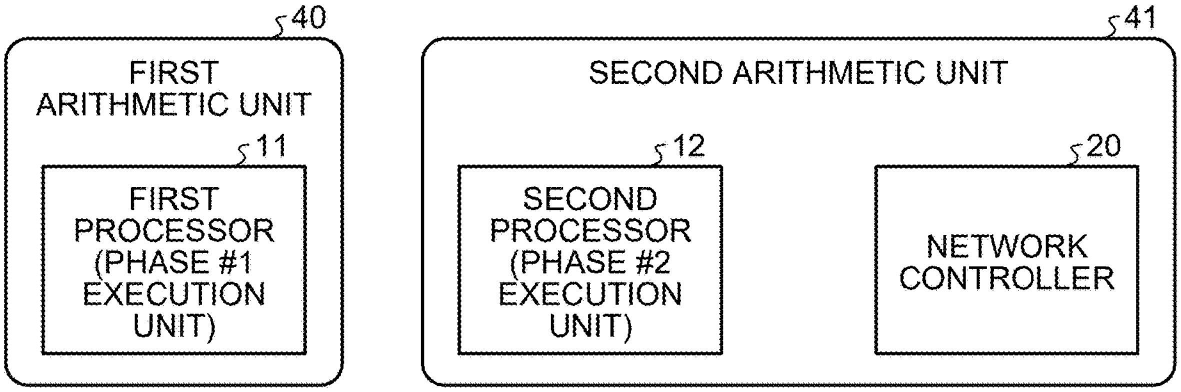
FIG. 7C is a schematic diagram schematically illustrating a system configuration according to the first embodiment.

FIGS. 7A to 7C are schematic diagrams schematically illustrating first to third examples of the system configuration according to the first embodiment. In FIGS. 7A to 7C, a first arithmetic unit 40, a second arithmetic unit 41, and a third arithmetic unit 42 each includes an arithmetic unit such as a CPU, an MPU, or an MCU, and may have a configuration as an information processing apparatus that performs arithmetic operation such as data processing according to the program.

In addition, processing by the first network obtained by dividing the network is referred to as a first-phase process in the network, and processing by the second network is referred to as a second-phase process in the network. In FIGS. 7A to 7C, the first processor 11 is a phase #1 execution unit that executes the first-phase process, and the second processor 12 is a phase #2 execution unit that executes the second-phase process.

FIG. 7A illustrates an example in which the first processor 11, the second processor 12, and the network controller 20 are configured by different arithmetic units in the information processing system 1 illustrated in FIG. 1. More specifically, the first processor 11 is configured in the first arithmetic unit 40, the second processor 12 is configured in the second arithmetic unit 41, and the network controller 20 is configured in the third arithmetic unit 42. The third arithmetic unit 42 is connected to the first arithmetic unit 40 and the second arithmetic unit 41 via wired or wireless communication. In addition, the first arithmetic unit 40 and the second arithmetic unit 41 are connected via wired or wireless communication.

FIG. 7B illustrates an example in which the first processor 11 and the second processor 12 are configured in the first arithmetic unit 40 and the network controller 20 is configured in the third arithmetic unit 42 in the information processing system 1 illustrated in FIG. 1. In the first arithmetic unit 40, the first processor 11 and the second processor 12 are internally connected. In addition, the third arithmetic unit 42 and the first arithmetic unit 40 are connected via wired or wireless communication. In the configuration illustrated in FIG. 7B, data transmission between the first processor 11 and the second processor 12 can be made faster than in the configuration illustrated in FIG. 7A described above.

FIG. 7C illustrates an example in which the first processor 11 is configured in the first arithmetic unit 40 and the second processor 12 and the network controller 20 are configured in the second arithmetic unit 41 in the information processing system 1 illustrated in FIG. 1. The first arithmetic unit 40 and the second arithmetic unit 41 are connected via wired or wireless communication. In addition, in the second arithmetic unit 41, the second processor 12 and the network controller 20 are internally connected. In the configuration illustrated in FIG. 7C, by configuring the second arithmetic unit 41 as a more sophisticated information processing apparatus (such as the server 2000), for example, processing by a phase #2 execution unit in the second processor 12 can be speeded up or enhanced.

First to seventh examples of the system configuration according to the first embodiment will be described more specifically with reference to FIGS. 8A to 8G. Note that each system configuration illustrated in FIGS. 8A to 8G illustrates an example of the configuration that can be taken by the information processing system 1 illustrated in FIG. 1. In FIGS. 8A to 8G, the network controller 20 in FIG. 1 is omitted.

Figure 8A:
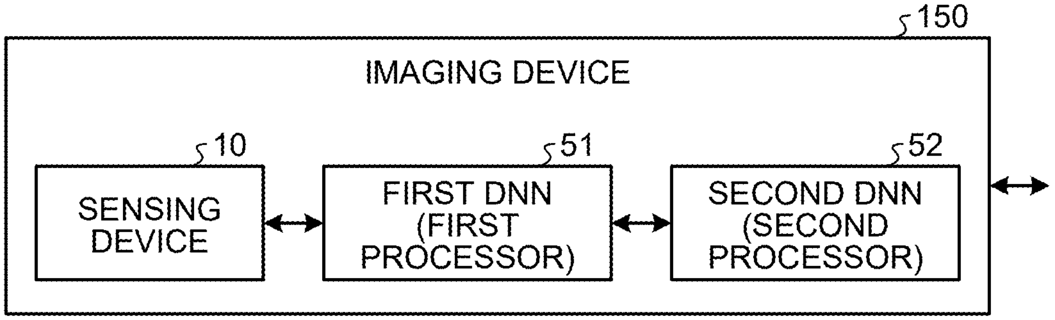
FIG. 8A is a schematic diagram for more specifically illustrating the first example of the system configuration according to the first embodiment.
Figure 8B:
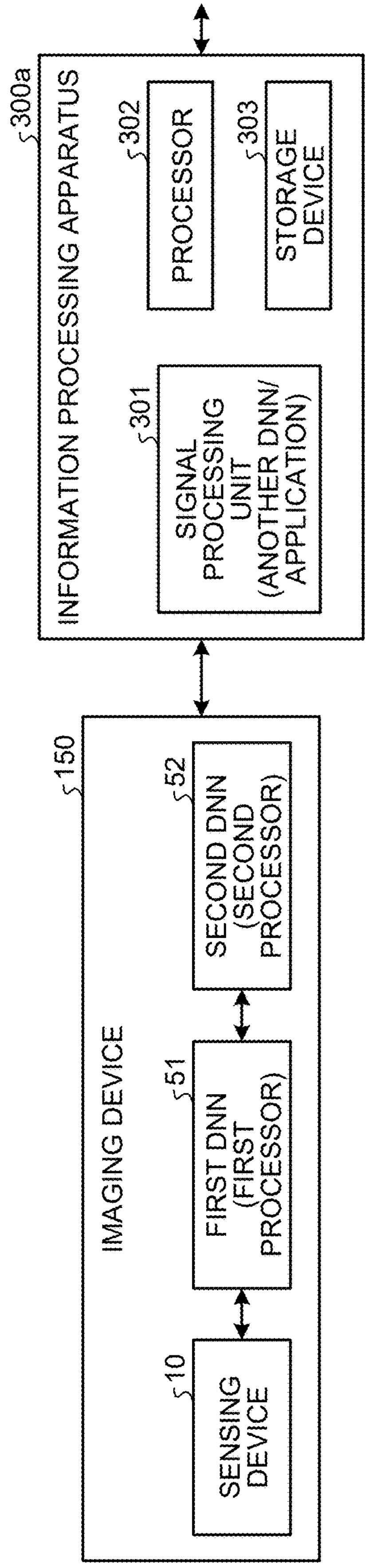
FIG. 8B is a schematic diagram for more specifically illustrating a second example of the system configuration according to the first embodiment.
Figure 8C:
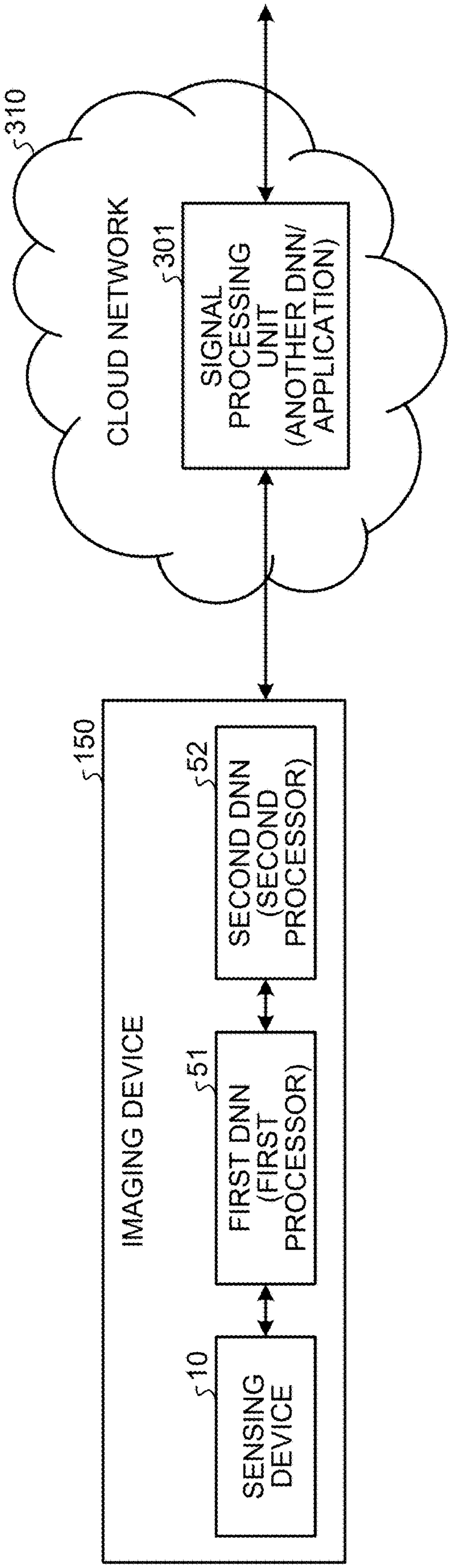
FIG. 8C is a schematic diagram for more specifically illustrating a third example of the system configuration according to the first embodiment.
Figure 8D:
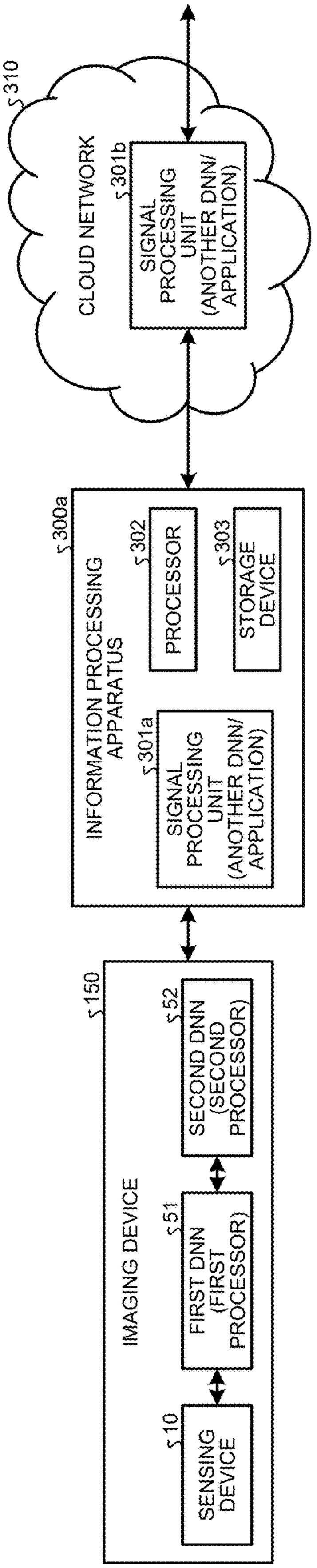
FIG. 8D is a schematic diagram for more specifically illustrating a fourth example of the system configuration according to the first embodiment.
Figure 8E:
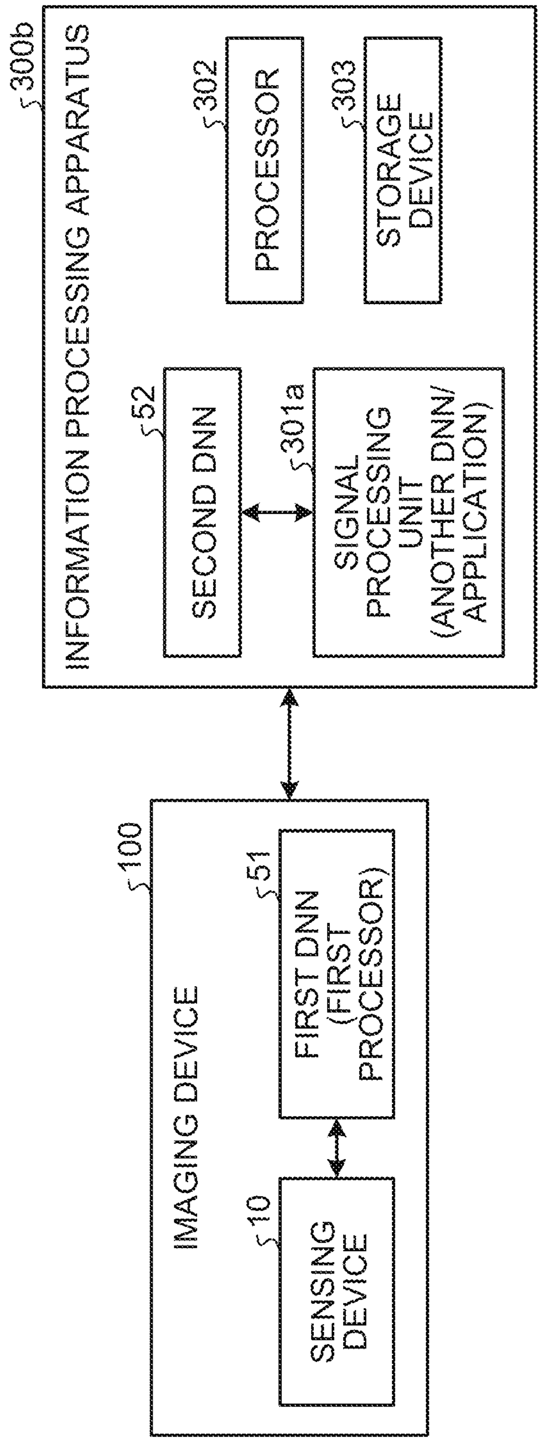
FIG. 8E is a schematic diagram for more specifically illustrating a fifth example of the system configuration according to the first embodiment.
Figure 8F:
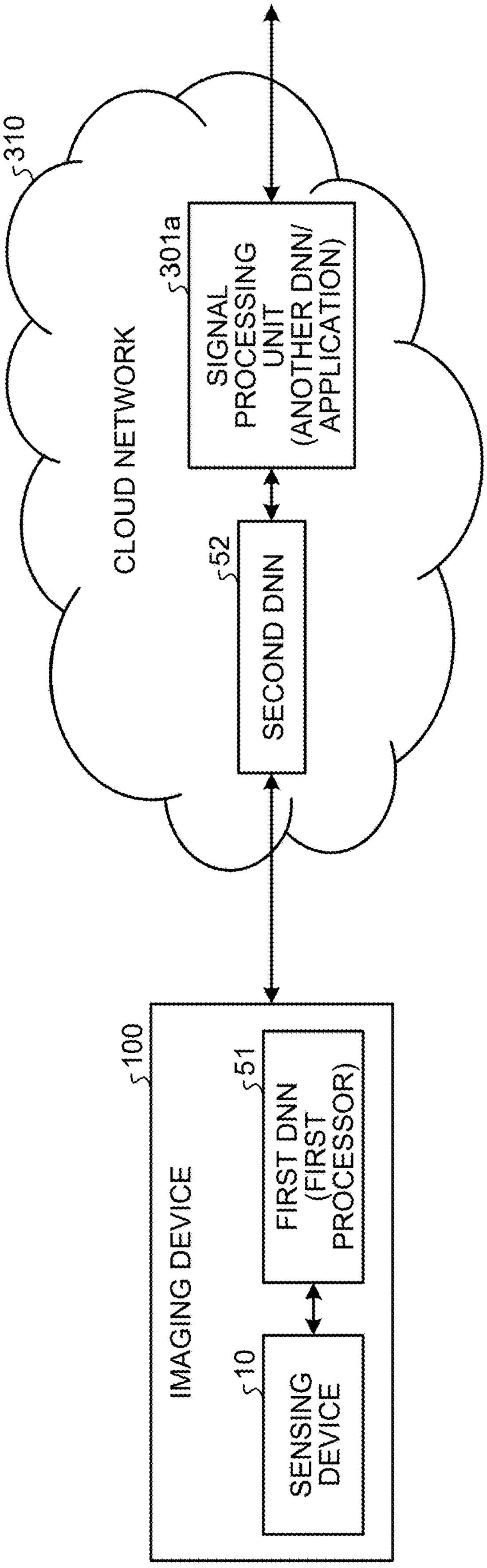
FIG. 8F is a schematic diagram for more specifically illustrating a sixth example of the system configuration according to the first embodiment.
Figure 8G:
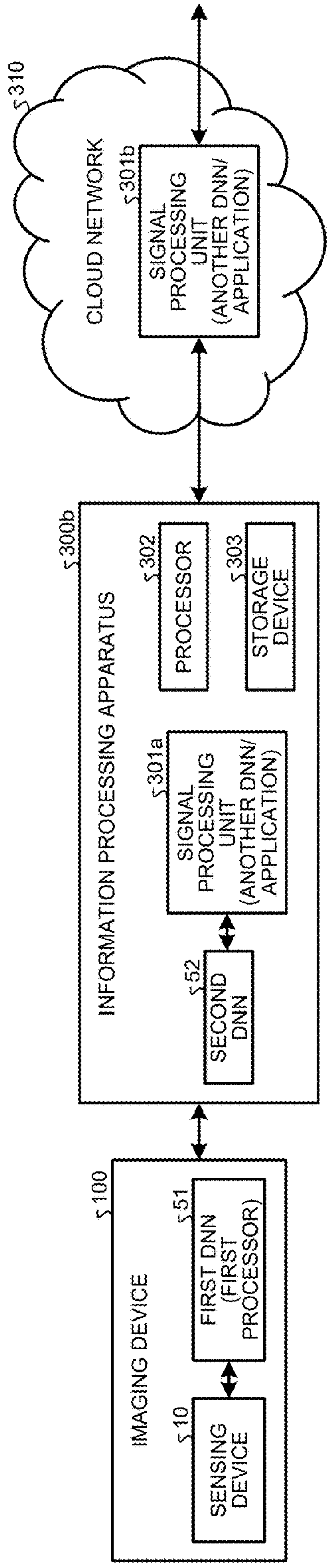
FIG. 8G is a schematic diagram for more specifically illustrating a seventh example of the system configuration according to the first embodiment.

Note that an imaging device 150 in FIGS. 8A to 8D and the imaging device 100 in FIGS. 8E to 8G are, for example, monitoring cameras assumed to be used for imaging for performing a recognition process on a person or an object with a fixed installation place. Applications of the imaging devices 100 and 150 are not limited to monitoring cameras, and may be in-vehicle cameras or portable cameras.

FIG. 8A is an example of a system configuration by the imaging device 150 including the sensing device 10, the first network (first DNN 51) executed by the first processor 11, and the second network (second DNN 52) executed by the second processor 12 in the information processing system 1 illustrated in FIG. 1. In other words, the imaging device 150 is configured such that the sensing device 10, the first processor 11 (not illustrated) that executes processing by the first DNN 51, and the second processor 12 (not illustrated) that executes processing by the second DNN 52 are housed in one housing. An output of the imaging device 150 is an output to the application execution unit 30 in the information processing system 1 described with reference to FIG. 1. As an example, the output of the imaging device 150 is an output to the outside of the imaging device 150, and is provided, for example, to the user.

Note that, in the configuration in FIG. 8A, the sensing device 10 can be controlled based on a processing result of at least one of the first DNN 51 and the second DNN 52, and further, a processing result of the application execution unit 30. Furthermore, the first DNN 51 (first network) can be changed based on the processing result of the second DNN 52. Furthermore, the first DNN 51 (first network) and the second DNN 52 (second network) can be changed based on the processing result of the application execution unit 30.

FIG. 8B is an example of a system configuration in which the output of the imaging device 150 including the sensing device 10, the first DNN 51, and the second DNN 52 in the information processing system 1 illustrated in FIG. 1 is transmitted to an information processing apparatus 300*a*. The information processing apparatus 300*a* includes a processor 302 and a storage device 303. The information processing apparatus 300*a* further includes a signal processing unit 301 that executes predetermined signal processing on the output of the imaging device 150. The signal processing unit 301 includes, for example, another DNN of the first DNN 51 and the second DNN 52, or an application program. The signal processing unit 301 can correspond to the application execution unit 30 in the information processing system 1 described with reference to FIG. 1. As described above, the application execution unit 30 may be a DNN. A processing result by the signal processing unit 301 is output to the outside of the information processing apparatus 300*a* and is provided, for example, to the user. The processing result by the signal processing unit 301 may be stored in the storage device 303.

Note that, in the configuration of FIG. 8B, the sensing device 10 can be controlled based on the processing result of at least one of the first DNN 51 and the second DNN 52, and further, the processing result of the signal processing unit 301. Furthermore, the first DNN 51 (first network) can be changed based on the processing result of the second DNN 52. Furthermore, the first DNN 51 (first network) and the second DNN 52 (second network) can also be changed based on the processing result of the signal processing unit 301. Furthermore, the control of the sensing device 10, the change of the first DNN 51 (first network), and the change of the second DNN 52 (second network) can be performed based on the processing result in the outside to which the output of the information processing apparatus 300*a* is supplied.

FIG. 8C is an example of a system configuration in which the signal processing unit 301 in FIG. 8B is configured on a cloud network 310 provided by a cloud computing service. In other words, the cloud computing service is a service that provides computer resources via a computer network.

The output of the imaging device 150 is transmitted to the cloud network 310 via wired or wireless communication such as the Internet or an intranet, and is input to the signal processing unit 301. The signal processing unit 301 can correspond to the application execution unit 30 in the information processing system 1 described with reference to FIG. 1. The processing result of the signal processing unit 301 is output to the outside of the cloud network 310, for example, and is provided, for example, to the user. The processing result of the signal processing unit 301 may be stored in a storage device (not illustrated) included in the cloud network 310.

Note that, in the configuration of FIG. 8C, the sensing device 10 can be controlled based on the processing result of at least one of the first DNN 51 and the second DNN 52, and further, based on the processing result of the signal processing unit 301. Furthermore, the first DNN 51 (first network) can be changed based on the processing result of the second DNN 52. Furthermore, the first DNN 51 (first network) and the second DNN 52 (second network) can also be changed based on the processing result of the signal processing unit 301. Furthermore, the control of the sensing device 10, the change of the first DNN 51 (first network), and the change of the second DNN 52 (second network) can be performed based on the processing result in the outside to which the output of the information processing apparatus 300*a* is supplied.

FIG. 8D illustrates an example of a system configuration in which a signal processing unit 301*b* configured on the cloud network 310 provided by the cloud computing service is further added to the configuration in FIG. 8B. The signal processing unit 301*b* is further configured by another DNN or application program for the signal processing unit 301*a* in the information processing apparatus 300*a*.

The processing result of the signal processing unit 301*a* in the information processing apparatus 300*a* is transmitted to the cloud network 310 via wired or wireless communication such as the Internet or an intranet, and is input to the signal processing unit 301*b*. The information processing apparatus 300*a* may directly transmit the processing result output from the signal processing unit 301*a* to the cloud network 310, or may read the processing result from the storage device 303 and transmit the processing result to the cloud network 310.

The processing result of the signal processing unit 301*b* is output to the outside of the cloud network 310, for example, and is provided, for example, to the user. The processing result by the signal processing unit 301*b* may be stored in a storage device (not illustrated) included in the cloud network 310.

In an example in FIG. 8D, the signal processing unit 301*a* in the information processing apparatus 300*a* can correspond to the application execution unit 30 in the information processing system 1 described with reference to FIG. 1. The present disclosure is not limited thereto, and in the example in FIG. 8D, the signal processing unit 301*a* and the signal processing unit 301*b* configured on the cloud network 310 may be included as the application execution unit 30 in the information processing system 1 described with reference to FIG. 1.

Note that, in the configuration in FIG. 8D, the sensing device 10 can be controlled based on the processing result of at least one of the first DNN 51 and the second DNN 52, and further, the processing result of the signal processing unit 301*a* or 301*b*. Furthermore, the first DNN 51 (first network) can be changed based on the processing result of the second DNN 52. Furthermore, the first DNN 51 (first network) and the second DNN 52 (second network) can be changed based on the processing result of at least one of the signal processing units 301*a* and 301*b*. Furthermore, the control of the sensing device 10, the change of the first DNN 51 (first network), and the change of the second DNN 52 (second network) can be performed based on an external processing result to which the output of the cloud network 310 is supplied.

FIG. 8E illustrates an example of a system configuration including the imaging device 100 and an information processing apparatus 300*b* described with reference to FIG. 3. In the example in FIG. 8E, the imaging device 100 includes the sensing device 10 and the first DNN 51 in the information processing system 1 illustrated in FIG. 1, and the second DNN 52 that executes processing on the output of the first DNN 51 is mounted on the information processing apparatus 300*b* outside the imaging device 100. In the case of this example, the imaging device 100 is configured such that the sensing device 10 and the first processor 11 (not illustrated) that executes processing by the first DNN 51 are housed in one housing.

In FIG. 8E, the information processing apparatus 300*b* includes the processor 302 and the storage device 303. In the information processing apparatus 300*b*, the processor 302 includes the second DNN 52 and can include the function of the second processor 12.

The output of the imaging device 100 is transmitted to the information processing apparatus 300*b* via, for example, wired or wireless communication, and is input to the second DNN 52. The output of the second DNN 52 is output to the application execution unit 30 in the information processing system 1 described with reference to FIG. 1. As an example, the output of the second DNN 52 is passed to the signal processing unit 301*a*. The signal processing unit 301*a* includes, for example, another DNN of the first DNN 51 and the second DNN 52, or an application program. The signal processing unit 301*a* can correspond to the application execution unit 30 in the information processing system 1 described with reference to FIG. 1. The processing result by the signal processing unit 301*a* is output to the outside of the information processing apparatus 300*b* and provided, for example, to the user. The processing result by the signal processing unit 301*a* may be stored in the storage device 303.

Note that, in the configuration in FIG. 8E, the sensing device 10 can be controlled based on the processing result of at least one of the first DNN 51 and the second DNN 52, and further, the processing result of the signal processing unit 301*a*. Furthermore, the first DNN 51 (first network) can be changed based on the processing result of the second DNN 52. Furthermore, the first DNN 51 (first network) and the second DNN 52 (second network) can be changed based on the processing result of the signal processing unit 301*a*. Furthermore, the control of the sensing device 10, the change of the first DNN 51 (first network), and the change of the second DNN 52 (second network) can be performed based on the processing result in the outside to which the output of the information processing apparatus 300*b* is supplied.

FIG. 8F illustrates an example of a system configuration including the imaging device 100 and the cloud network 310 described with reference to FIG. 3. The example in FIG. 8F is an example in which the imaging device 100 includes the sensing device 10 and the first DNN 51 in the information processing system 1 illustrated in FIG. 1, and the second DNN 52 and the signal processing unit 301*a* in FIG. 8E are configured on the cloud network 310 provided by the cloud computing service. The cloud network 310 includes the second processor 12 or another processor capable of realizing the function of the second processor 12, and the second DNN 52 is configured by the second processor 12 or the another processor.

The output of the imaging device 100 is transmitted to the cloud network 310 via wired or wireless communication such as the Internet or an intranet, and is input to the second DNN 52. The processing result by the second DNN 52 is input to the signal processing unit 301*a*. The signal processing unit 301*a* can correspond to the application execution unit 30 in the information processing system 1 described with reference to FIG. 1. The processing result by the signal processing unit 301*a* is output to the outside of the cloud network 310 and provided, for example, to the user. The processing result of the signal processing unit 301*a* may be stored in a storage device (not illustrated) included in the cloud network 310.

Note that, in the configuration in FIG. 8F, the sensing device 10 can be controlled based on the processing result of at least one of the first DNN 51 and the second DNN 52, and further, the processing result of the signal processing unit 301*a*. Furthermore, the first DNN 51 (first network) can be changed based on the processing result of the second DNN 52. Furthermore, the first DNN 51 (first network) and the second DNN 52 (second network) can be changed based on the processing result of the signal processing unit 301*a*. Furthermore, the control of the sensing device 10, the change of the first DNN 51 (first network), and the change of the second DNN 52 (second network) can be performed based on an external processing result to which the output of the cloud network 310 is supplied.

FIG. 8G is an example of a system configuration in which the signal processing unit 301*b* configured on the cloud network 310 provided by the cloud computing service is further added to the configuration of FIG. 8E. The signal processing unit 301*b* further includes another DNN or application program for the signal processing unit 301*a* in the information processing apparatus 300*b*.

The processing result of the signal processing unit 301*a* in the information processing apparatus 300*b* is transmitted to the cloud network 310 via wired or wireless communication such as the Internet or an intranet, and is input to the signal processing unit 301*b*. The information processing apparatus 300*b* may directly transmit the processing result output from the signal processing unit 301*a* to the cloud network 310, or may read the processing result from the storage device 303 and transmit the processing result to the cloud network 310.

The processing result by the signal processing unit 301*b* is output to the outside of the cloud network 310 and provided, for example, to the user. The processing result by the signal processing unit 301*b* may be stored in a storage device (not illustrated) included in the cloud network 310.

In an example in FIG. 8G, the signal processing unit 301*a* in the information processing apparatus 300*b* can correspond to the application execution unit 30 in the information processing system 1 described with reference to FIG. 1. Not limited to this, in the example in FIG. 8G, the signal processing unit 301*a* and the signal processing unit 301*b* configured on the cloud network 310 may be included as the application execution unit 30 in the information processing system 1 described with reference to FIG. 1.

Note that, in the configuration in FIG. 8G, the sensing device 10 can be controlled based on the processing result of at least one of the first DNN 51 and the second DNN 52, and further, the processing result of the signal processing unit 301*a* or 301*b*. Furthermore, the first DNN 51 (first network) can be changed based on the processing result of the second DNN 52. Furthermore, the first DNN 51 (first network) and the second DNN 52 (second network) can be changed based on the processing result of at least one of the signal processing units 301*a* and 301*b*. Furthermore, the control of the sensing device 10, the change of the first DNN 51 (first network), and the change of the second DNN 52 (second network) can be performed based on an external processing result to which the output of the cloud network 310 is supplied.

2. Second Embodiment

Next, a second embodiment of the present disclosure will be described. In the second embodiment, a network is divided into a plurality of networks based on performance required for the network (referred to as required performance).

The required performance includes at least one of performance required for a hardware element and performance required for an application element. The application element is required for output data output from a network by an application that executes processing on the output data.

2-1. Existing Technology

Prior to the description of the second embodiment, an existing technology related to the second embodiment will be described to facilitate understanding.

Figure 9:
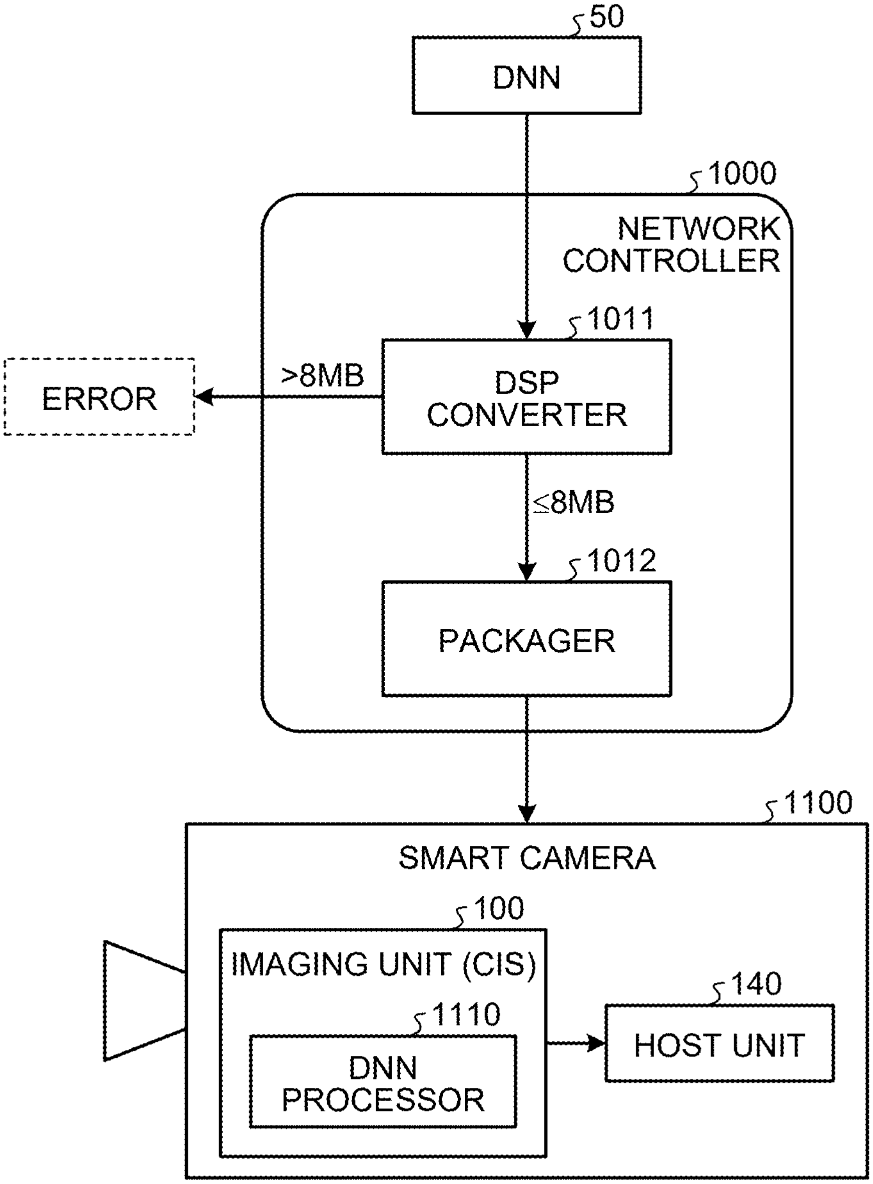
FIG. 9 is a schematic diagram for illustrating an existing technique related to a second embodiment.

FIG. 9 is a schematic diagram illustrating the existing technology related to the second embodiment. In FIG. 9, it is assumed that a smart camera system includes a smart camera 1100 as a device on which a DNN (DNN model) is mounted, and a network controller 1000 that is configured on a cloud network or a server and performs communication with the smart camera 1100 via a communication network. The smart camera 1100 includes a DNN processor 1110 that executes processing by the DNN.

The smart camera 1100 includes an imaging device 100 using a CIS and a host unit 140 that performs processing on the output data output from the imaging device 100 and controls the imaging device 100. Furthermore, the imaging device 100 includes a DNN processor 1110 that executes processing by the DNN, and a memory that can use, for example, 8 megabytes (MB) of a capacity for processing by the DNN processor 1110. Furthermore, the network controller 1000 is configured on, for example, a cloud network or a server, and includes a DSP converter 1011 and a packager 1012.

A DNN 50 mounted on the DNN processor 1110 of the smart camera 1100 is input to the network controller 1000 and delivered to the DSP converter 1011. The DSP converter 1011 converts the DNN 50 into a format that can be executed by the DNN processor 1110. Furthermore, the DSP converter 1011 optimizes the converted DNN 50 so that the DNN falls within the capacity of the memory connected to the DNN processor 1110 in the smart camera 1100.

The DNN 50 having converted and optimized format (hereinafter referred to as an optimized DNN) is encrypted and packaged by a packager 1012 and transmitted to the smart camera 1100. In the smart camera 1100, the host unit 140 transfers the converted DNN transmitted from the network controller 1000 to a memory connected to the DNN processor 1110, and mounts the optimized DNN on the DNN processor 1110.

In this system, the DSP converter 1011 returns an error when the data size of the optimized DNN is larger than the capacity of the memory connected to the DNN processor 1110. In an example in FIG. 9, the capacity available to the DNN processor 1110 in the memory is 8 MB, and the DSP converter 1011 returns an error when the data size exceeds 8 MB. When the error is returned, the optimized DNN is not installed in the DNN processor 1110.

Furthermore, according to the existing technology, even when the host unit 140 of the smart camera 1100 or a part of the optimized DNN can be executed in the cloud network, this point is not automatically taken into consideration in the DSP converter 1011. As described above, according to the existing technology, since the DSP converter 1011 returns an error indicating that the optimized DNN cannot be mounted, execution of the DNN is frequently limited even when the smart camera 1100 is working.

As another method, it is conceivable that the DNN is manually divided on the user side to be adapted to constraints of the device (smart camera 1100 in this example). Then, a portion for performing pre-stage processing in the DNN is executed in the DNN processor 1110, and a portion for the subsequent stage is executed in the host unit 140.

However, in general, there may be various types of devices with different specifications that are not recognized by the user or a developer of the DNN 50. Therefore, it is considered extremely difficult to manually and efficiently divide the DNN 50 to be executed by various processors and components in the system. It may also be necessary to divide the DNN in different ways for certain applications based on system constraints.

Therefore, in the second embodiment of the present disclosure, the DNN 50 to be mounted on the device is divided based on performance (required performance) required for execution of processing by the DNN 50. As a result, for example, in the smart camera 1100, DNNs can be appropriately mounted on the DNN processor 1110 and the host unit 140 included in the imaging device 100, and processing by a more advanced DNN can be executed as a system.

2-2. Configuration and Processing According to Second Embodiment

Next, a configuration and processing according to the second embodiment will be described.

Figure 10:
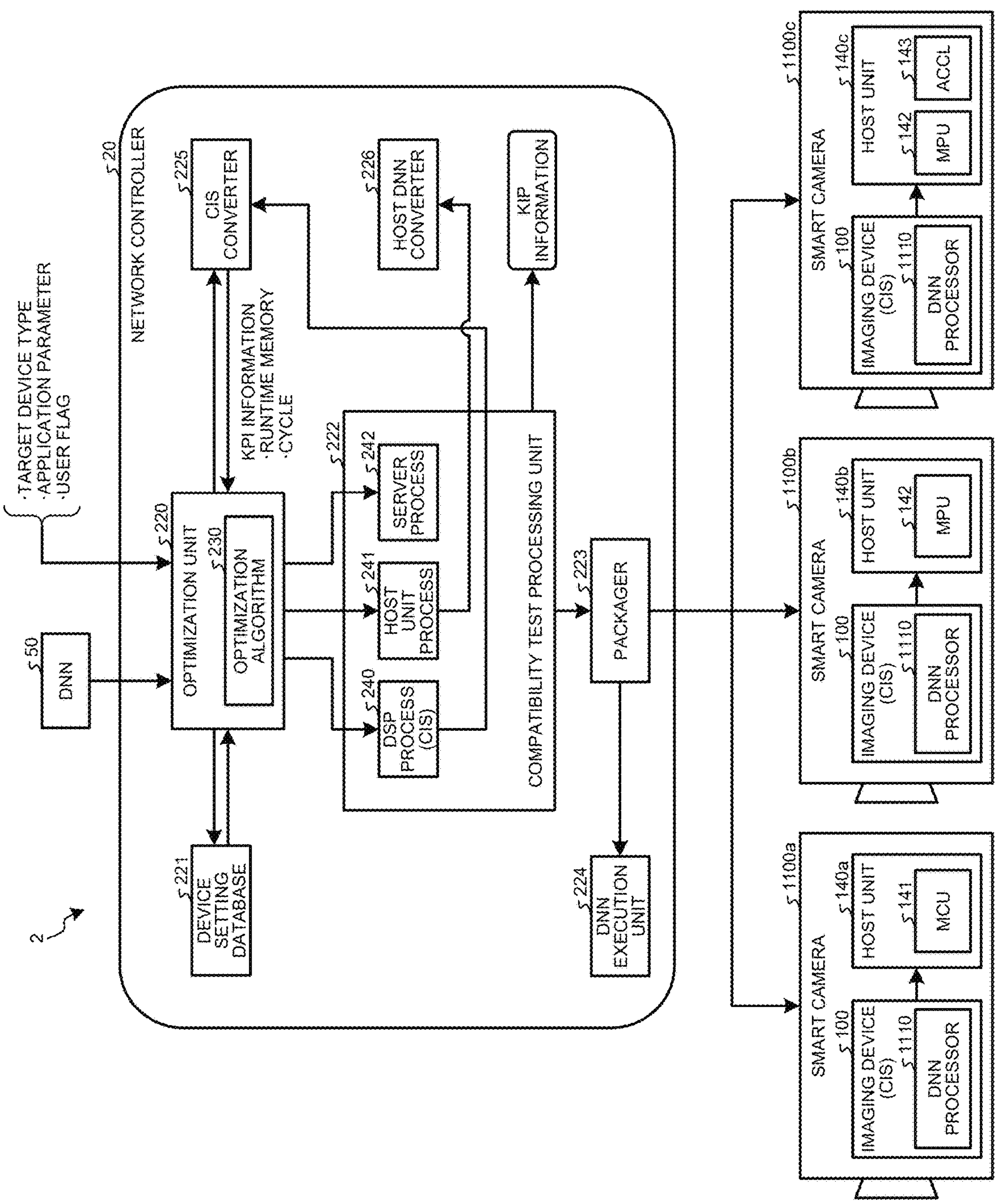
FIG. 10 is a schematic diagram of an example illustrating a process according to the second embodiment.

FIG. 10 is a functional block diagram of an example illustrating functions of a smart camera system as the information processing system according to the second embodiment.

In the example in FIG. 10, a smart camera system 2 includes a network controller 20 and smart cameras 1100*a*, 1100*b*, and 1100*c*. Note that, in FIG. 10, each of the smart cameras 1100*a*, 1100*b*, and 1100*c* is an example of a plurality of smart cameras having different configurations, and the smart camera system 2 does not need to include all the smart cameras.

Each of the smart cameras 1100*a*, 1100*b*, and 1100*c* includes an imaging device 100 including the DNN processor 1110 and a memory (not illustrated) that can use, for example, 8 MB of capacity for processing by the DNN processor 1110. Each DNN processor 1110 may include the function of the first processor 11.

For example, the imaging device 100 may have the configuration of the imaging device 100 illustrated in FIG. 3. In this case, the DSP 122, or the DSP 122 and the CPU 121 may be applied to the DNN processor 1110. Furthermore, for example, the memory usable for processing by the DNN processor 1110 may be the memory 123, or the memory may be included in the DSP 122.

Furthermore, the smart cameras 1100*a*, 1100*b*, and 1100*c* include respective host units 140*a*, 140*b*, and 140*c* that control processing on the output of the imaging device 100 included in each of the smart cameras and the operation of the imaging device 100. In the example in FIG. 10, the host unit 140*a* includes an MCU 141 as a processor, and the host unit 140*b* includes an MPU 142 as a processor. In addition, the host unit 140*c* includes the MPU 142 and an accelerator (ACCL) 143 as processors. The ACCL 143 is a hardware circuit capable of the DNN process.

The MCU 141 and the MPU 142 included in the host units 140*a* and 140*b* may each include the function of the second processor 12. In addition, the MPU 142 and the ACCL 143 included in the host unit 140*c* may include, in cooperation or either one, the function of the second processor 12.

In the following description, unless otherwise specified, the smart camera 1100*a* among the smart cameras 1100*a*, 1100*b*, and 1100*c* will be described as a target device on which the DNN 50 is mounted.

In FIG. 10, the network controller 20 includes an optimization unit 220, a device setting database 221, a compatibility test processing unit 222, a packager 223, a DNN execution unit 224, a CIS converter 225, and a host DNN converter 226. Note that, among these, the device setting database 221 and the DNN execution unit 224 may be external configurations of the network controller 20.

The CIS converter 225 converts the input DNN into a format that can be executed by the DNN processor 1110. At this time, the CIS converter 225 calculates a key performance indicator (KPI) when processing by the input DNN is executed on the DNN processor 1110. The key performance indicator calculated here is performance (required performance) required for processing by the input DNN.

The host DNN converter 226 converts the input DNN into a format that can be executed by the host unit 140*a* (MCU 141).

The device setting database 221 stores target device capability information indicating the capability of a target device.

The DNN 50 to be operated in the smart camera system 2 is input to the optimization unit 220.

The optimization unit 220 uses the optimization algorithm 230 to determine which part of the input DNN 50 is to be operated on which hardware component on the smart camera system 2. The optimization algorithm 230 also considers requirements (application elements) for an application that uses an output of processing by the DNN 50, in addition to the capabilities of each hardware (hardware elements), to efficiently divide the DNN 50. Examples of the application element include a frame rate and transmission size required by the application and cost between components in the application.

More specifically, the optimization unit 220 delivers the input DNN 50 to the CIS converter 225. The CIS converter 225 obtains the key performance indicator based on the DNN 50 transferred and returns the key performance indicator to the optimization unit 220.

In addition, a target device type, an application parameter, and a user flag are input to the optimization unit 220.

The target device type indicates a type of the target device. The application parameter is a parameter for specifying a requirement for the output in an application that uses the output of the target device. The application parameter includes, for example, at least one of a frame rate of the output of the target device, a total processing time in the application for the output, and other constraints in the application.

The user flag specifies whether or not the user has priority when executing the DNN on a specific component in the smart camera system. For example, the user flag specifies whether the DNN is executed only by the DNN processor 1110 of the smart camera 1100*a*, only by the host unit 140*a*, by the DNN processor 1110 and the host unit 140*a*, or by the host unit 140*a* and the cloud network.

Designation by the user flag is necessary, for example, when an application used by the user emphasizes privacy with respect to the output of the smart camera 1100*a* and it is desired to execute processing by the DNN only on a specific component such as the DNN processor 1110 (imaging device 100).

The target device type, the application parameter, and the user flag may be specified by the user.

Further, the optimization unit 220 acquires target device capability information from the device setting database 221. The target device capability information includes various information regarding the target device (referred to as the smart camera 1100*a*).

The target device capability information may include, for example, at least one of the following pieces of information.

- Hardware capability such as a type of processor (CPU, MPU, MCU) in the host unit 140*a* of the target device and an operating frequency.
- Power constraint of the target device.
- Interface type (SPI and/or MIPI) between the host unit 140 of the target device and the imaging device 100 and specifications thereof.
- Whether a DNN accelerator is available in the host unit 140*a* and specifications thereof if available
- Runtime memory available when executing the DNN.
- Software functions such as library, framework, single or multi-thread, applied to the host unit 140*a*.
- Transfer speed and the like of an interface (wired, wireless) between the host unit 140*a* and the cloud network (server)
- Execution accuracy of a DNN layer type. The overall accuracy of the DNN can be improved by causing a hardware accelerator that performs a fixed point operation to execute some layers performing processing such as convolution, and causing the cloud network or the MPU to execute a floating point operation in some layers performing processing that requires higher accuracy.

The optimization unit 220 determines which part of the DNN 50 is operated on which hardware component in the smart camera system 2 by using the optimization algorithm 230 based on each piece of information (target device type, application parameter, user flag, target device capability information, key performance indicator) described above. The optimization unit 220 divides the DNN 50 according to this determination.

For example, the optimization unit 220 divides the DNN 50 into a first network executed by the DNN processor 1110, a second network executed by the host unit 140*a* (MCU 141), and a third network executed by a server or a cloud network. Here, the optimization unit 220 can determine a division position of the DNN 50 so that, for example, the divided first network and second network can be processed temporally continuously by a pipeline process.

In the compatibility test processing unit 222, compatibility of the first, second, and third networks into which the DNN 50 is divided by the optimization unit 220 with each component (DNN processor 1110, host unit 140*a* (MCU 141), server, or cloud network) to which the first, second, and third networks are applied is tested by a DSP process 240, a host unit process 241, and a server process 242, respectively. For example, the compatibility test processing unit 222 may execute each test by simulation.

In addition, the compatibility test processing unit 222 obtains a key performance indicator (KPI) based on a test result and presents the obtained key performance indicator to, for example, the user.

The CIS converter 225 converts the first network determined to have no problem in compatibility by the DSP process 240 into a format that can be executed by the DNN processor 1110. The host DNN converter 226 converts the second network determined by the host unit process 241 to have no problem in compatibility into a format that can be executed by the host unit 140*a* (MCU 141).

The packager 223 encrypts and packages the first network converted by the CIS converter 225 and the second network converted by the host DNN converter 226, and transmits the first network and the second network to the smart camera 1100*a*. In addition, the packager 223 passes the third network, which is determined to have no problem in compatibility by the server process 242, to the DNN execution unit 224.

The smart camera 1100*a* transfers the converted first network passed from the packager 223 to a memory connected to the DNN processor 1110, and mounts the first network on the DNN processor 1110. Similarly, the smart camera 1100*a* transfers the converted second network transferred from the packager 223 to the host unit 140*a*, and mounts the second network on the host unit 140*a* (MCU 141).

Figure 11:
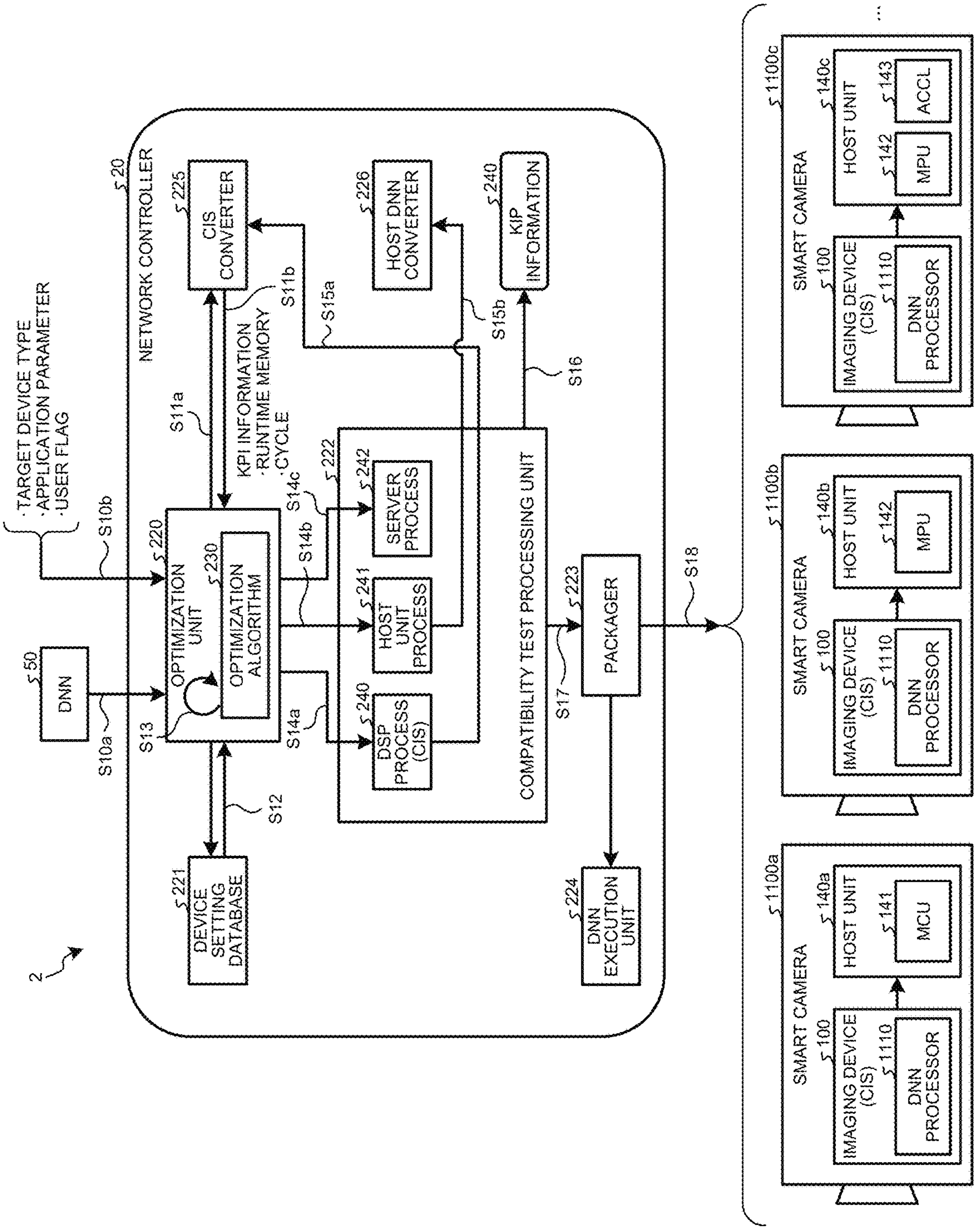
FIG. 11 is a schematic diagram illustrating a flow of the process according to the second embodiment.

FIG. 11 is a schematic diagram illustrating a process flow according to the second embodiment. Note that each unit in FIG. 11 is the same as each unit in FIG. 10 described above, and thus description thereof is omitted here.

In Step S10*a*, the DNN 50 is input to the optimization unit 220. In addition, in Step S10*b*, the target device type, the application parameter, and the user flag are input to the optimization unit 220. In Step S11*a*, the optimization unit 220 passes the DNN 50 to the CIS converter 225. The CIS converter 225 calculates the key performance indicator based on the transferred DNN 50. The calculated key performance indicator may include information indicating a runtime memory capacity required and an execution cycle when executing a process by the DNN 50. The CIS converter 225 returns the calculated key performance indicator to the optimization unit 220 (Step S11*b*).

In Step S12, the optimization unit 220 acquires the target device capability information of the target device (smart camera 1100*a* in this example) from the device setting database 221.

In Step S13, the optimization unit 220 uses the optimization algorithm 230 to determine efficient arrangement of the DNN 50 for each hardware component in the smart camera system 2 based on each piece of information acquired in Step S10*b* and the target device capability information acquired in Step S12.

The optimization unit 220 determines the arrangement in consideration of not only each independent piece of information but also a combination thereof. For example, the optimization unit 220 may consider a transfer data size and a transfer speed in data transfer between the DNN processor 1110 in the smart camera 1100*a*, the host unit 140*a*, and the cloud network or the server, and a total latency by an application executed by the application execution unit 30.

The optimization unit 220 divides the DNN 50 into a plurality of subnetworks (e.g. first, second and third networks) by the optimization algorithm 230. The optimization unit 220 allocates arrangement of the divided subnetworks to respective hardware components of the smart camera system 2. The key performance indicator when executing each subnetwork can be obtained by a simulator for each hardware component.

Figure 12:
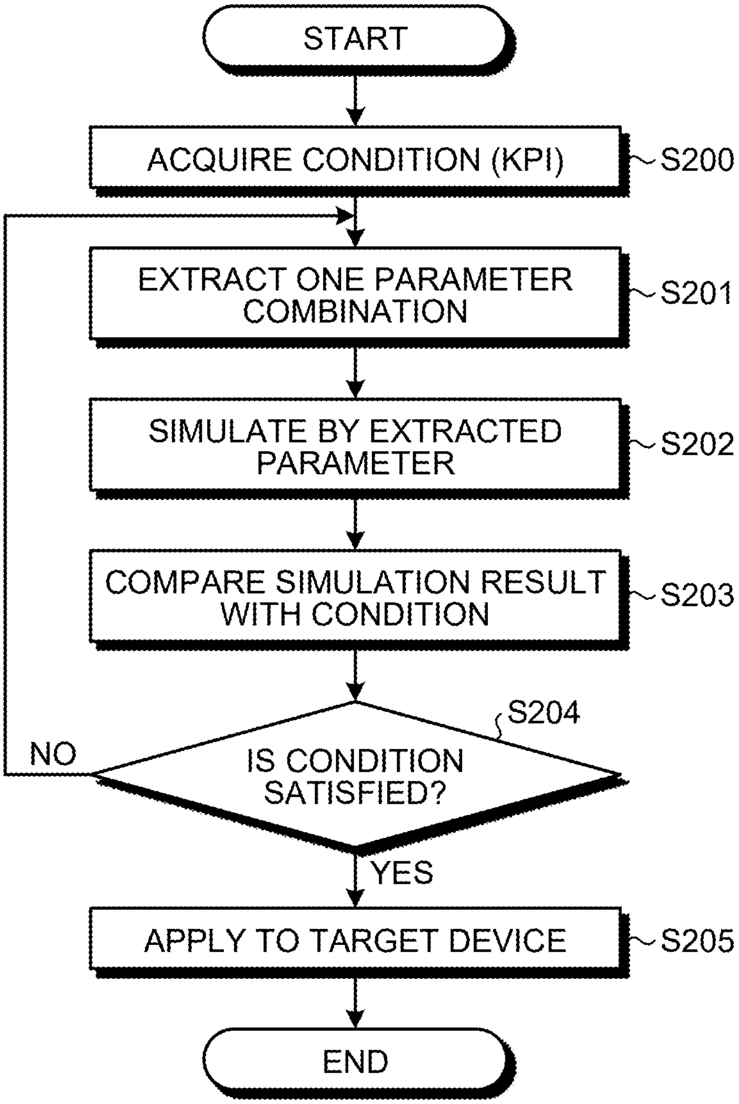
FIG. 12 is a flowchart illustrating an example of compatibility test processing by a compatibility test processing unit according to the second embodiment.

FIG. 12 is a flowchart illustrating an example of a compatibility test process by the optimization unit 220 according to the second embodiment.

In Step S200, the optimization unit 220 acquires the key performance indicator (KPI) acquired from the CIS converter 225 in Step S12*b* as a condition.

In next Step S201, the optimization unit 220 extracts one combination of parameters using each piece of information acquired in Step S10*b* and each piece of target device capability information acquired in Step S12 as parameters. In next Step S202, the optimization unit 220 executes simulation when each subnetwork is executed in each hardware component by the combination of the extracted parameters (DSP process 240, host unit process 241, and server process 242).

In next Step S203, the optimization unit 220 compares the key performance indicator obtained by the simulation with the key performance indicator acquired as a condition in Step S200.

In next Step S204, the optimization unit 220 determines whether or not the key performance indicator obtained in Step S202 satisfies the condition based on a comparison result in Step S203. When determining that the key performance indicator obtained in Step S202 does not satisfy the condition (Step S204, "No"), the optimization unit 220 returns the process to Step S201 and extracts one unprocessed combination of parameters.

On the other hand, when the optimization unit 220 determines in Step S204 that the key performance indicator obtained in Step S202 satisfies the condition (Step S204, "Yes"), the process proceeds to Step S205. In Step S205, the optimization unit 220 applies each subnetwork to each hardware component whose arrangement has been determined.

After the process in Step S205, a series of processes according to the flowchart of FIG. 12 ends.

FIG. 13 is a schematic diagram for more specifically illustrating an optimization process by the optimization unit 220. In FIG. 13, it is assumed that the DNN is initially divided into the first network mounted on the DNN processor 1110 and the second network mounted on the host unit 140*a* or the server as illustrated in Section (a). Note that the DNN processor 1110 can use 8 MB of the capacity of a connected memory, and the host unit 140*a* or the server can use up to 3 MB of the capacity of the memory.

In an example in Section (a), the DNN is divided into the first network and the second network immediately after a layer N. Here, it is assumed that a transfer size of the layer N is 256 pixels×256 pixels×32 bits, and the layer N−1 (Layer N−1) immediately before the layer N has a size of 64 pixels×64 pixels×32 bits. In other words, in the example in the section (a), data of 256 pixels×256 pixels×32 bits=2097152 bits is transferred from the DNN processor 1110 to the host unit 140*a* or the server.

Section (b) illustrates an example of a case where optimization is performed on the state of Section (a). In an example in Section (b), a division position of the DNN is changed to a position immediately before the layer N (between the layer N and the layer N−1). The last layer of the first network is the layer N−1, and data of 64 pixels×64 pixels×32 bits=131072 bits is transferred from the DNN processor 1110 to the host unit 140*a* or the server. Therefore, in the example in Section (b), an amount of data to be transferred is 1⁄16 as compared with the case of Section (a).

Returning to the description of FIG. 11, the optimization unit 220 passes each subnetwork whose arrangement has been determined to the compatibility test processing unit 222 (Step S14*a*, Step S14*b*, and Step S14*c*). The compatibility test processing unit 222 tests compatibility of each of the subnetworks delivered with the hardware component allocated thereto.

For example, the compatibility test processing unit 222 simulates an operation when each subnetwork is executed in each hardware component, and calculates an approximate key performance indicator of the execution. The compatibility test processing unit 222 compares the calculated key performance indicator with the key performance indicator acquired from the CIS converter 225 in Step S12*b*, and determines whether or not each subnetwork can be arranged in each hardware component.

The compatibility test processing unit 222 delivers the subnetwork (first network) determined to have no problem in compatibility as a result of the test to the CIS converter 225 (Step S15*a*). The CIS converter 225 converts the subnetwork passed into a format that can be executed by the DNN processor 1110.

In addition, the compatibility test processing unit 222 passes a subnetwork (second network) determined to have no problem in compatibility as a result of the compatibility test to the host DNN converter 226. The host DNN converter 226 converts the subnetwork passed into a format that can be executed by the host unit 140*a* (MCU 141).

Further, the compatibility test processing unit 222 presents the key performance indicator calculated by the compatibility test to, for example, the user (Step S16). The user may determine a result of the compatibility test based on the key performance indicator presented.

FIG. 14 is a schematic diagram illustrating an example of the key performance indicator presented to the user. As illustrated, the key performance indicator includes performance required for hardware on which DNN is executed, such as required power per frame, a processing cycle, a variable memory size, and a runtime memory size. In addition, the key performance indicator also includes information on layers in the DNN such as a layer-wise memory, a processing type of each layer, a used memory, a processing cycle, and required power.

The compatibility test processing unit 222 passes the subnetwork (first network) converted by the CIS converter 225 and the subnetwork (second network) converted by the host DNN converter 226 to the packager 223 (Step S17). The packager 223 encrypts and packages each subnetwork passed from the compatibility test processing unit 222, and transmits the encrypted and packaged subnetworks to the smart camera 1100*a* (Step S18). In addition, the packager 223 passes, to the DNN execution unit 224, a subnetwork (third network) that is determined by the server process 242 to have no problem in compatibility.

2-3. Effects According to Second Embodiment

Next, effects according to the second embodiment will be described.

Figure 15:
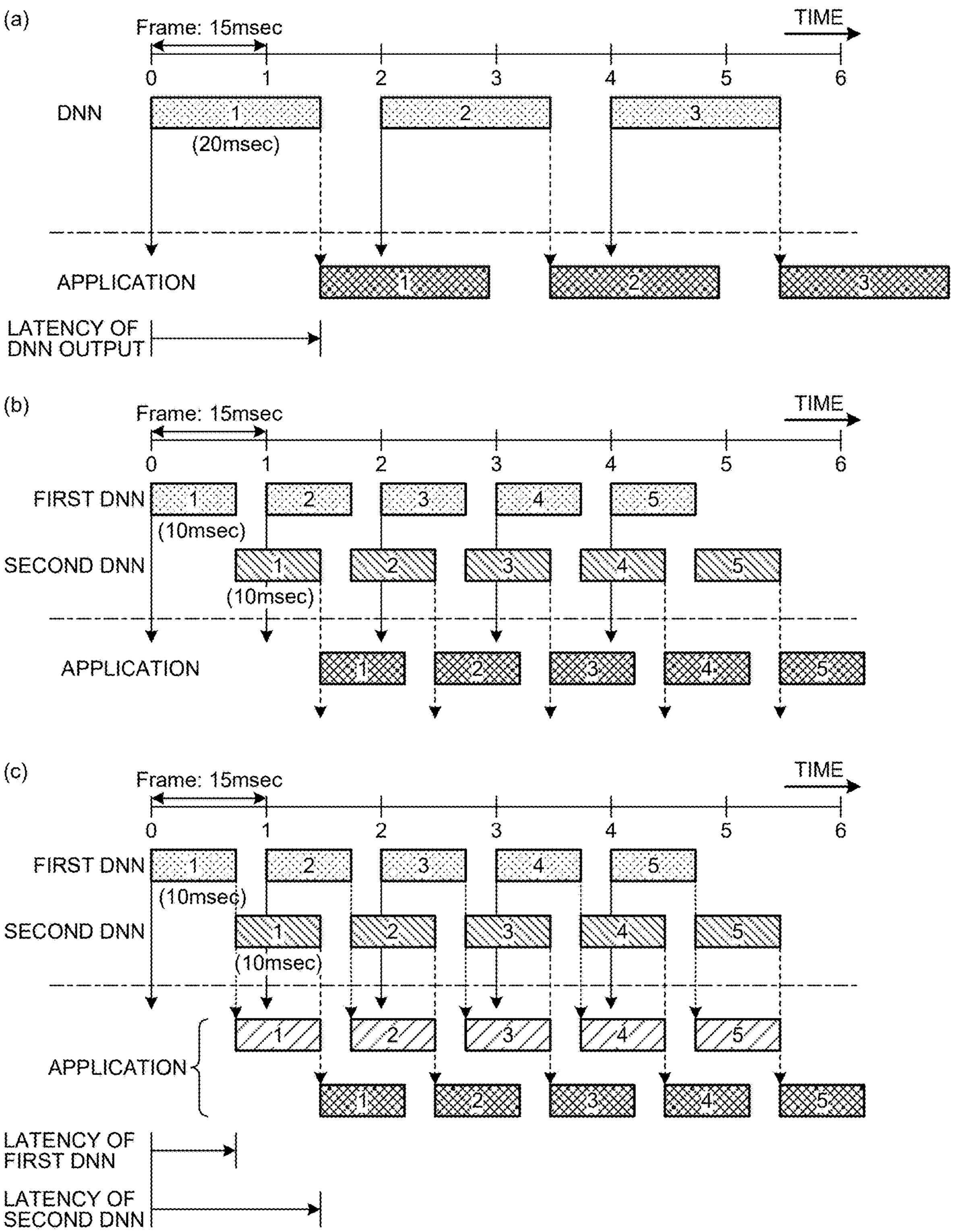
FIG. 15 is a schematic diagram comparing a process sequence according to an existing technology and a process sequence according to the second embodiment.

FIG. 15 is a schematic diagram comparing a process sequence according to the existing technology and a process sequence according to the second embodiment. In FIG. 15, Section (a) illustrates an example of the process sequence according to the existing technology. Sections (b) and (c) illustrate an example of a process sequence according to the second embodiment.

In Sections (a) to (c) of FIG. 15, a horizontal axis indicates a passage of time. As illustrated in an upper part of Sections (a) to (c), the frame rate is 15 msec. Therefore, the number of frames N that can be output by the imaging device 100 per 1 sec is 66 (=1000/15). Furthermore, a numerical value of the scale indicating the upper frame represents timing at which the imaging device 100 outputs frame-like information as a count value (to be precise, count value−1) of the frame.

Processing by Existing Technology

First, processing according to the existing technology will be described with reference to Section (a) of FIG. 15. Here, the smart camera 1100 illustrated in FIG. 9 will be described. Note that, in Section (a), a length of the band indicated as the DNN represents a length of time required for processing by the DNN.

In the existing technology illustrated in Section (a) of FIG. 15, when information for one frame input to a DNN (DNN processor 1110) in the imaging device 100 is time required for processing by the DNN, time longer than a frame interval that can be originally output by the imaging device 100 (15 msec in the example illustrated in FIG. 15) is required (20 msec in the example illustrated in FIG. 15). Therefore, a band indicating processing by the DNN extends longer than the frame interval that can be output by the imaging device 100.

The existing technology illustrated in Section (a) of FIG. 15 illustrates processing in which one DNN processor 1110 is used as a processor for executing the DNN, and the DNN processor 1110 uses the DNN. Here, Section (a) illustrates sequential processing, for example, "when a process for the m-th frame is completed, a process for the (m+1)-th frame is started, and when a process for the (m+1)-th frame is completed, a process for the (m+2)-th frame is performed".

In Section (a) of FIG. 15, dotted arrows extending downward in the drawing from a rear end of each band indicating a DNN process represents timing at which the DNN processor 1110 outputs a result of executing processing using the DNN. In other words, according to the timing of the dotted arrow, output data is transmitted from the smart camera 1100 to, for example, an application executed in another information processing apparatus.

In Section (a) of FIG. 15, a solid arrow extending downward in the drawing from the tip of each band indicating the DNN process indicates timing to output the input data to the DNN processor 1110 in a form of a system that also outputs the data used for the DNN process (input data to the DNN process) when outputting the result of the DNN process.

The existing technology illustrated in Section (a) of FIG. 15 includes:

(1) An example in which time longer than a frame interval that can be originally output by the imaging device 100 is required as time required for processing by the DNN processor 1110, and (2) An example of sequential processing of performing processing for one frame and then performing processing for a next frame.

Therefore, an interval at which the processing result using the DNN processor 1110 is output (interval of the dotted arrows) is 30 msec, i.e., twice the frame interval (15 msec) that the imaging device 100 can originally output. The number of frames (frame rate) of the DNN processing result that can be output by the DNN processor 1110 per unit time (for example, 1 sec) is ½ of a frame rate R that can be originally output by the imaging device 100, i.e., R/2. When the DNN processing result is output, the frame rate at which the input data used for the DNN process is output is also R/2.

Effect of Processing According to Second Embodiment on Frame Rate

Next, an effect of the processing according to the second embodiment on the frame rate will be described with reference to Section (b) in FIG. 15. Here, the smart camera **1100*a* illustrated in FIG. 10** will be described.

Section (b) in FIG. 15 illustrates an example of a process sequence according to the second embodiment. In Section (b), the DNN process is divided into processing by the first network (first DNN) and processing by the second network (second DNN). In Section (b), lengths of the bands indicated as the first DNN and the second DNN represent the lengths of time required for processing by the first DNN and the second DNN, respectively. Since meaning of other part is the same as those of Section (a), the description thereof will be omitted here.

In the second embodiment, the smart camera **1100*a*** includes a plurality of processors capable of processing by DNNs, and the plurality of processors executes processing using DNNs in a pipeline. The pipeline process by the plurality of processors can be commonly applied to the first embodiment described above and third to fifth embodiments described later.

As an example of performing the pipeline process using a plurality of processors, Section (b) of FIG. 15 illustrates an example in which processing performed using the DNN is divided into two in the time direction and the pipeline process is performed using two processors.

Specifically, the DNN process is performed on information of one frame input from the imaging unit 111 in the imaging device 100 by using the first processor (e.g., the DNN processor 1110 included in the imaging device 100) and the second processor (e.g., the MCU 141 included in the host unit **140*a*). The total time required for this processing is 20 msec, which is the same as in the case of the existing technology illustrated in Section (a) of FIG. 15**.

Note that the first processor and the second processor can respectively correspond to the first processor 11 and the second processor 12 described with reference to FIG. 1 in the first embodiment.

This DNN process is divided into a first DNN process executed by the first processor and a second DNN process executed by the second processor. Here, time required for the first DNN process and time required for the second DNN process are each 10 msec, which is shorter than the frame interval that can be output by the imaging device 100.

For the first frame input from the imaging unit 111 in the imaging device 100, first, the first processor (DNN processor 1110) executes the first DNN process, and then, the second processor (MCU 141 of the host unit **140*a***) executes the second DNN process. In this case, in a time zone overlapping with at least a part of time zone in which the second processor executes the second DNN process on the first frame, a so-called pipeline process in which the first processor executes the first DNN process on the second frame to be the next frame in parallel is executed.

The dotted arrow extending downward from the rear end of each band indicating the second DNN process in Section (b) of FIG. 15 indicates timing at which the second processor outputs the result of executing the second DNN process, similarly to the dotted arrow extending downward from the rear end of each band of the DNN process in Section (a) of FIG. 15. In other words, according to the timing of the dotted arrow, output data is transmitted from the smart camera **1100*a*** to, for example, an application executed in another information processing apparatus.

In Section (b) of FIG. 15, a solid arrow extending downward from the tip of each band indicating the first DNN process represents timing of outputting the data in the form of the system that also outputs the data used for the DNN process (input data to the DNN process) when outputting the result of the DNN process.

In the existing technology described using Section (a) of FIG. 15, when a time longer than the frame interval that can be originally output by the imaging device 100 is required as the time required for the DNN process, the DNN processing can be executed only at the frame interval (low frame rate) longer than the frame interval that can be originally output by the imaging device 100. On the other hand, in the second embodiment described with reference to Section (b) of FIG. 15, this DNN process is divided into a plurality of pieces and the pipeline process is performed by a plurality of processors. As a result, in the second embodiment, the DNN process can be executed at a shorter frame interval (higher frame rate) than in the existing technology.

In particular, in the case of the example illustrated in Section (b) of FIG. 15, the frame interval at which the DNN process is output, indicated by the dotted arrow at the rear end of each band of the second DNN process, can be made the same as the frame interval (15 msec) that can be originally output by the imaging device 100. In other words, the number of frames (frame rate) that can be output per unit time (for e.g., 1 sec) by the processor that executes the DNN process can be the same as the number of frames that can be output per unit time by the imaging device 100.

In a form in which not only the result of the DNN process but also the input data used for the DNN process is output together, an interval of outputting the input data used for the DNN process indicated by the solid arrow at the tip of each band of the first DNN process is also the same as the frame interval that can be originally output by the imaging device 100. Therefore, the frame rate at which the input data is output is also the same as the frame rate at which the imaging device 100 outputs data.

The second embodiment includes the plurality of processors, and the plurality of processors is configured to execute the process using DNNs in the pipeline. As a result, in the second embodiment, it is possible to increase the frame rate at which the process using the DNN is performed and the frame rate at which the processing result is output, with respect to the existing technology not having this configuration. In other words, with respect to the existing technology, the second embodiment can shorten the time from the start of the process using the DNN to the output of the processing result of the process.

Effect on Latency of Processing According to Second Embodiment

Next, an effect on latency of processing according to the second embodiment will be described with reference to Section (c) in FIG. 15. In Section (c) of FIG. 15, meaning of a portion other than a portion in which a process by the application according to the result of the first DNN process is added to Section (b) of FIG. 15 described above is common to Section (b), and thus individual description is omitted. Here, the smart camera 1100*a* illustrated in FIG. 10 will be described.

In the second embodiment, the plurality of processors is provided, and the plurality of processors is configured to execute processing using DNNs in the pipeline, so that latency caused by performing the DNN process can be reduced as compared with the existing technology that does not have this configuration.

More specifically, in the second embodiment, the "Time required from when a sensing device (for example, the imaging device 100) outputs data that is a sensing result to when the data is processed by a first processor that performs DNN processing and the processing result is output to a subsequent stage that uses the processing result" can be reduced.

Here, as processing using the DNN according to the second embodiment, a process of detecting and discriminating an object existing in front of a vehicle in a vehicle that performs automatic driving will be described as an example.

In this example, the following processes (a) and (b) are executed as the process of detecting and discriminating the object.

(a) A process in which the sensing device (e.g., smart camera 1100*a*) detects an object to be subjected to a brake operation by an own vehicle in data obtained by observing a front surface of a vehicle (own vehicle) on which the sensing device is mounted during automatic driving.

(b) When there is an object to be subjected to the brake operation, the process of discriminating a type of a detected object according to what kind of object (e.g., whether the vehicle is a pedestrian or a vehicle different from the own vehicle) such that the host vehicle during autonomous driving can control the next travel.

In the case of the existing technology illustrated in Section (a) of FIG. 15, the latency for the subsequent stage is from when the imaging device 100 outputs the data of the first frame to when the processor to which the data is input finishes the processing by the DNN including the above-described processes (a) and (b) for the first frame and outputs the result to the subsequent stage of the processor (travel controller that controls the travel of the own vehicle). In Section (a) of FIG. 15, the latency is from a head timing of the DNN process to which number #1 is assigned to a timing of the rear end of the DNN process.

On the other hand, in the case of the second embodiment illustrated in Section (c) of FIG. 15, when the first processor (e.g., DNN processor 1110) ends the first DNN process on the first frame input to the first processor, the processing result of the processing by the first DNN can be output from the first processor to the subsequent stage of the smart camera 1100*a* including the first processor (travel controller that controls the travel of the own vehicle). The information output from the first processor may be, for example, a feature map indicating that there is an object to be subjected to the brake operation, or information indicating that there is at least an object to be subjected to the brake operation.

After the first DNN process, at a time point when the second DNN process executed by the second processor is completed, a result of discriminating the type of the detected object can be output to the travel controller that controls the travel of the own vehicle. When receiving the processing result of the first DNN process, the travel controller can start the brake operation of the own vehicle. Therefore, from when the smart camera 1100*a* outputs the data of the first frame to when the first processor outputs the result of the first DNN process for the first frame is latency for the travel controller (latency of the first DNN in the drawing).

As described above, the second embodiment includes the plurality of processors, and the plurality of processors is configured to execute processing using DNNs in the pipeline. As a result, the latency can be reduced (shortened) as compared with the existing technology described using Section (a) of FIG. 15. In other words, with respect to the existing technology, the second embodiment can shorten the time from the start of the process using the DNN to the output of the processing result of the process.

3. Third Embodiment

Next, a third embodiment of the present disclosure will be described. In the third embodiment, a network is divided into a plurality of networks based on functions in each unit of the network.

3-1. Existing Technology

Prior to the description of the third embodiment, an existing technique related to the third embodiment will be described for easy understanding.

Generally, while the DNN process has a large calculation cost, calculation resources are limited in edge devices. As a result, there are the following problems.

A model size tends to be larger as the model can perform complex and advanced DNN process.

It is difficult to operate a large-sized model on edge devices.

The DNN process that can be processed by the edge device is limited by hardware constraints of the edge device.

The edge device is a terminal information device connected to the Internet. Examples of the edge device include a monitoring camera that transmits information such as image data via the Internet, an electronic device provided in a home appliance and having a communication function with respect to the Internet, and the like.

In order to overcome these problems, many methods for creating a lightweight and high-performance model using data quantization and the like have been proposed, but the DNN process that can be performed by the edge device is still limited.

Therefore, when a high-performance DNN process is performed, data acquired by an edge device is transmitted to a device such as a server having a relatively large amount of calculation resources, and the process is performed there. However, there are many problems such that a communication band becomes a bottleneck or data including personal information needs to be added to communication. In particular, in image processing that tends to require a large amount of calculation resources, this problem becomes more obvious.

Figure 16:
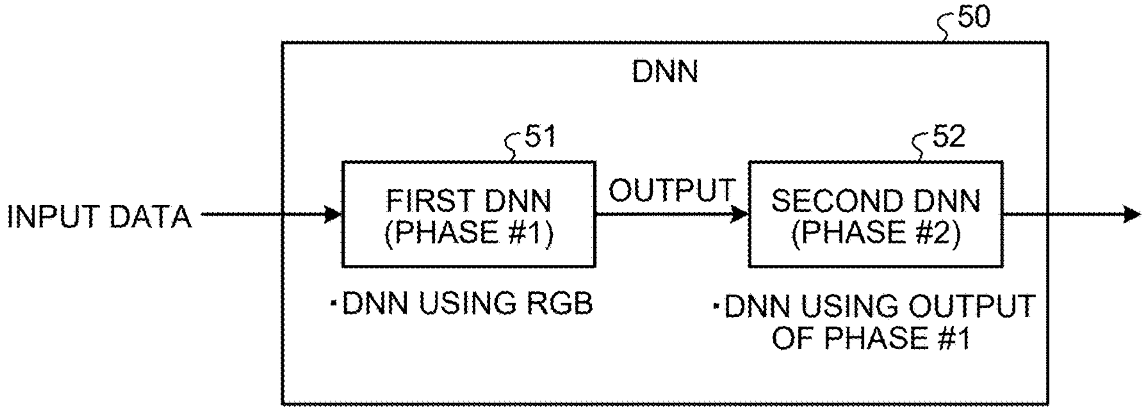
FIG. 16 is a schematic diagram schematically illustrating an example in which a DNN is divided into two DNNs that are a first DNN and a second DNN.

FIG. 16 is a schematic diagram schematically illustrating an example in which the DNN 50 is divided into two DNNs of a first DNN 51 and a second DNN 52. In this example, as the input data in the imaging device 100 illustrated in FIG. 3, for example, a captured image output from the imaging processing unit 112 is assumed.

In the example in FIG. 16, the first DNN 51 executes a process on the RGB image as a process of a first phase (described as phase #1 in the drawing) on the input data. The second DNN 52 executes a predetermined process on the output of the first phase, i.e., the first DNN 51. The processing result of the second DNN 52 is output to the outside as output data.

Figure 17:
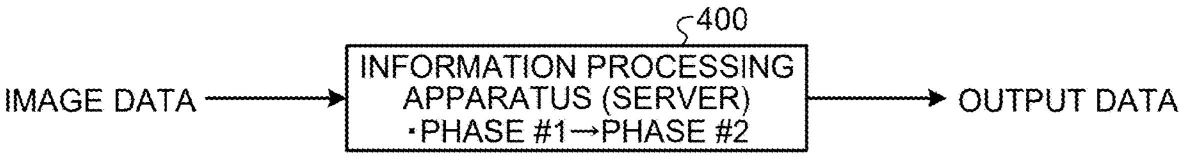
FIG. 17 is a schematic diagram illustrating an example of a configuration according to the existing technology for executing processing by the first DNN and the second DNN obtained by dividing the DNN.

FIG. 17 is a schematic diagram illustrating an example of a configuration according to the existing technology for executing a process by the first DNN 51 and the second DNN 52 obtained by dividing the DNN. In FIG. 17, the input data is, for example, image data output from the edge device. In the existing technology, the processes of the first phase and the second phase by the first DNN 51 and the second DNN 52 in the DNN 50 are executed in one information processing apparatus 400 such as a server.

In other words, in the existing technology, when the plurality of processes is performed in one or more DNN processes, data acquired by the edge device is transferred to a single device (information processing apparatus 400 in this example) having a lot of calculation resources, particularly memories, and the DNN process is performed. In this case, since the image data has a relatively large amount of data transferred in a unit time, the communication band used for data transfer may become a bottleneck of the transfer speed. In addition, the image data may include personal information such as a face.

3-2. Schematic Configuration According to Third Embodiment

Figure 18:
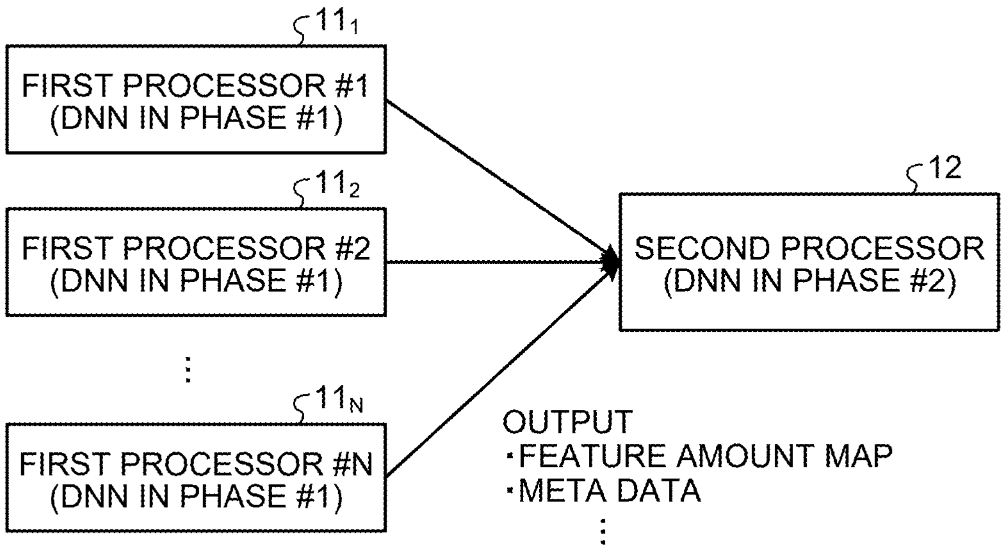
FIG. 18 is a schematic diagram schematically illustrating a configuration of an information processing system according to a third embodiment.

A schematic configuration according to the third embodiment will be described. FIG. 18 is a schematic diagram schematically illustrating a configuration of an information processing system according to a third embodiment. Note that the configuration illustrated in FIG. 16 is applied to the configuration of the DNN. Furthermore, in the third embodiment, the configuration described with reference to FIG. 5 in the first embodiment can be applied as the network controller 20 that determines the network to be executed in each processor. Note that, in FIG. 18, description of the network controller 20 is omitted.

In FIG. 18, the network controller 20 analyzes a given task and divides the task into processing according to the first phase and processing according to the second phase. The network controller 20 determines, for example, a first processor 111 mounted on the edge device as a processor for executing the DNN process (first DNN 51) according to a task in the first phase. Furthermore, the network controller 20 determines, for example, the second processor 12 mounted on the server as a processor for executing the DNN process (second DNN 52) according to a task in the second phase.

It is assumed that the second processor 12 can use more abundant hardware resources than the first processor 11 and can execute processing at a higher speed and with higher functionality than the first processor 11. As an example, the capacity of the memory that is connected to the second processor 12 and that can be used by the second processor may be larger than the capacity of the memory that is connected to the first processor 11 and that can be used by the first processor. A frequency at which the second processor operates may be higher than a frequency at which the first processor operates.

A processing result of the first processor $\mathbf{11}_1$ is transmitted to the second processor 12. The processing result of the first processor $\mathbf{11}_1$ can be, for example, a feature amount map or metadata obtained by processing of the RGB image by the first DNN 51.

Furthermore, the information processing system according to the third embodiment can include a plurality of first processors $\mathbf{11}_1$, $\mathbf{11}_2$, . . . , and $\mathbf{11}_N$ each executing processing by the first DNN 51. For example, the network controller 20 divides the processing in the first phase into the first DNN process, second DNN process, . . . , and Nth DNN process. The network controller 20 determines the first processors $\mathbf{11}_1$, $\mathbf{11}_2$, . . . , and $\mathbf{11}_N$ as processors for executing the first DNN process, the second DNN process, . . . , and the Nth DNN process, respectively.

In this case, the DNN processes executed by the first processors $\mathbf{11}_1$, $\mathbf{11}_2$, . . . , and $\mathbf{11}_N$ are not necessarily the same, and may be different. For example, processes in the first phases different from each other and having a common process in the second phase may be assigned to the first processors $\mathbf{11}_1$, $\mathbf{11}_2$, . . . , and $\mathbf{11}_N$, respectively. The output of each of the first processors $\mathbf{11}_1$, $\mathbf{11}_2$, . . . , $\mathbf{11}_N$ is transmitted to the second processor 12.

The configuration described with reference to FIG. 1 in the first embodiment can be applied to the configuration of the information processing system according to the third embodiment. In other words, also with reference also to FIG. 16, the information processing system according to the third embodiment includes the first processor 11 that executes the processing by the first DNN 51 and the second processor 12 that executes the processing by the second DNN 52 using the processing result by the first DNN 51. The information processing system according to the third embodiment further includes the network controller 20 that divides the given DNN 50 into the first DNN 51 and the second DNN 52 and allocates the divided DNNs to the first processor 11 and the second processor 12, respectively.

Figure 19:
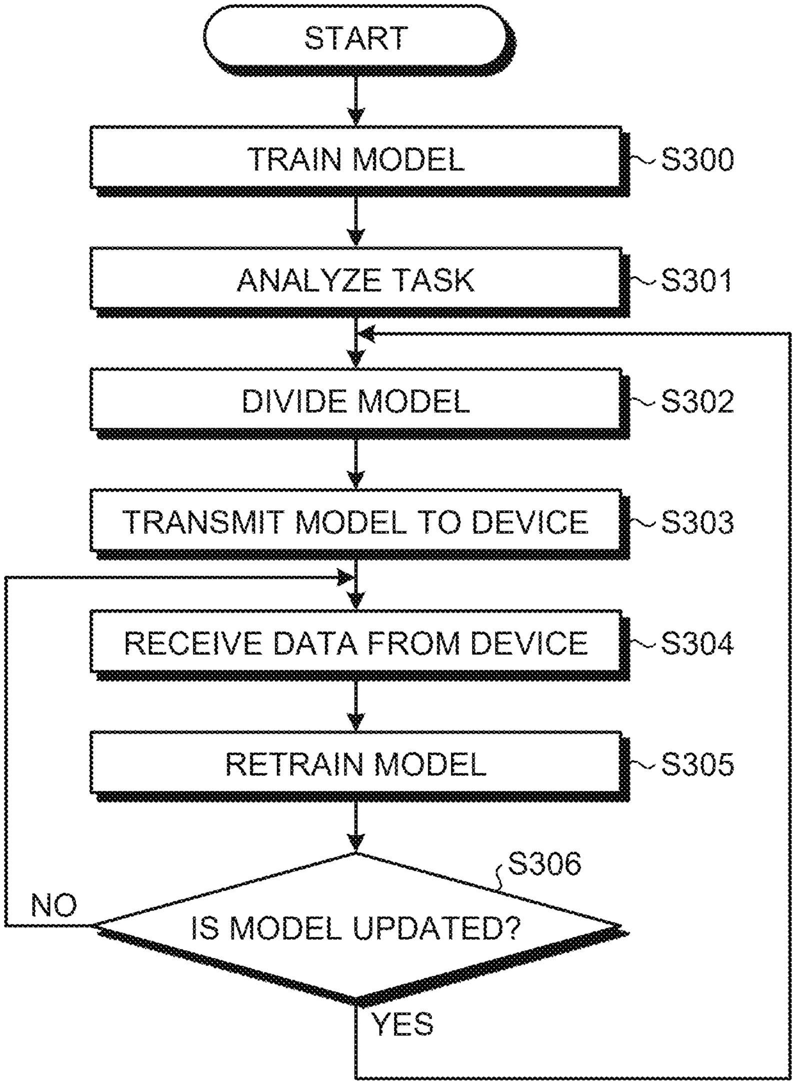
FIG. 19 is a flowchart illustrating an example of processing in a network controller according to the third embodiment.

FIG. 19 is a flowchart illustrating an example of processing in the network controller 20 according to the third embodiment.

In Step S300, the network controller 20 trains a model of the given DNN 50 as necessary. In next Step S301, the network controller 20 analyzes a task executed by the model. In next Step S302, the network controller 20 divides the model based on the result of the task analysis in Step S301.

For example, the network controller 20 extracts, based on the model analysis in Step S301, a layer group related to the processing of the preceding stage and a layer group related to the processing in the subsequent stage that receives the processing result of the preceding stage in each layer configuring the DNN 50. In model division in Step S302, the network controller 20 divides the DNN 50 into a model of a layer group related to the processing in the preceding stage (first DNN 51) and a model of a layer group related to the processing in the subsequent stage (second DNN).

In Step S303, the network controller 20 transmits the divided models to the corresponding devices (processors). The network controller 20 transmits, for example, the model of the layer group related to the processing in the preceding stage to the first processor 11 to which input data is input. In addition, the model of the layer group related to the processing in the subsequent stage is transmitted to the second processor 12 to which the output of the first processor 11 is input.

Devices to which respective models are transmitted execute processing according to each model. Each device may transmit a processing result of the processing according to each model to the network controller 20.

In next Step S304, the network controller 20 receives data (for example, a processing result) transmitted from each device that has transmitted each model. In next Step S305, the network controller 20 retrains the model, i.e., the DNN 50 based on the data transmitted from each device. In Step S305, only a part of the divided network may be retrained.

In next Step S306, the network controller 20 determines whether or not the model has been updated by retraining in Step S305. When the network controller 20 determines that no update has occurred in the model (Step S306, "No"), the process returns to Step S304. On the other hand, when it is determined that the update has occurred in the model, the network controller 20 returns the process to Step S302 and executes the model division on the updated model.

As described above, in the third embodiment, the first DNN 51 and the second DNN 52 obtained by dividing the DNN 50 are executed by different hardware such as the first processor $\mathbf{11}_1$ and the second processor 12. Therefore, in the third embodiment, it is possible to implement execution of a model that is difficult to execute with a single device, reduction in communication bandwidth, improvement in security, and the like. In addition, in the third embodiment, one of the pre-stage processing and the post-stage processing can be made common, and the other can be changed. Furthermore, in the third embodiment, parallel processing is possible in the edge device.

Here, in Patent Literature 1, the DNN process is divided into a preceding stage and a subsequent stage, but the DNN process performed in the preceding stage and the subsequent stage is uniquely fixed. Further, in Patent Document 1, a single process is performed.

On the other hand, in the third embodiment, the network model used in the subsequent stage DNN can be switched according to the processing result of the preceding stage DNN. Furthermore, in the third embodiment, a configuration in which the plurality of DNN models is processed in parallel can be adopted in processing in both the preceding stage and the subsequent stage.

Furthermore, in Patent Literature 1, regarding the division method of the DNN process, the pre-stage processing is convolutional neural network (CNN), and the post-stage processing is long short term memory (LSTM).

On the other hand, in the third embodiment, the DNN process for realizing a function A as a whole can be performed, or the DNN process for realizing a function B as a whole can be performed. When the function A is realized as a whole, a function A #1 obtained by dividing the function A into functions A #1 and A #2 can be executed by the processor #1 (e.g., first processor 11) including hardware resources necessary for executing the function A #1, and the function A #2 can be executed by the processor #2 (e.g., second processor) including hardware resources necessary for executing the function A #2.

Similarly, when the function B is realized as a whole, and the processor #1 is insufficient for hardware resources required for executing a function B #1 of the function B divided into functions B #1 and B #2 but the processor #2 is sufficient, the processor #2 executes the function B #1. Similarly, when the processor #1 is insufficient for hardware resources required for executing the function B #2 but the processor #2 is sufficient, the processor #2 executes the function B #2.

The processor #2 alone can execute the function A and also execute the function B. In this case, when the function A is executed, in order to prioritize a desired characteristic, the function A #1 is executed by the processor #1, and the function A #2 is executed by the processor #2. On the other hand, when the function B is executed, the function B as a whole is executed by the processor #2 without giving priority to the above characteristic.

This a configuration is not disclosed in Patent Literature 1.

3-3. Examples of Third Embodiment

Hereinafter, each example of the configuration according to the third embodiment will be described with reference to FIGS. 20 to 30. Note that the network controller 20 is omitted in FIGS. 20 to 30.

3-3-1. First Example of Third Embodiment

A first example of the third embodiment will be described. The first example of the third embodiment is an example of determining an output of the preceding stage by processing in the subsequent stage when the processing by the second DNN 52 that executes the processing in the second phase that is the subsequent stage is performed using a processing result of the first DNN 51 that executes processing in the first-phase process that is the preceding stage.

Figure 20:
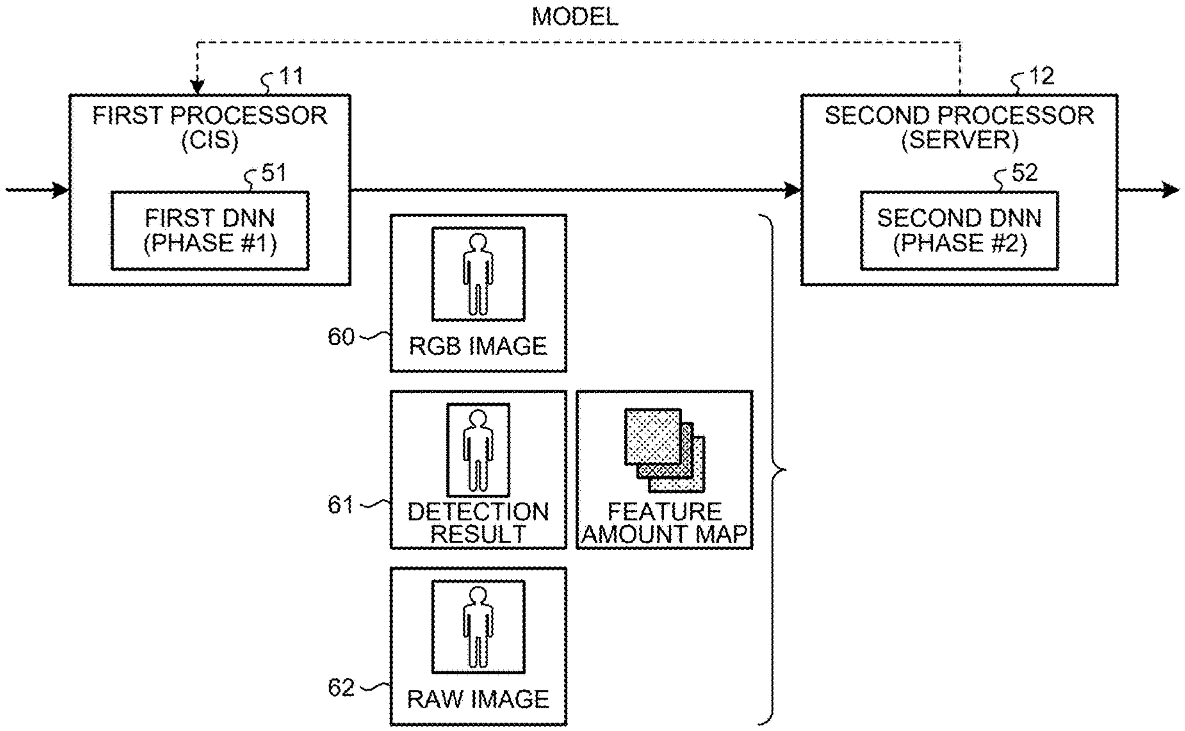
FIG. 20 is a block diagram illustrating a configuration of an example of an information processing system according to a first example of the third embodiment.

FIG. 20 is a block diagram illustrating a configuration of an example of an information processing system according to the first example of the third embodiment. The first processor 11 can correspond to, for example, the CPU 121 and/or the DSP 122 in the imaging device 100 illustrated in FIG. 3. Furthermore, the second processor 12 may be a host unit configured in the same housing as the imaging device 100, or may be configured in an information processing apparatus or a cloud network connected to the imaging device 100 by wired or wireless communication. The configurations related to the first processor 11 and the second processor 12 are common in the following FIGS. 21 to 30.

In the first processor 11, the first-phase process (described as phase #1 in the drawing) is executed by the first DNN 51. In the example in the drawing, the first processor 11 can output three types of data of an input tensor 60, an output tensor 61, and a RAW data 62 according to the model to be applied.

The input tensor 60 is, for example, an RGB image obtained by performing processing such as development of an output of the imaging unit 111 so as to give RGB color information to each pixel. The output tensor 61 is, for example, processing result data obtained by performing processing by the first DNN 51 on the captured image. In the example in the drawing, a detection result obtained by detecting an object (person) based on the image captured by the first DNN 51 is set as the output tensor 61. The output tensor 61 may include, for example, a feature amount map as a detection result. The RAW data 62 is data for which processing such as development is not performed on the output of imaging unit 111.

The second processor 12 performs the second-phase process (described as phase #2 in the drawing) by the second DNN 52. The second processor 12 transmits, to the first processor 11, a model for outputting data required in the second-phase process among the input tensor 60, the output tensor 61, and the RAW data 62. The first processor 11 stores the model transmitted from the second processor 12 in, for example, the memory 123 (see FIG. 3), and applies the model to the first DNN 51.

When the first processor 11 does not need to change the model, the second processor 12 may only specify the type of the output data without transmitting the model to the first processor 11. For example, when the input tensor 60 and the RAW data 62 are required in the second DNN 52, there is a possibility that it is not necessary to change the model in the first processor 11.

Note that, in the configuration of FIG. 20, it is also possible to execute a process of displaying the output of the preceding stage, i.e., the first DNN 51 for debugging.

3-3-2. Second Example of Third Embodiment

Next, a second example of the third embodiment will be described. The second example of the third embodiment is an example of changing the model applied to the second DNN 52 that executes the processing in the second phase that is the subsequent stage.

Figure 21:
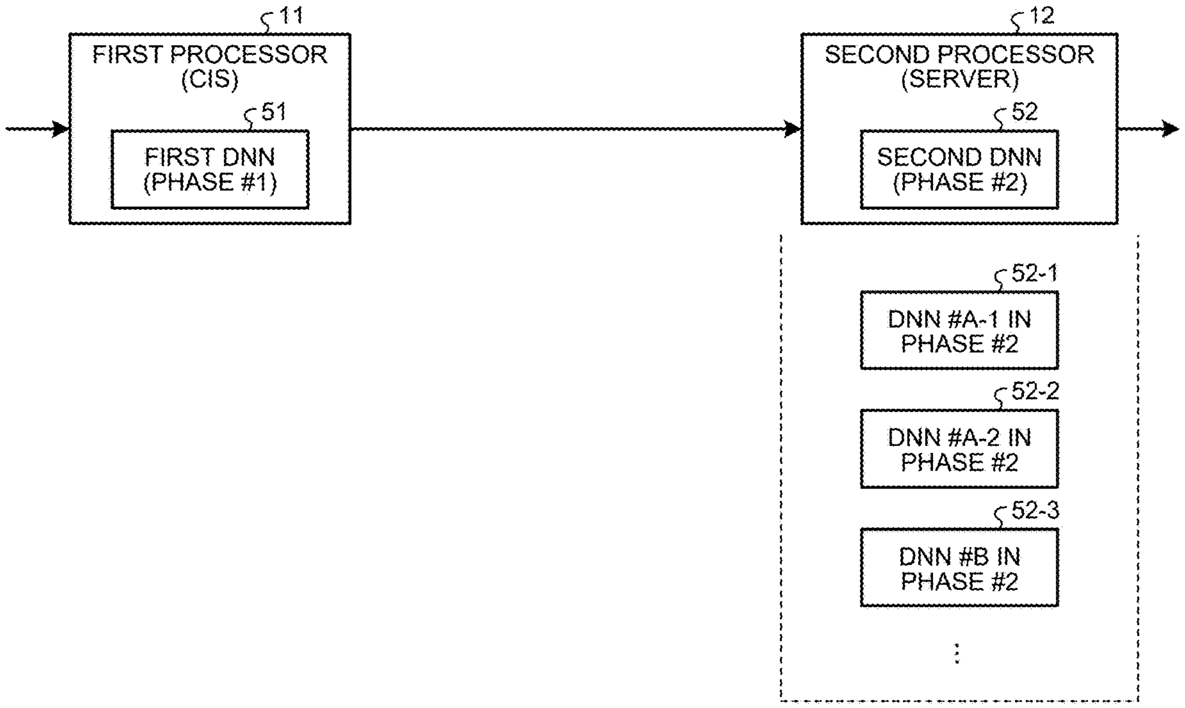
FIG. 21 is a block diagram illustrating a configuration of an example of an information processing system according to a second example of the third embodiment.

FIG. 21 is a block diagram illustrating a configuration of an example of an information processing system according to the second example of the third embodiment. In FIG. 21, the second processor 12 can replace the second DNN 52 mounted with other second DNNs 52-1, 52-2, 52-3, and so on. These second DNNs 52-1, 52-2, 52-3, and so on may implement functions different from those of the second DNN 52, or may be updated after retraining the second DNN 52.

In the example in FIG. 21, the second DNNs 52-1 and 52-2 are updated DNNs (DNN #A-1 and #A-2 in the second phase) after retraining the second DNN 52. On the other hand, the second DNN 52-2 is a DNN for realizing a function different from that of the second DNN 52.

First Specific Example in Second Example of Third Embodiment

A first specific example in the second example of the third embodiment will be described. The first specific example is an example in which the DNN of the subsequent stage, i.e., the second processor 12, is switched according to the processing result of the first DNN 51 in the preceding stage, i.e., the first processor 11.

Figure 22:
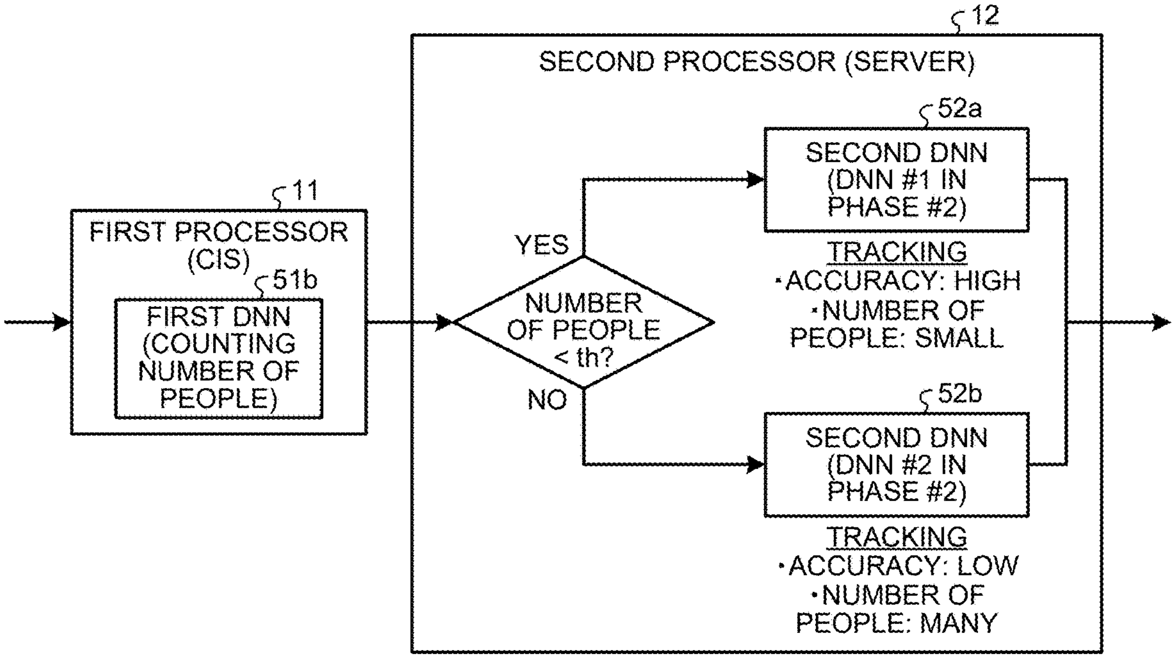
FIG. 22 is a block diagram illustrating a configuration of an example of an information processing system according to a first specific example in the second example of the third embodiment.

FIG. 22 is a block diagram illustrating a configuration of an example of an information processing system according to the first specific example in the second example of the third embodiment. In the example in FIG. 22, in the first processor 11 that performs the pre-stage processing, a first DNN 51*b* executes a process of detecting a person based on the captured image by the imaging unit 111 and counting the number of detected persons as a first-phase process.

The second processor 12 is configured on, for example, a server connected to the first processor 11 via a communication network, and can switch between two second DNNs 52*a* and 52*b* having different functions according to a counting result of the first DNN 51*b*.

More specifically, each of the second DNNs 52*a* and 52*b* executes the tracking process of tracking the detected person based on the result of the person detection by the first DNN 51*b*. In this case, as the first DNN process in the second phase, the second DNN 52*a* executes a first tracking process corresponding to high accuracy but a small number of people. On the other hand, as the second DNN process in the second phase, the second DNN 52*b* executes a second tracking process corresponding to low accuracy but a large number of people.

The second processor 12 compares the number of people counted by the first processor 11 with a threshold th. As a result of comparison, the second processor 12 executes the process by the second DNN 52*a* when the number of people is less than the threshold th (Yes), and executes the process by the second DNN 52*b* when the number of people is equal to or more than the threshold th (No).

The comparison in the second processor 12 may be realized by a program different from the second DNNs 52*a* and 52*b*, or may be included in functions of the second DNNs 52*a* and 52*b*.

Second Specific Example in Second Example of Third Embodiment

A second specific example in the second example of the third embodiment will be described. The second specific example is an example in which a plurality of second DNNs having different functions is executed in parallel in the subsequent stage, i.e., the second processor 12.

Figure 23:
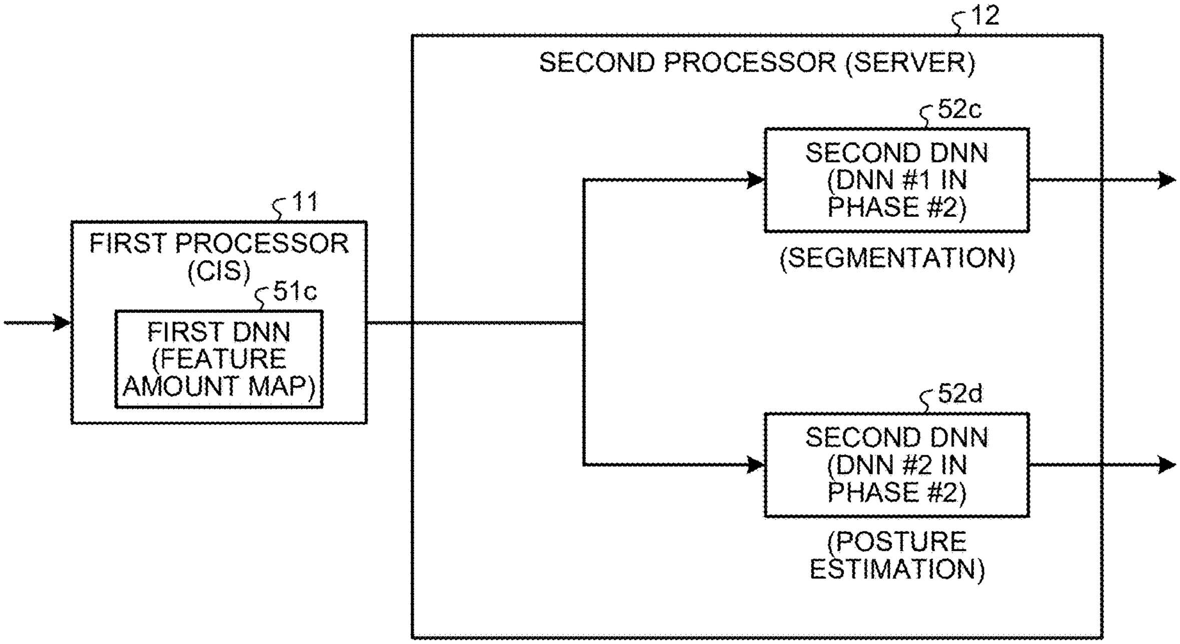
FIG. 23 is a block diagram illustrating a configuration of an example of an information processing system according to a second specific example in the second example of the third embodiment.

FIG. 23 is a block diagram illustrating a configuration of an example of an information processing system according to the second specific example in the second example of the third embodiment. In the example in FIG. 23, in the first processor 11 that performs the pre-stage processing, a first DNN 51*c* generates, as the first-phase process, a feature amount map based on the captured image by the imaging unit 111.

The second processor 12 is configured on, for example, a server connected to the first processor 11 via a communication network, and executes two second DNNs 52*c* and 52*d* having different functions in parallel. In this example, the second DNN 52*c* executes, as the second-phase process, a segmentation process based on the feature amount map generated by the first DNN 51*c*. Furthermore, the second DNN 52*d* executes, as the second-phase process, a posture estimation process based on the feature amount map generated by the first DNN 51*c*.

Figure 24:
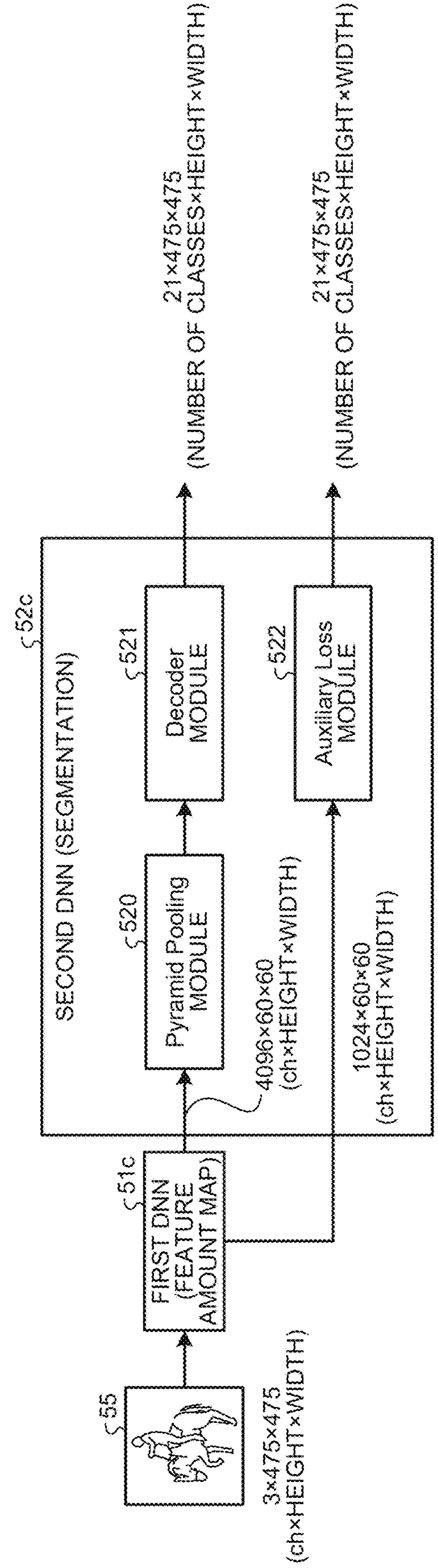
FIG. 24 is a schematic diagram illustrating a segmentation process applicable to the second specific example in the second example of the third embodiment.

FIG. 24 is a schematic diagram illustrating the segmentation process applicable to the second specific example in the second example of the third embodiment. In this example, the segmentation process is executed using PSPNet (pyramid scene parsing network).

In FIG. 24, an image 55 is input to the first DNN 51*c*. The image 55 includes information of three channels (e.g., RGB)×(height) 475 pixels×(width) 475 pixels. The first DNN 51*c* generates the feature amount map based on the image 55. The first DNN 51*c* generates a first feature amount map of 4096 channels×(height) 60 pixels×(width) 60 pixels and a second feature amount map of 1024 channels×(height) 60 pixels×(width) 60 pixels.

The second DNN 52*c* includes a pyramid pooling module 520, a decorder module 521, and an auxiliary loss module 522. The first feature amount map is input to the pyramid pooling module 520, and is output as information of 21 classes×(height) 475 pixels×(width) 475 pixels by the pyramid pooling module 520 and the decorder module 521. Furthermore, the second feature amount map is input to the auxiliary loss module 522 and is output as information of 21 classes×(height) 475 pixels×(width) 475 pixels. Outputs of the decorder module 521 and the auxiliary loss module 522 are set as outputs of the second DNN 52*c*.

Figure 25:
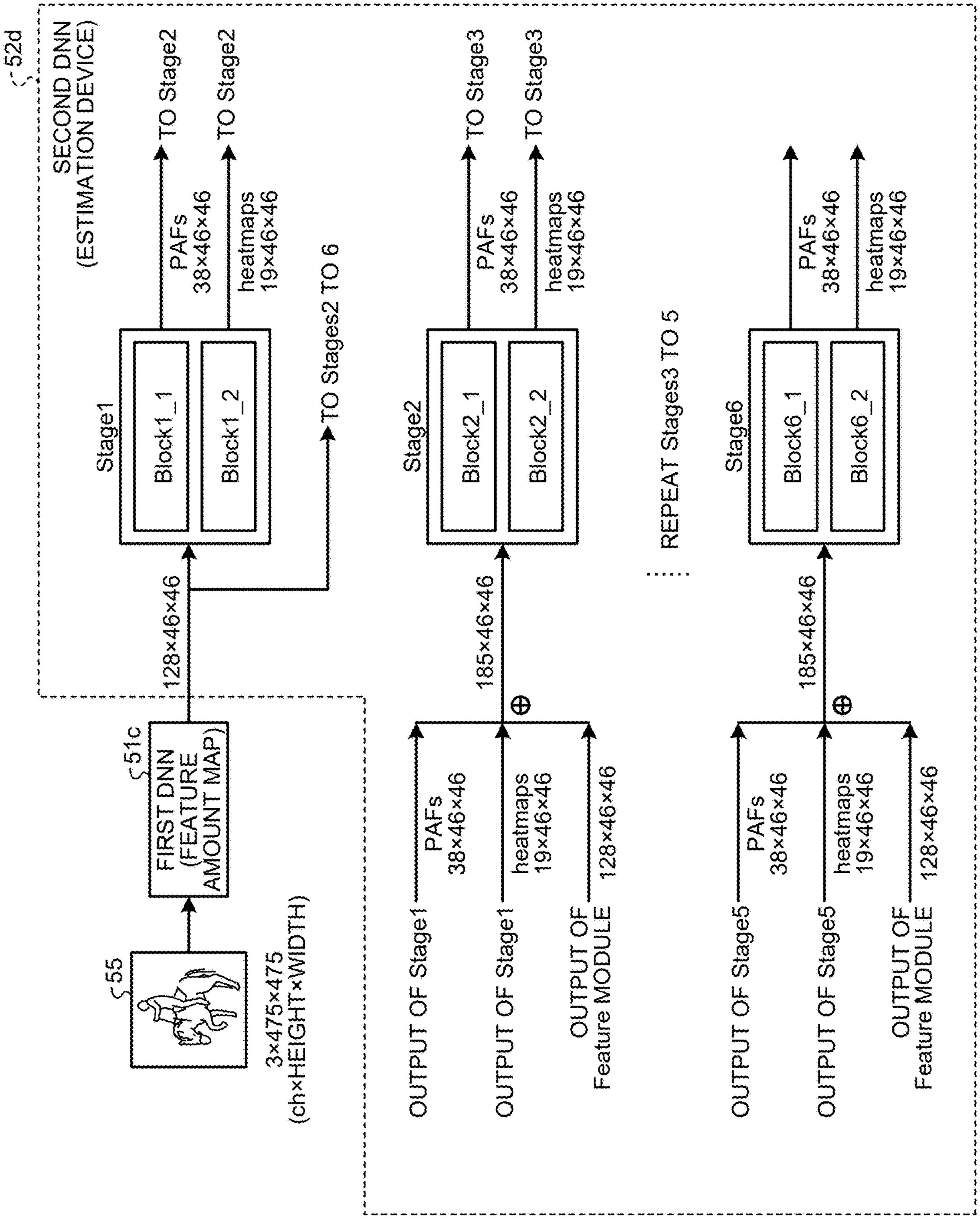
FIG. 25 is a schematic diagram illustrating a posture estimation process applicable to the second specific example in the second example of the third embodiment.

FIG. 25 is a schematic diagram illustrating a posture estimation process applicable to the second specific example in the second example of the third embodiment. In this example, posture estimation is performed using a technique called OpenPose.

The first DNN 51*c* further generates a third feature amount map of 128 channels×(height) 475 pixels×(width) 475 pixels based on the image 55 including information of 3 channels (e.g., RGB)×(height) 46 pixels×(width) 46 pixels. The second DNN 52*d* generates part affinity fields (PAFs) of 38 channels×(height) 46 pixels×(width) 46 pixels in Block 1_1 of Stage 1 based on the third feature amount map output from the first DNN 51*c*. *Furthermore, in Block* 1_2 of Stage 1, a heat map of 19 channels×(height) 46 pixels×(width) 46 pixels is generated.

The second DNN 52*d* integrates the PAFs and the heat map generated in Stage 1 and the feature amount map generated in the first DNN 51*c*, and generates PAFs of 38 channels×(height) 46 pixels×(width) 46 pixels in Block 2_1 of Stage 2 based on the integrated information. Furthermore, in Block 2_2 of Stage 2, a heat map of 19 channels×(height) 46 pixels×(width) 46 pixels is generated.

The second DNN 52*d* repeatedly executes Stage 2-related processes in Stage 3 to Stage 6 to generate PAFs of 38 channels×(height) 46 pixels×(width) 46 pixels in Block 6_1 of Stage 6. Furthermore, the second DNN 52*d* generates a heat map of 19 channels×(height) 46 pixels×(width) 46 pixels in Block 6_2 of Stage 6. The second DNN 52*d* outputs the PAFs and the heat map generated in Stage 6 as a posture estimation result in the second DNN 52*d*.

Note that, in the example in FIG. 24, the first and second feature amount maps output by the first DNN 51*c* have a size of (height) 60 pixels×(width) 60 pixels, and in the example in FIG. 25, the third feature amount map output by the first DNN 51*c* has a size of (height) 46 pixels×(width) 46 pixels. However, this is not limited to this example. For example, sizes of the first and second feature amount maps output from the first DNN 51*c* may be the same as the size of the third feature amount map.

3-3-3. Third Example of Third Embodiment

Next, a third example of the third embodiment will be described. The third example of the third embodiment is an example in which different DNN processes are performed by a plurality of edge devices as the preceding stage, and DNN process of aggregating a plurality of outputs of the preceding stage is executed in the subsequent stage.

Figure 26:
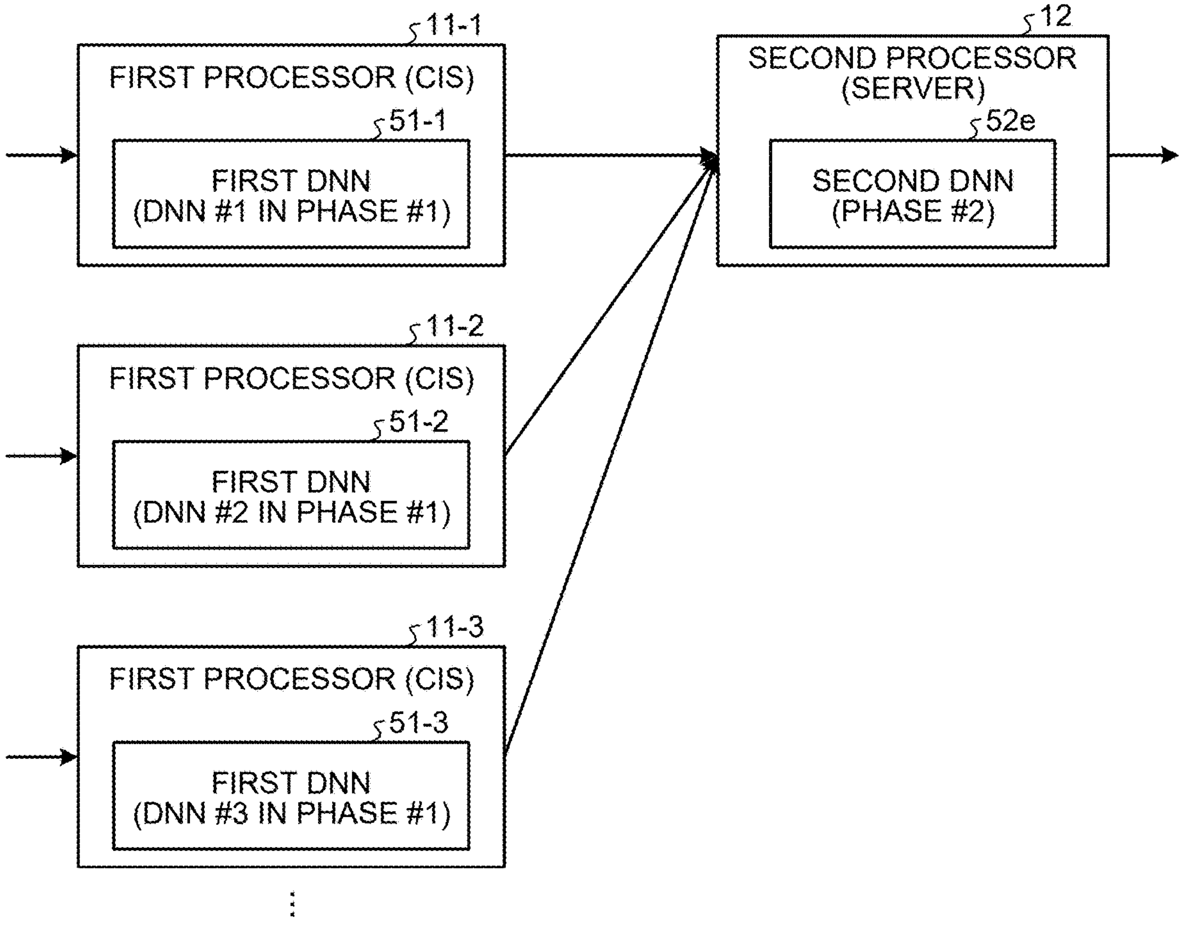
FIG. 26 is a block diagram illustrating a configuration of an example of an information processing system according to a third example of the third embodiment.

FIG. 26 is a block diagram illustrating a configuration of an example of an information processing system according to the third example of the third embodiment. In FIG. 26, first DNNs 51-1, 51-2, 51-3, and so are respectively mounted on first processors 11-1, 11-2, 11-3, and so on included in different devices. The first DNN 51-1 executes the first DNN process in the first phase. The first DNN 51-2 executes the second DNN process in the first phase. Furthermore, the first DNN 51-3 executes the third DNN process in the first phase.

Each of the first processors 11-1, 11-2, 11-3, and so on passes each processing result by the processing of the first DNNs 51-1, 51-2, 51-3, and so on to the second processor 12. For example, in the second processor 12 mounted on the server, a second DNN 52*e* executes the DNN process of aggregating each processing result by the processing of the first DNNs 51-1, 51-2, 51-3, and so on as the second-phase process.

First Specific Example in Third Example of Third Embodiment

A first specific example in the third example of the third embodiment will be described. The first specific example is an example in which data mining is performed using the output of the preceding stage, i.e., each of the first processors 11-11, 11-12, 11-13, and so on, in the subsequent stage, that is, the second processor 12.

Figure 27:
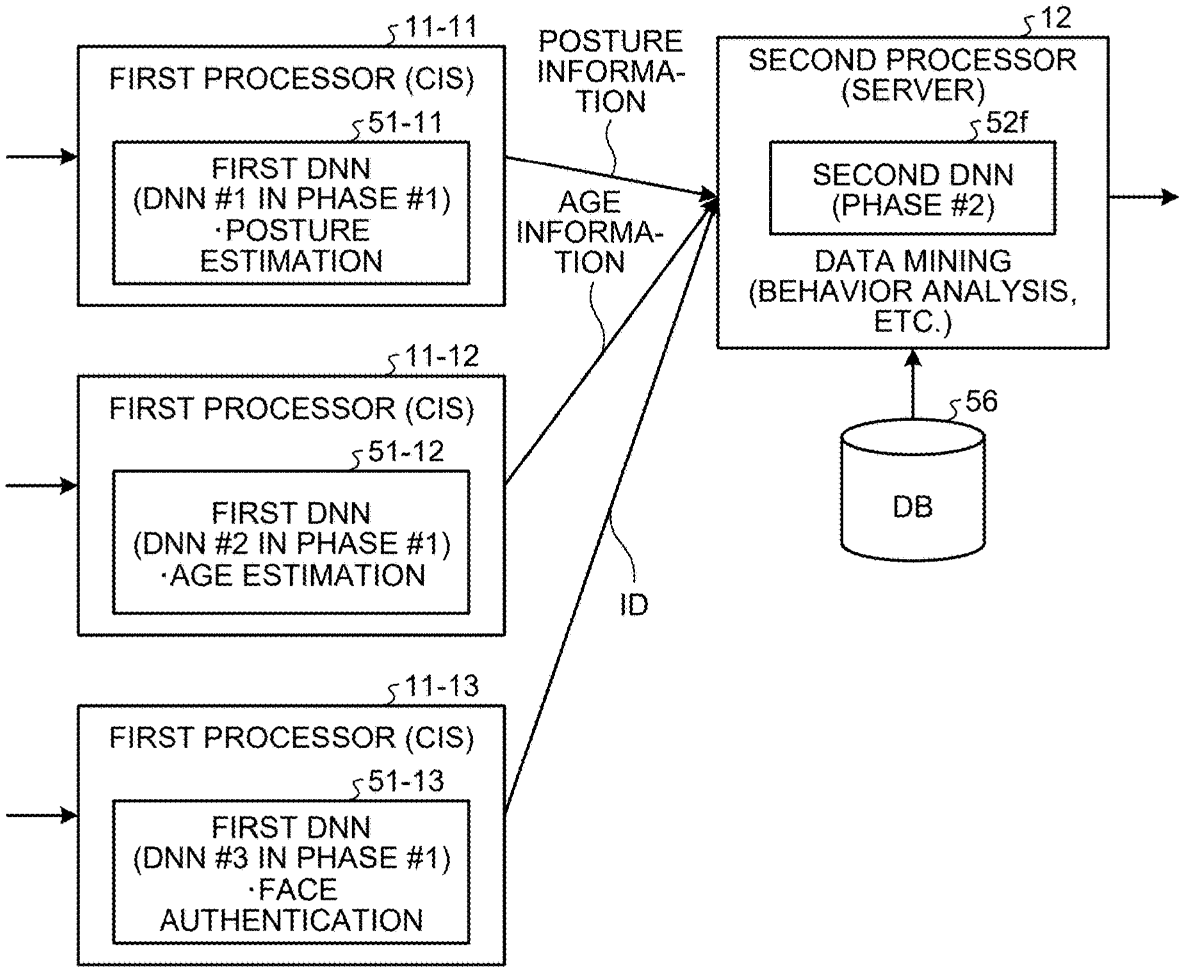
FIG. 27 is a block diagram illustrating a configuration of an example of an information processing system according to a first specific example in the third example of the third embodiment.

FIG. 27 is a block diagram illustrating a configuration of an example of an information processing system according to the first specific example in the third example of the third embodiment. In the example in FIG. 27, first DNNs 51-11, 51-12, and 51-13 for performing posture estimation, age estimation, and face authentication based on images are assigned to the first processors 11-11, 11-12, and 11-13, respectively.

The first processor 11-11 transmits, to the second processor 12, the posture information output through the processing of the first DNN 51-11. The first processor 11-12 transmits, to the second processor 12, the posture information output by the processing of the first DNN 51-12. Furthermore, the first processor 11-13 transmits, to the second processor 12, the face information obtained by the processing of the first DNN 51-13 in association with, for example, the feature amount based on the face and the ID for specifying the face.

The second processor 12 performs data mining based on each piece of information transmitted from the first processors 11-11, 11-12, and 11-13 by the processing of a second DNN 52*f*. As the data mining process executed by the second DNN 52*f*, behavior analysis or the like can be considered. For example, based on the posture information and the age information transmitted from the first processors 11-11 and 11-12, the second DNN 52*f* refers to database (DB) 56 in which the behavior information regarding the posture and the age is registered, thereby performing the behavior analysis on the person indicated by the ID.

At this time, since the first DNN 51-13 that performs the face authentication transmits the ID and the feature amount instead of the face image, it is possible to protect the privacy of the person whose behavior has been analyzed.

Second Specific Example in Third Example of Third Embodiment

A second specific example in the third example of the third embodiment will be described. The second specific example is an example in which a person or the like is tracked using the output of the preceding stage, i.e., each of the first processors 11-21, 11-22, 11-23, and so on in the subsequent stage, i.e., the second processor 12.

Figure 28:
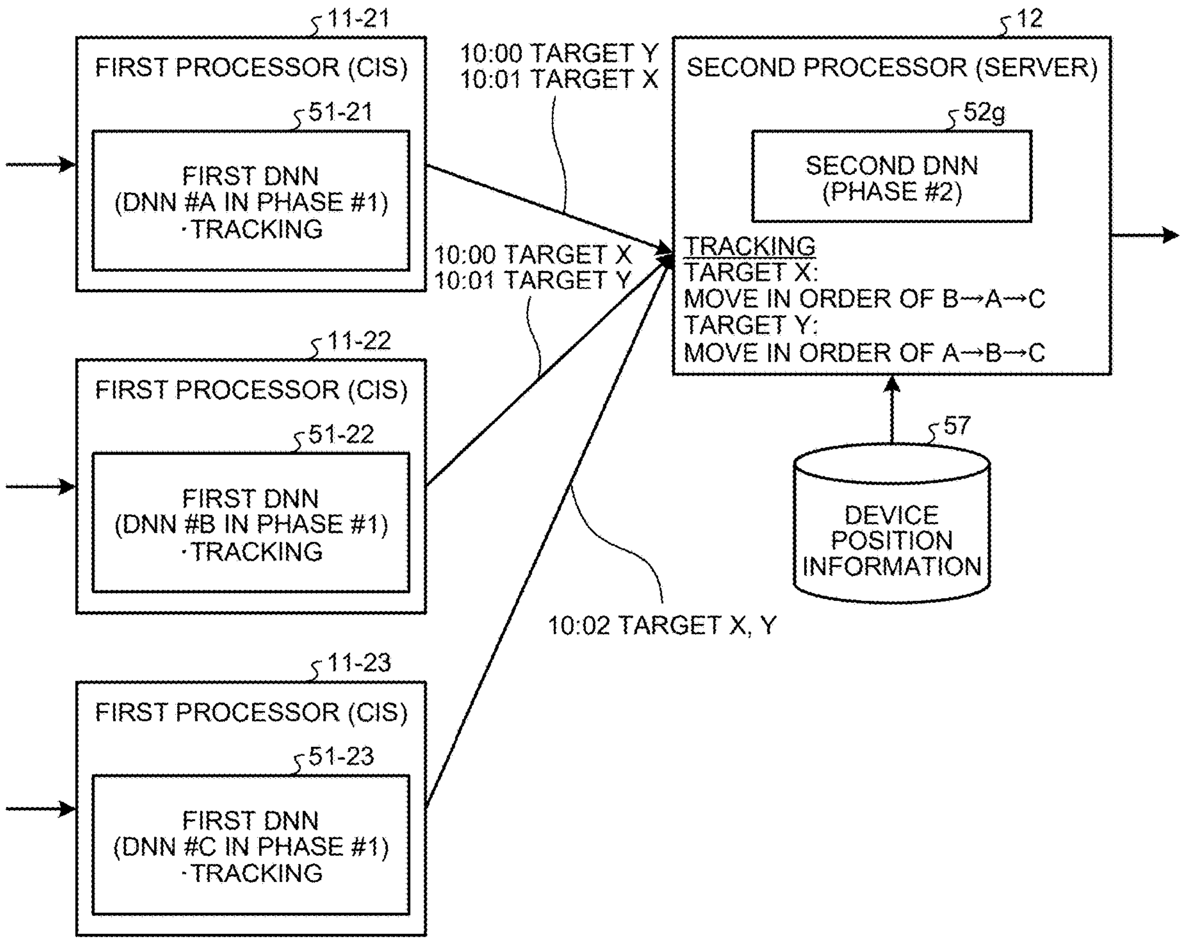
FIG. 28 is a block diagram illustrating a configuration of an example of an information processing system according to a second specific example in the third example of the third embodiment.

FIG. 28 is a block diagram illustrating a configuration of an example of an information processing system according to the second specific example in the third example of the third embodiment. In the example in FIG. 28, first DNNs 51-21, 51-22, and 51-23 are assigned to the first processors 11-21, 11-22, and 11-23, respectively, to authenticate a person based on an image, detect a movement trajectory of the authenticated person, and track the person.

Each of the first processors 11-21, 11-22, and 11-23 transmits, to the second processor 12 in association with each other, the feature amount of the person authenticated by each of the first DNNs 51-21, 51-22, and 51-23, an ID (in this example, target X and target Y) for identifying the person, and information indicating time when the person with the ID is authenticated.

The second processor 12 can acquire a device position information 57 indicating a position of each imaging device (imaging devices A, B, and C) that acquires an image for authentication by each of the first processors 11-21, 11-22, and 11-23. The device position information 57 may be given in advance, or may be obtained based on an object or the like included in the captured image captured by each imaging device.

The second processor 12 tracks, by a second DNN 52*g*, the movement trajectory of the person indicated by the ID that performs the second-phase process based on the feature amount transmitted from each of the first processors 11-21, 11-22, and 11-23, the time information, and the position information of each imaging device. The person indicated in the information transmitted from each of the first processors 11-21, 11-22, and 11-23 can be identified and specified by comparing the feature amounts.

In the example in the drawing, by the processing of the first DNN 51-21 of the first processor 11-21, the target Y is recognized at time "10:00", and the target X is recognized at the time "10:01". Furthermore, by the processing of the first DNN 51-22 of the first processor 11-22, the target X is recognized at time "10:00", and the target Y is recognized at the time "10:01". Furthermore, the targets X and Y are recognized at time "10:02" by the processing of the first DNN 51-23 of the first processor 11-23.

The second processor 12 detects that the object X moves in the order of the position of the imaging device B, the position of the imaging device A, and the position of the imaging device C by the tracking process based on the information transmitted from each of the first processors 11-21, 11-22, and 11-23 by the processing of the second DNN 52*g*. Similarly, the second processor 12 detects that the object Y moves in the order of the position of the imaging device A, the position of the imaging device B, and the position of the imaging device C by the processing of the second DNN 52*g*.

At this time, since each of the first DNNs 51-21, 51-22, and 51-23 transmits the ID and the feature amount, instead of the face image, it is possible to protect the privacy of the tracked person.

3-3-4. Fourth Example of Third Embodiment

Next, a fourth example of the third embodiment will be described. The fourth example of the third embodiment is an example in which lightweight inference is executed at high speed by the edge device as the preceding stage, and high-accuracy and high-functional inference is executed by, for example, a server as the subsequent stage.

Figure 29:
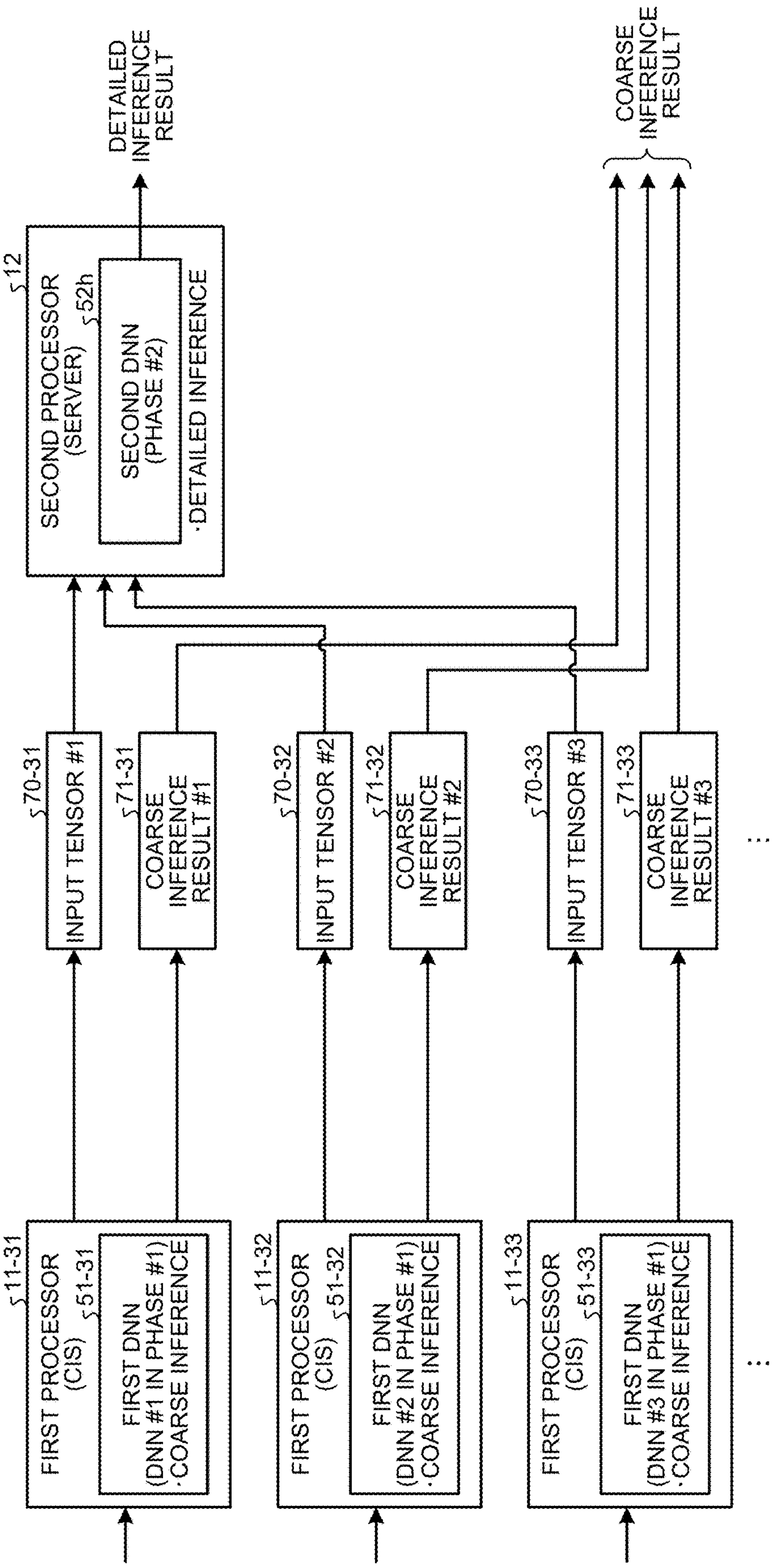
FIG. 29 is a block diagram illustrating a configuration of an example of an information processing system according to a fourth example of the third embodiment.

Note that, hereinafter, "lightweight inference executed at high speed" is referred to as "coarse inference", and "highly accurate and highly functional inference" is referred to as "detailed inference". FIG. 29 is a block diagram illustrating a configuration of an example of an information processing system according to the fourth example of the third embodiment. In FIG. 29, first DNNs 51-31, 51-32, 51-33, and so on are respectively mounted on first processors 11-31, 11-32, 11-33, and so on included in different devices.

The first DNN 51-31 executes the first DNN process in the first phase. The first DNN 51-32 executes the second DNN process in the first phase. Furthermore, the first DNN 51-33 executes the third DNN process in the first phase. The first to third DNN processes in the first phase are processes of performing predetermined coarse inference based on input data. Coarse inference results 71-31, 71-32 and 71-33, which are results of the coarse inference by each of the first DNNs 51-31, 51-32 and 52-33, are provided, for example, to the user.

The first processor 11-31 (first DNN 51-31) outputs the input data as an input tensor 70-31. The first processor 11-32 (first DNN 51-32) outputs the input data as an input tensor 70-32. Similarly, the first processor 11-33 (first DNN 51-33) outputs the input data as an input tensor 70-33.

In the second processor 12, a second DNN 52*h* that performs the second-phase process performs detailed inference using the input tensors 70-31, 70-32, and 70-33 output from the first processors 11-31, 11-32, and 11-33, respectively. A detailed inference result that is a result of the detailed inference by the second DNN 52*h* is provided, for example, to the user.

Content of the coarse inference and the detailed inference is not particularly limited, but it is conceivable to infer the presence or absence of a person and the number of persons by the coarse inference based on the captured image, and infer recognition and action analysis of the person by the detailed inference.

According to the fourth example of the third embodiment, the user can first grasp the approximate situation of the site based on the coarse inference result and then grasp the detailed situation of the site based on the detailed inference result. As a result, it becomes easy to take a more appropriate response to the situation of the site.

Application Example in Fourth Example of Third Embodiment

Next, an application example in the fourth example of the third embodiment will be described. In this application example, the second processor 12 is an example in which the second processor 12 retrains each of the first DNNs 51-31, 51-32, and 51-33 by using each of coarse inference results 71-31, 71-32, and 71-33 in the fourth example described with reference to FIG. 29.

Figure 30:
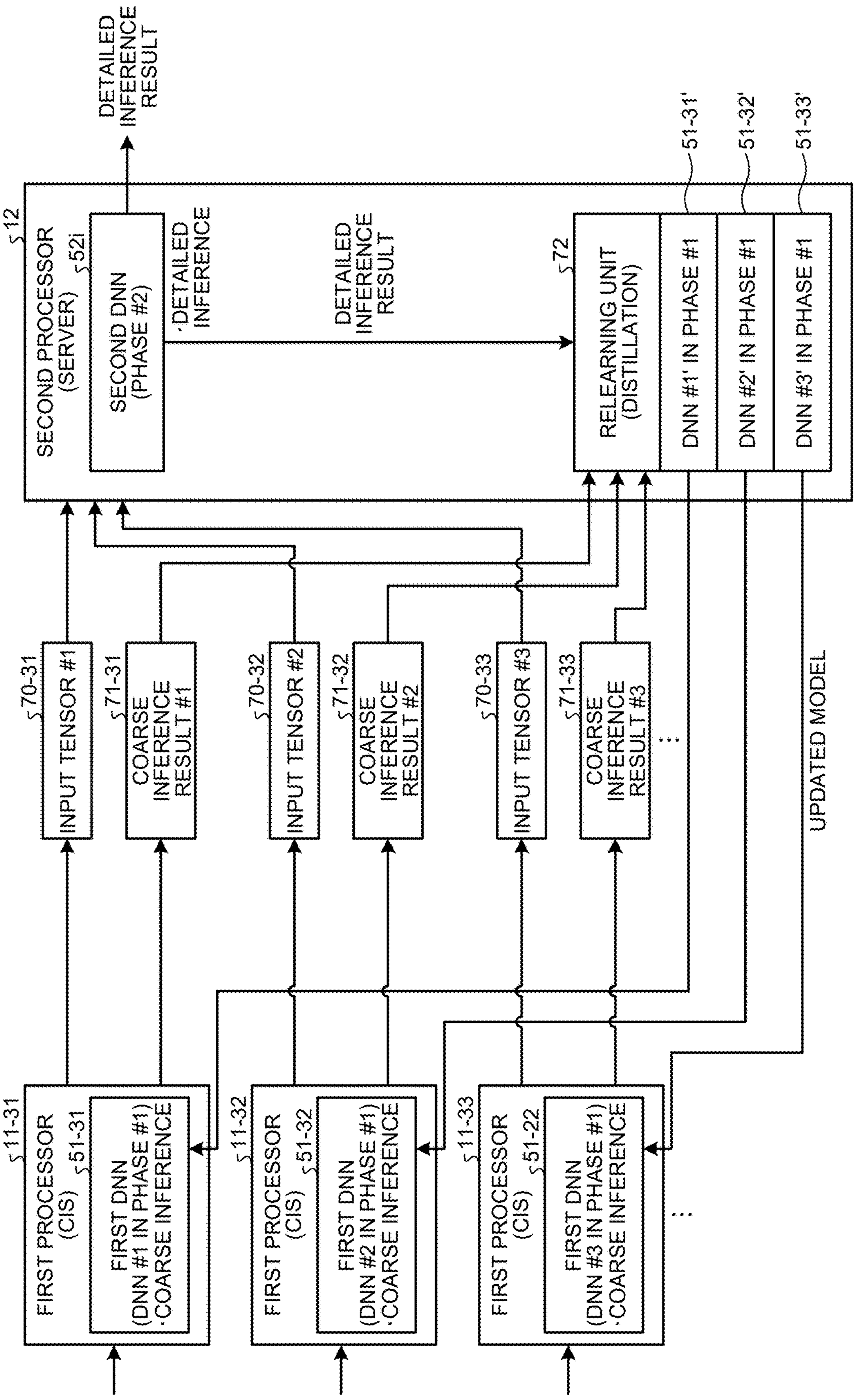
FIG. 30 is a block diagram illustrating a configuration of an example of an information processing system according to an application example according to the fourth example of the third embodiment.

FIG. 30 is a block diagram illustrating a configuration of an example of an information processing system according to the application example in the fourth example of the third embodiment. In FIG. 30, the second processor 12 includes a second DNN 52*i* that performs the second-phase process, and a relearning unit 72. The relearning unit 72 includes first DNNs 51-31', 51-32', and 51-33' respectively corresponding to the first DNNs 51-31, 51-32, and 51-33 mounted on the first processors 11-31, 11-32, and 11-33, respectively. For example, the first DNNs 51-31, 51-32, and 51-33 in the initial state may be applied to the first DNNs 51-31', 51-32', and 51-33'.

Each of the coarse inference results 71-31, 71-32, and 71-33 output from each of the first processors 11-31, 11-32, and 11-33 is passed to the relearning unit 72. The relearning unit 72 retrains each of the first DNNs 51-31', 51-32', and 51-33' by using the detailed inference result obtained by the processing of the second DNN 52*l* and the coarse inference results 71-31, 71-32, and 71-33.

The relearning unit 72 can perform relearning using a method called "distillation". The "distillation" generally refers to a technique for improving performance of a target network (in this example, the first DNN 51-31, to 51-33) using an output of an existing network (in this example, the second DNN 52*l*). In this case, the existing network is assumed to be a network having a large scale, high performance, and/or a lot of training data. On the other hand, the target network is assumed to be a network having a small scale, low performance, and/or insufficient training data. As described above, it is known that performance is further improved by not only simply using training data for learning by the target network but also using outputs of other networks.

The second processor 12 transmits the first DNNs 51-31' to 51-33' retrained by the relearning unit 72 to the first processors 11-31 to 11-33, respectively. In each of the first processors 11-31 to 11-33, the first DNNs 51-31' to 51-33' transmitted from the second processor 12 update the first DNNs 51-31 to 51-33, respectively. In this case, among the retrained first DNNs 51-31' to 51-33', the second processor 12 may transmit only models with improved performance than before the retraining to the first processors 11-31 to 11-33.

As described above, in the application example in the fourth example of the third embodiment, since the accuracy of the coarse inference by the first DNNs 51-31 to 51-33 is improved according to the use time and the like, the user can acquire the inference result with higher accuracy at high speed.

3-3-5. Fifth Example of Third Embodiment

Next, a fifth example of the third embodiment will be described. The fifth example of the third embodiment is an example in which the processing result by the first DNN that performs the first-phase process is transmitted to the second DNN that performs the second-phase process while reducing a data amount. More specifically, by the first DNN process, an object area is detected based on the image, and information on only the detected object area is transmitted to the second DNN. The second DNN performs processing on the object area transmitted from the first DNN.

Figure 31:
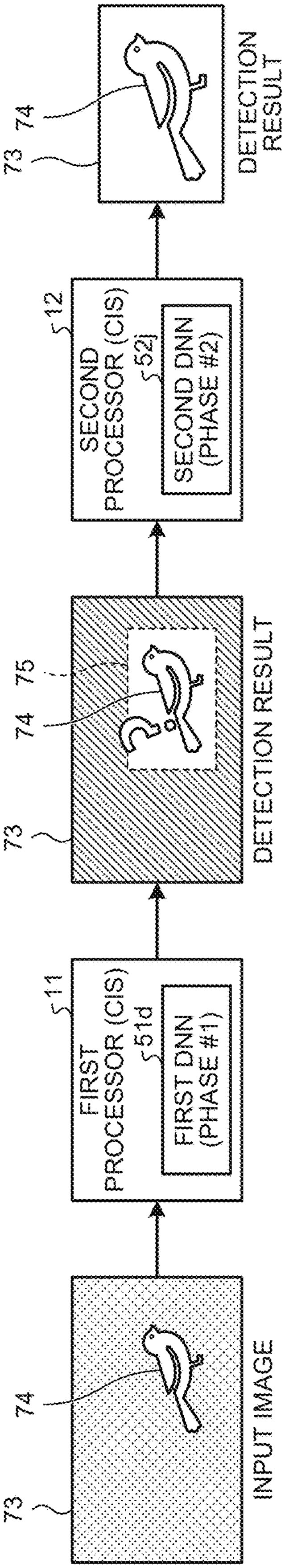
FIG. 31 is a block diagram illustrating a configuration of an example of an information processing system according to a fifth example of the third embodiment.

FIG. 31 is a block diagram illustrating a configuration of an example of an information processing system according to the fifth example of the third embodiment.

An image 73 including an object 74 is input to the first processor 11. In the first processor 11, a first DNN **51*d* that performs processing of the first phase performs object detection on the input image 73, and detects a smallest rectangular region including the object 74 as an object area 75. The first DNN 51*d* extracts the object area 75 from the image 73 and transmits the object area 75 to the second processor 12. The second processor 12 executes the DNN process of processing based on the image of the object area 75 by a second DNN 52*j*** that performs the second-phase process.

Since the first processor 11 transmits the image of the object area 75 extracted from the image 73 to the second processor 12, an amount of communication between the first processor 11 and the second processor is reduced. Furthermore, in the second processor 12, the second DNN **52*j* executes the DNN process on the image of the object area 75 having the small size with respect to the original image 73, so that a processing load can be reduced as compared with the case of executing the DNN process on the image 73**.

The fifth example of the third embodiment is not limited to this example, and it is also possible to cause the first DNN **51*d* to relearn based on a processing result by the second DNN 52*j*, for example. For example, in a case where more detailed detection processing is performed on the object 74 included in the image of the object area 75 by the second DNN 52*j*, it is conceivable to cause the first DNN 51*d* to relearn by the above-described distillation method using the detection result of the second DNN 52*j***.

Furthermore, in the first DNN **51*d*, the object area 75 can be detected using the RGB image as the image 73, and only the data of the object area 75 in the RAW data corresponding to the image 73 can be transmitted to the second DNN 52*j*. Furthermore, when a target object is not detected from the image 73 in the first DNN 51*d*, data may not be transmitted to the second DNN 52*j***.

Note that the first to fifth examples of the third embodiment described above can be implemented not only independently but also in appropriate combination within a range in which there is no contradiction.

4. Fourth Embodiment

Next, a fourth embodiment of the present disclosure will be described. The fourth embodiment relates to implementation of the first processor 11, the second processor 12, and the like. More specifically, the fourth embodiment relates to a structure of a signal path for transmitting data between the sensing device 10, the first processor 11, and the second processor 12.

Physical Layout Example According to Fourth Embodiment

Figure 32:
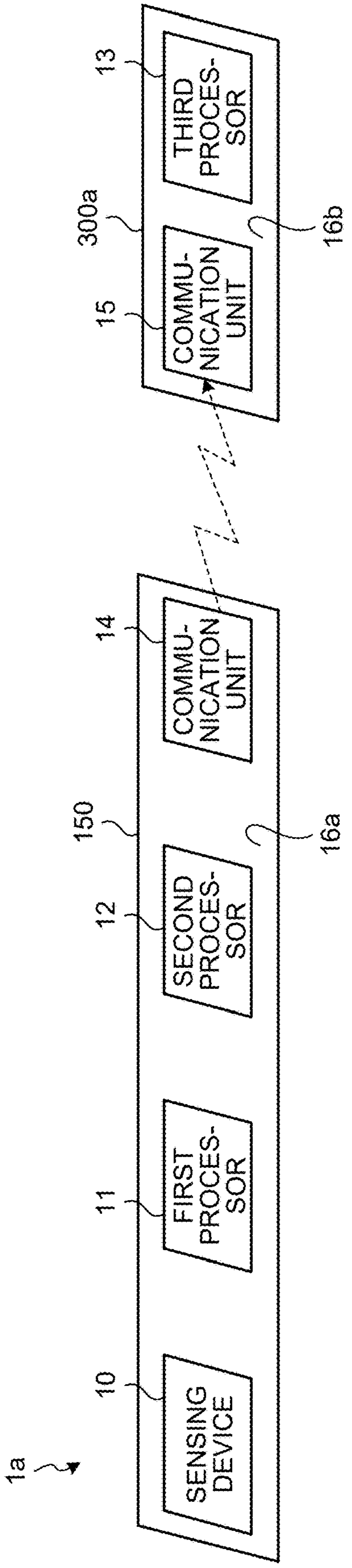
FIG. 32 is a schematic diagram illustrating an example of a physical layout of each unit, with respect to a substrate, in an information processing system according to a fourth embodiment.

FIG. 32 is a schematic diagram illustrating an example of a physical layout of each unit with respect to the substrate in the information processing system according to the fourth embodiment.

In FIG. 32, the left side illustrates, as a bird's-eye view, an example of a physical layout of the imaging device 150 (or the sensing device), with respect to a substrate **16*a*, including the sensing device 10, the first processor 11, the second processor 12, and a communication unit 14 that transmits the output of the second processor 12** and receives data or the like transmitted from the outside.

In the sensing device 10, the first processor 11, and the second processor 12, information based on an output of the sensing device 10 and information of a result of performing arithmetic processing based on the information are handled as data in units of a plurality of bits.

In FIG. 32, the right side illustrates, as a bird's-eye view, an example of the physical layout of the information processing apparatus **300*a*, with respect to a substrate 16*b*, including the application execution unit 30 or a third processor 13 on which the DNN is executed, and the communication unit 15 that transmits and receives data to and from the communication unit 14**.

Note that, in FIG. 32, the sensing device 10, the first processor 11, the second processor 12, and the communication unit 14 are linearly arranged with respect to the substrate **16*a*, but this is for the sake of description and is not limited to this example. Furthermore, in FIG. 32, the communication unit 15 and the third processor 13 included in the information processing apparatus 300*a* are illustrated to be arranged on the substrate 16*b*, but this is for the sake of description and is not limited to this example. For example, the information processing apparatus 300*a* including the communication unit 15 and the third processor 13 may have a configuration on a cloud network. In this case, the communication unit 14 and the communication unit 15** transmit and receive data via the communication network.

First Signal Path Example According to Fourth Embodiment

Figure 33:
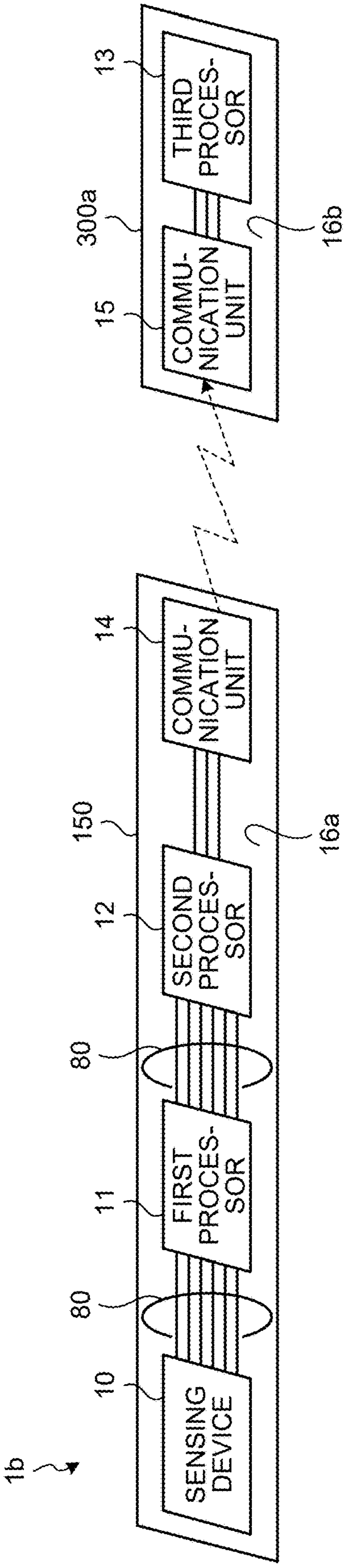
FIG. 33 is a schematic diagram illustrating a first path example of the information processing system according to the fourth embodiment.

A fourth signal path example according to the fourth embodiment will be described. FIG. 33 is a schematic diagram illustrating a first signal path example of the information processing system according to the fourth embodiment. FIG. 33 is a diagram in which a signal path connecting each unit is added to FIG. 32 described above.

In FIG. 33, in the information processing system 1*b*, a signal line that transmit information (data) is configured with parallel transfer signal lines 80 including a plurality of signal lines between the sensing device 10 and the first processor 11 and between the first processor 11 and the second processor 12 in the imaging device 150. On the other hand, a signal line that transmits data between the second processor 12 and the communication unit 14 is configured with a parallel transfer signal line or one or more serial transfer signal lines.

Second Signal Path Example According to Fourth Embodiment

Figure 34:
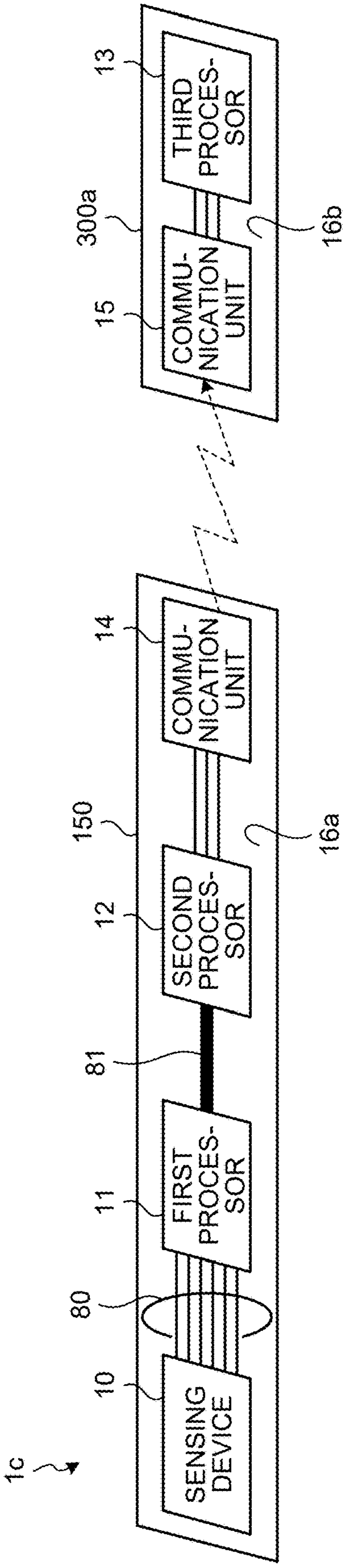
FIG. 34 is a schematic diagram illustrating a second path example of the information processing system according to the fourth embodiment.

A second signal path example according to the fourth embodiment will be described. FIG. 34 is a schematic diagram illustrating the second signal path example of the information processing system according to the fourth embodiment. In FIG. 34, in the information processing system 1*c*, one or more high-speed serial transfer signal lines 81 are used as a signal path between the first processor 11 and the second processor 12 instead of the parallel transfer signal lines 80 described with reference to FIG. 33.

Note that the high-speed serial transfer signal line 81 is a signal line having a structure for transferring data according to a higher clock frequency than the parallel transfer signal line 80 illustrated in FIG. 33, for example. Alternatively, the high-speed serial transfer signal line 81 may be a signal line having a structure in which at least part of data acquired by one sensing element (e.g., pixel array) within a certain time or at a certain timing, or data obtained by performing arithmetic processing on this data is arranged and transferred in a time direction.

Figure 35:
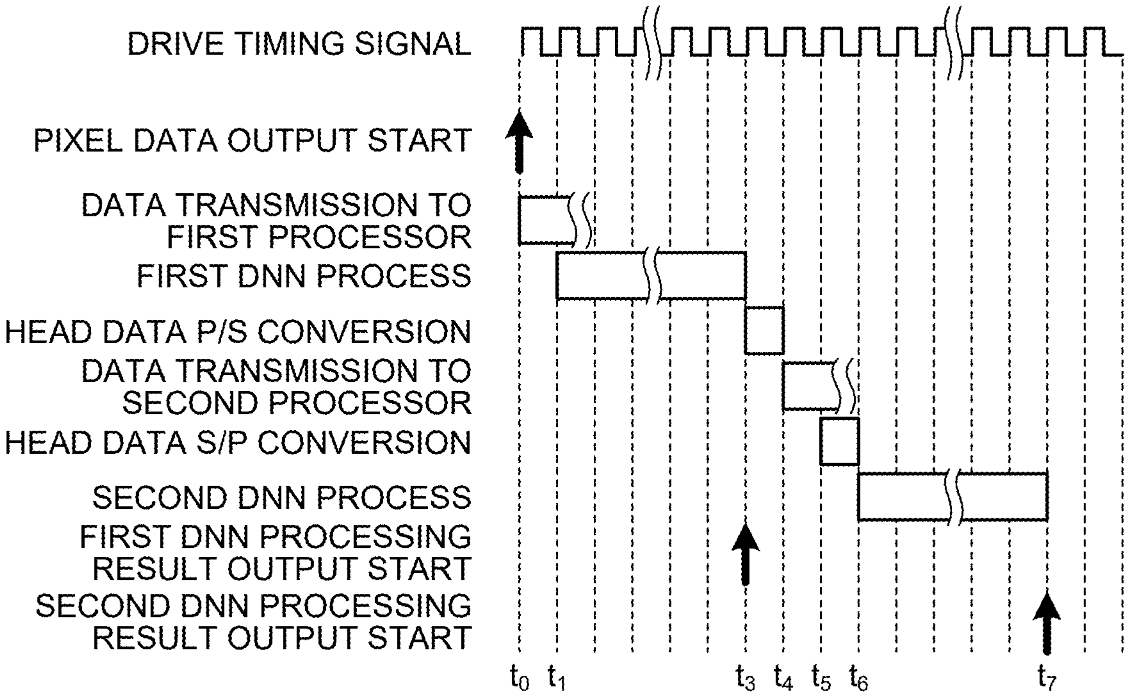
FIG. 35 is an example of a timing chart illustrating each timing related to data transmission in the second path example according to the fourth embodiment.

FIG. 35 is a timing chart of an example illustrating each timing related to data transmission in the second signal path example according to the fourth embodiment illustrated in FIG. 34. In FIG. 35, a horizontal direction on the drawing indicates the passage of time toward the right. Here, description will be made assuming that each process is started with a rising edge of a drive timing signal that is a clock signal as a trigger, and is ended at a falling edge.

In FIG. 35, the output of the pixel data is started from the sensing device 10 at time to. At the same time, at time $t_0$, transmission of the pixel data from the sensing device 10 to the first processor 11 via the parallel transfer signal line 80 is started. At time $t_1$, the first processor 11 starts processing by the first DNN 51 on the pixel data transferred from the sensing device 10.

When the processing by the first DNN 51 ends at time $t_3$, the first processor 11 starts parallel/serial conversion (P/S conversion) from the head data of the output of the first DNN 51. At time $t_4$, data transfer from the first processor 11 to the second processor 12 via the high-speed serial transfer signal line 81 is started. At time $t_5$, serial/parallel conversion (S/P conversion) is started from the head data transmitted by the second processor 12, and at time $t_6$, processing by the second DNN 52 is started in the second processor 12. The output of the processing result by the second DNN 52 is started at time $t_7$.

As described above, in the present disclosure, the processing by the first DNN 51 and the processing by the second DNN 52 are executed by the pipeline process.

The latency of the processing by the first DNN 51 is from time $t_0$ when the pixel data is output from the sensing device 10 to time $t_3$ when the output of the processing result of the first DNN 51 is started. In addition, the latency of the processing by the first DNN 51 and the second DNN 52 is from the time $t_0$ to time $t_7$ at which the output of the processing result of the second DNN 52 is started.

Third Signal Path Example According to Fourth Embodiment

Figure 36:
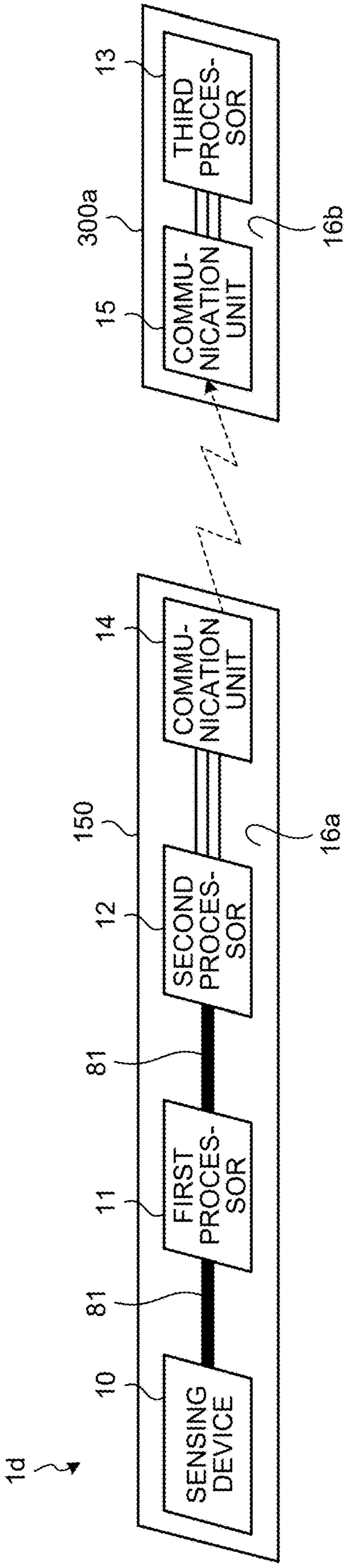
FIG. 36 is a schematic diagram illustrating a third path example of the information processing system according to the fourth embodiment.

A third signal path example according to the fourth embodiment will be described. FIG. 36 is a schematic diagram illustrating the third signal path example of the information processing system according to the fourth embodiment. In FIG. 36, the information processing system 1*d* uses one or more high-speed serial transfer signal lines 81 instead of the parallel transfer signal lines 80 described with reference to FIG. 34 as a signal path between the sensing device 10 and the first processor 11. In other words, in the example in FIG. 36, in addition to the signal path between the first processor 11 and the second processor 12, the high-speed serial transfer signal line 81 is used as the signal path between the sensing device 10 and the first processor 11.

Figure 37:
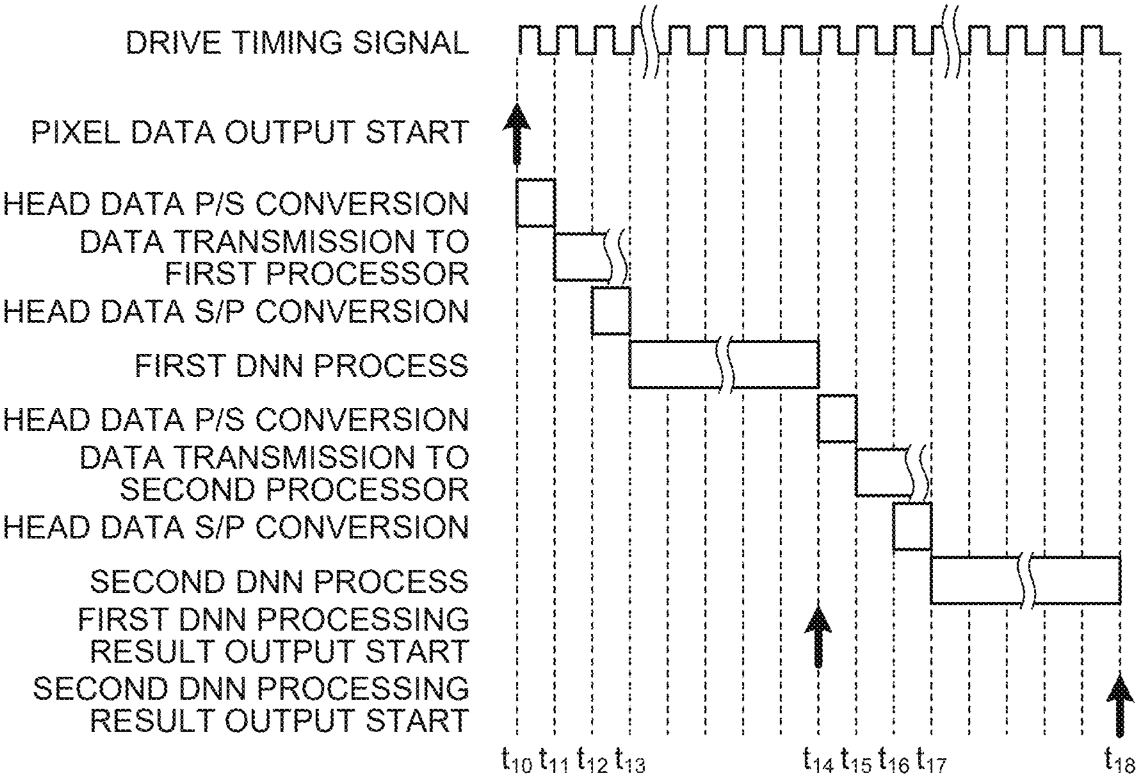
FIG. 37 is an example of a timing chart illustrating each timing related to data transmission in the third path example according to the fourth embodiment.

FIG. 37 is a timing chart of an example illustrating each timing related to data transmission in the third signal path example according to the fourth embodiment illustrated in FIG. 36. In FIG. 37, a horizontal direction on the drawing indicates the passage of time toward the right. Similarly to FIG. 35, the description will be given on the assumption that each processing is started with the rising edge of the drive timing signal, which is a clock signal, as a trigger and is ended at the falling edge.

In FIG. 37, an output of the pixel data is started from the sensing device 10 at time $t_{10}$. At time $t_{10}$, the sensing device 10 starts parallel/serial conversion (P/S conversion) from the head data of the pixel data. At time $t_{11}$, transmission of the pixel data from the sensing device 10 to the first processor 11 via the high-speed serial transfer signal line 81 is started.

At time t12, the first processor 11 starts S/P conversion from the head data of the pixel data received via the high-speed serial transfer signal line 81. At time t13, the first processor 11 starts processing by the first DNN 51 on the pixel data transferred from the sensing device 10 via the high-speed serial transfer signal line 81.

When the processing by the first DNN 51 is ended at time $t_{14}$, the first processor 11 starts the P/S conversion from the head data of the output of the first DNN 51. At time $t_{15}$, data transfer from the first processor 11 to the second processor 12 via the high-speed serial transfer signal line 81 is started. At time $t_{16}$, S/P conversion is started from the head data transmitted in the second processor 12, and at time $t_{17}$, processing by the second DNN 52 is started in the second processor 12. The output of the processing result by the second DNN 52 is started at time $t_{18}$.

As described above, in the present disclosure, the processing by the first DNN 51 and the processing by the second DNN 52 are executed by the pipeline process.

The latency of the processing by the first DNN 51 is from time $t_{10}$ when the pixel data is output from the sensing device 10 to time $t_{14}$ when the output of the processing result of the first DNN 51 is started. Furthermore, the latency of the processing by the second DNN 52 is from the time $t_{10}$ to time $t_{18}$ at which the output of the processing result of the second DNN 52 is started.

Comparing FIG. 37 with FIG. 35 described above, the P/S conversion (time $t_{10}$) at the output of the sensing device 10 and the S/P conversion (time $t_{16}$) at the input of the second processor 12 are unnecessary in the example of FIG. 35, compared to the example of FIG. 37. Therefore, in the second signal path example of the fourth embodiment illustrated in FIG. 34, the latency from the output of the pixel data from the sensing device 10 to the start of the processing by the first DNN 51 is reduced as compared with the third signal path example of the fourth embodiment illustrated in FIG. 36. Similarly, in the second signal path example of the fourth embodiment illustrated in FIG. 34, the latency from the output of the pixel data from the sensing device 10 to the start of the processing by the second DNN 52 is also reduced as compared with the third signal path example of the fourth embodiment illustrated in FIG. 36.

Therefore, in consideration of the latency, it can be said that the second signal path example of the fourth embodiment illustrated in FIG. 34 is more advantageous than the third signal path example of the fourth embodiment illustrated in FIG. 36. On the other hand, in the third signal path example of the fourth embodiment illustrated in FIG. 36, since the sensing device 10 and the first processor 11, and the first processor 11 and the first processor 11 are connected by the high-speed serial transfer signal line 81, it can be said that it is advantageous in terms of a degree of freedom of layout with respect to the second signal path example of the fourth embodiment illustrated in FIG. 34 and the first signal path example of the fourth embodiment illustrated in FIG. 33.

Fourth Signal Path Example According to Fourth Embodiment

A fourth signal path example according to the fourth embodiment will be described. The fourth signal path example according to the fourth embodiment is an example when the sensing device 10 and the first processor 11 have a stacked structure or are superimposed. For example, the imaging unit 111 included in the sensing device 10 is configured on a first die, and a portion other than the imaging unit 111 included in the sensing device 10 and the first processor 11 are configured on a second die. The first die and the second die are bonded together to form a one-chip semiconductor device having a stacked structure.

Hereinafter, this structure in which a plurality of devices is stacked or superimposed is referred to as the stacked structure as appropriate.

Figure 38:
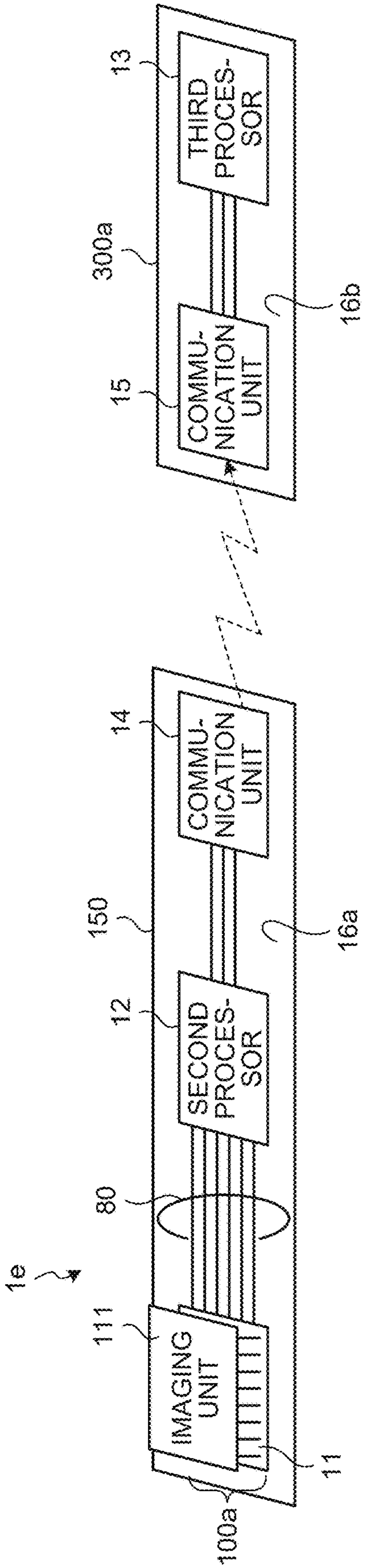
FIG. 38 is a schematic diagram illustrating a fourth path example of the information processing system according to the fourth embodiment.

FIG. 38 is a schematic diagram illustrating the fourth signal path example of the information processing system according to the fourth embodiment. In FIG. 38, in an information processing system 1*e*, the imaging unit 111 and the first processor 11 are stacked in a vertical direction of the substrate 16*a* to form the stacked structure. In this stacked structure, the signal line for transmitting data between the imaging unit 111 and the first processor 11 is configured by a parallel transfer signal line including a plurality of signal lines extending in a direction perpendicular to the substrate 16*a*.

Note that, in FIG. 38, the imaging unit 111 and the first processor 11 are described to be stacked or superimposed, but this is for the sake of description. In practice, portions other than the imaging unit 111 in the imaging device 100*a* are appropriately arranged on the imaging unit 111 side and/or the first processor 11 side.

Figure 39A:
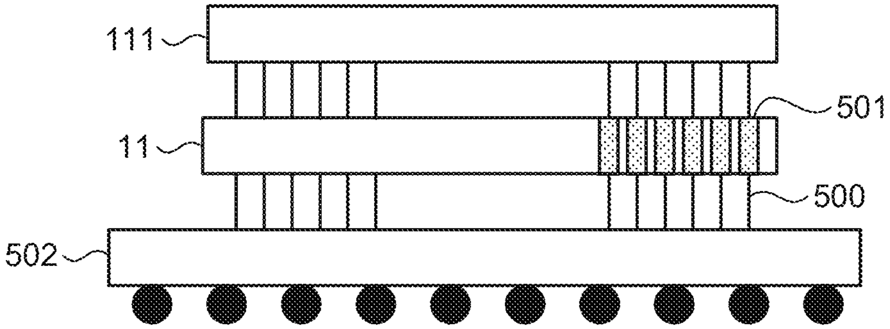
FIG. 39A is a schematic diagram schematically illustrating a vertical structure of a stacked structure in the fourth path example according to the fourth embodiment.
Figure 39B:
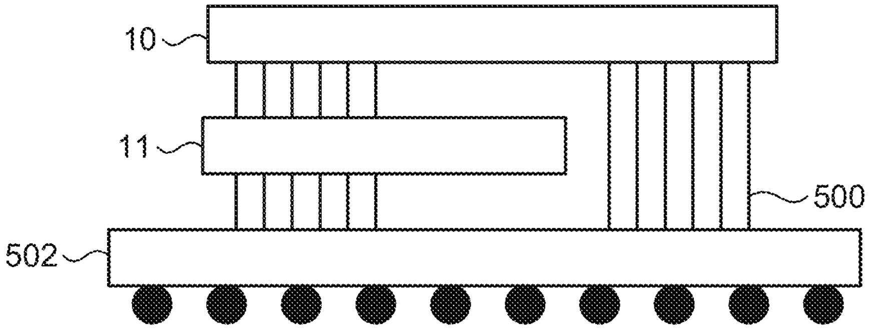
FIG. 39B is a schematic diagram schematically illustrating the vertical structure of the stacked structure in the fourth path example according to the fourth embodiment.

FIGS. 39A and 39B are schematic diagrams schematically illustrating a vertical structure of the stacked structure in the fourth signal path example according to the fourth embodiment. In FIGS. 39A and 39B, the stacked structure in which the imaging unit 111 and the first processor 11 are stacked or superimposed includes a substrate 502 (so-called interposer substrate) for extracting signals of the imaging unit 111 and the first processor 11 to the outside of the stacked structure.

Hereinafter, the substrate 502 will be described as an interposer substrate 502.

In FIG. 39A, the imaging unit 111 and the first processor 11, and the first processor 11 and the interposer substrate 502 are connected by parallel transfer signal lines of a plurality of signal lines 500, respectively. Furthermore, in the example in FIG. 39A, the imaging unit 111 and the interposer substrate 502 are connected via a conductor 501 provided inside the first processor 11.

The present disclosure is not limited to this example, and as illustrated in FIG. 39B, the imaging unit 111 and the interposer substrate 502 may be connected via the outside of the first processor 11.

In this way, adoption of the stacked structure facilitates a layout of the signal path of the data between the imaging unit 111 and the first processor 11. Furthermore, the imaging device 150 can be downsized by adopting the stacked structure.

Fifth Signal Path Example According to Fourth Embodiment

Figure 40:
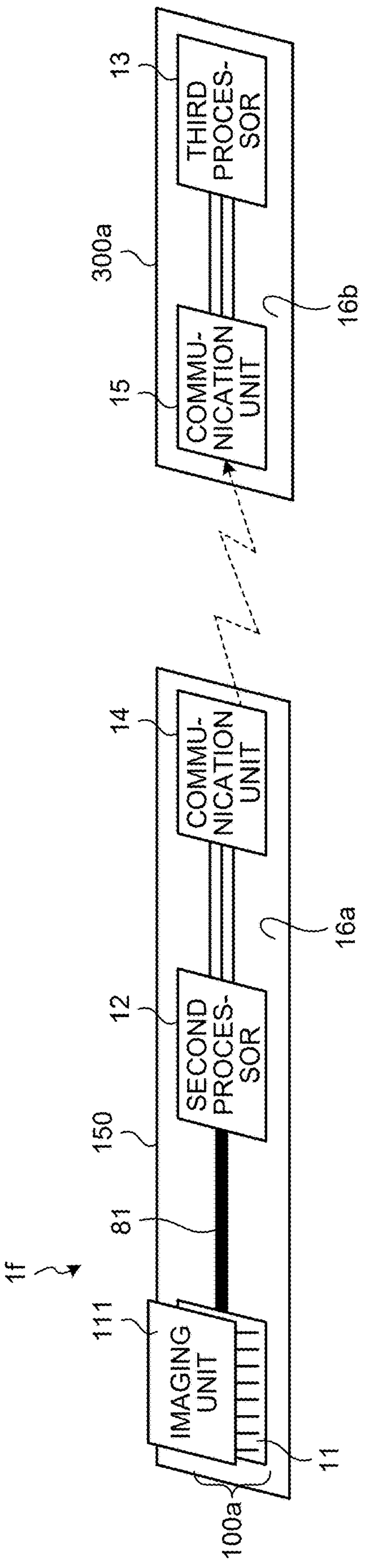
FIG. 40 is a schematic diagram illustrating a fifth signal path example of the information processing system according to the fourth embodiment.

A fifth signal path example according to the fourth embodiment will be described. FIG. 40 is a schematic diagram illustrating the fifth signal path example of the information processing system according to the fourth embodiment.

In FIG. 40, as compared with the structure illustrated in FIG. 34, an information processing system 1*f* has a structure connecting the sensing device 10 and the first processor 11 by the parallel transfer signal line 80 and this structure is realized by using a stacked structure in which the sensing device 10 and the first processor 11 are stacked and connected by the parallel transfer signal lines of the plurality of signal lines 500 illustrated in FIG. 39A or 39B.

In the structure according to the fifth signal path example according to the fourth embodiment illustrated in FIG. 40, the sensing device 10 and the first processor 11 are stacked to form a stacked structure band. Therefore, by applying the structure according to the fifth signal path example, a mounting area on the substrate 16*a* can be reduced as compared with the structure described with reference to FIGS. 33, 34, and 36.

At the same time, in the structure according to the fifth signal path example, the first processor 11 and the second processor 12 disposed outside the stacked structure of the sensing device 10 and the first processor 11 are connected by a high-speed serial transfer signal line 81. As a result, by applying the structure of the fifth signal path example, an effect of facilitating the layout of the wiring in the substrate 16*a* can also be obtained.

Furthermore, in the structure according to the fifth signal path example, the first processor 11 and the second processor 12 are connected by the high-speed serial transfer signal line 81, and the sensing device 10 and the first processor 11 are connected by the parallel transfer signal line by a plurality of signal lines 500. Therefore, by applying the fifth signal path example, as described with reference to FIGS. 35 and 37, the latency from the output of the pixel data from the sensing device 10 to the start of the processing by the second DNN 52 can be reduced, as compared with the structure illustrated in FIG. 36, for example, in which the sensing device 10 and the first processor 11 are connected by the high-speed serial transfer signal line 81.

Sixth Signal Path Example According to Fourth Embodiment

Figure 41:
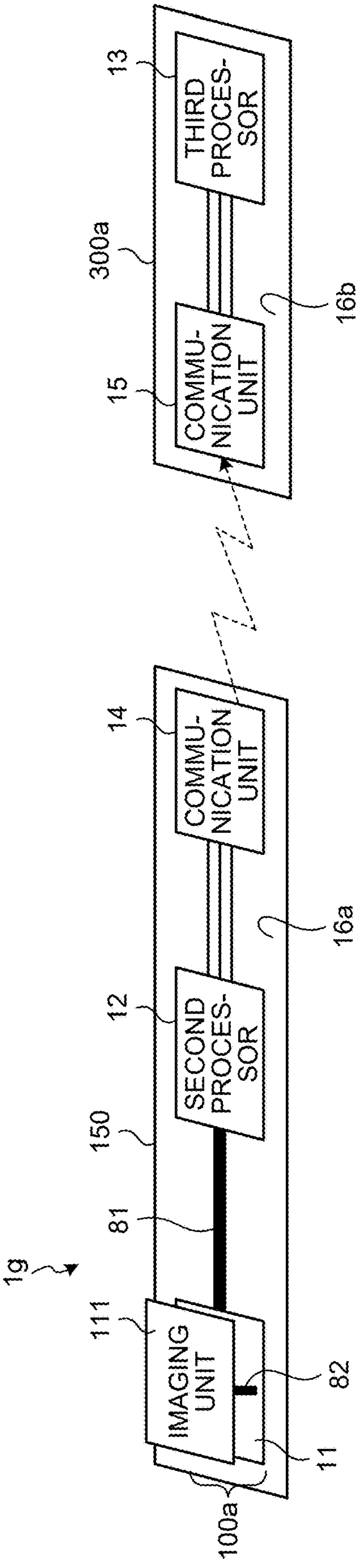
FIG. 41 is a schematic diagram illustrating a sixth signal path example of the information processing system according to the fourth embodiment.

A sixth signal path example according to the fourth embodiment will be described. FIG. 41 is a schematic diagram illustrating the sixth signal path example of the information processing system according to the fourth embodiment. In FIG. 41, an information processing system 1*g* uses one or more high-speed serial transfer signal lines 82, instead of the parallel transfer signal line including the plurality of signal lines 500, as a signal path between the imaging unit 111 and the first processor 11 with respect to the structure illustrated in FIG. 40.

Seventh Signal Path Example According to Fourth Embodiment

Figure 42:
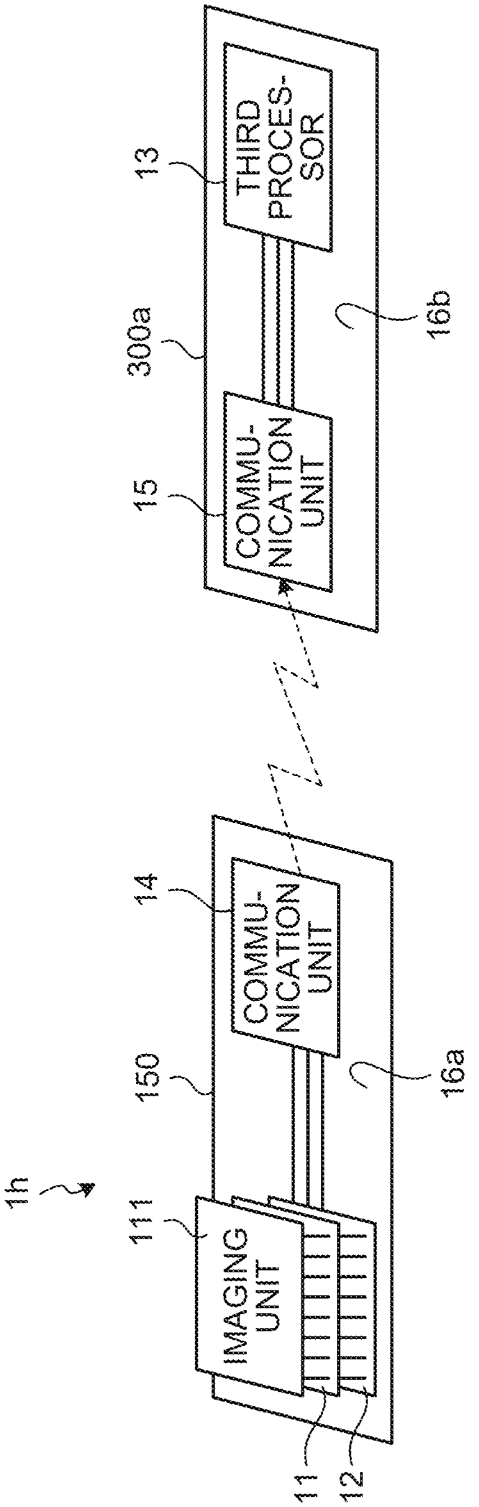
FIG. 42 is a schematic diagram illustrating a seventh signal path example of the information processing system according to the fourth embodiment.

A seventh signal path example according to the fourth embodiment will be described. FIG. 42 is a schematic diagram illustrating the seventh signal path example of the information processing system according to the fourth embodiment. In FIG. 42, in an information processing system 1*h*, the imaging unit 111, the first processor 11, and the second processor 12 are stacked in the vertical direction of the substrate 16*a* to form the stacked structure. In this stacked structure, the signal line for transmitting data between the imaging unit 111 and the first processor 11 and the signal line for transmitting data between the first processor 11 and the second processor 12 are configured by the parallel transfer signal line including a plurality of signal lines extending in the vertical direction with respect to the substrate 16*a*.

Figure 43A:
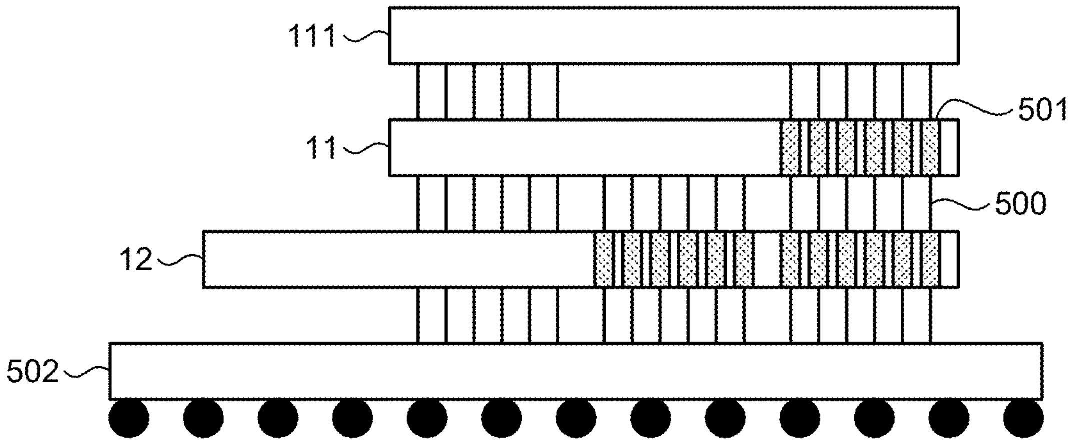
FIG. 43A is a schematic diagram schematically illustrating a vertical structure of a stacked structure in the seventh signal path example according to the fourth embodiment.
Figure 43B:
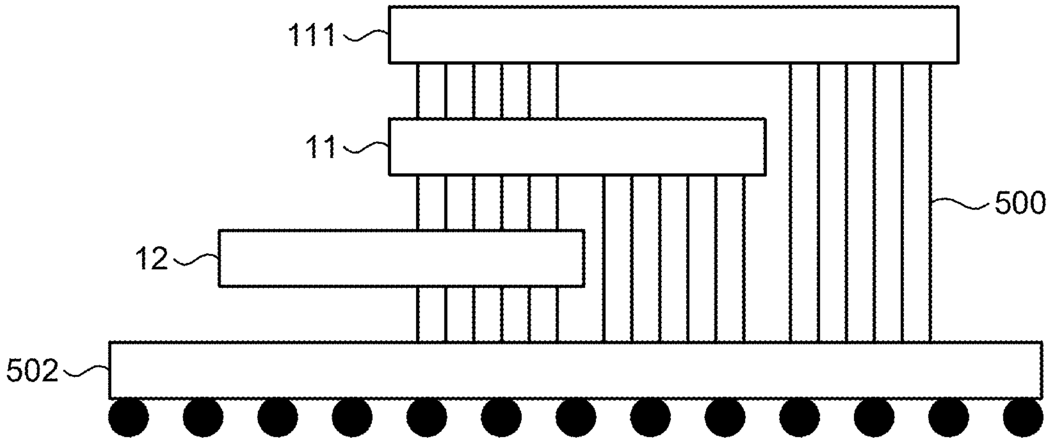
FIG. 43B is a schematic diagram schematically illustrating the vertical structure of the stacked structure in the seventh signal path example according to the fourth embodiment.

FIGS. 43A and 43B are schematic diagrams schematically illustrating a vertical structure of the stacked structure in the seventh signal path example according to the fourth embodiment.

In FIG. 43A, the imaging unit 111 and the first processor 11, the first processor 11 and the second processor 12, and the second processor 12 and the interposer substrate 502 are connected by the parallel transfer signal line of a plurality of signal lines 500, respectively. Furthermore, in the example in FIG. 43A, the imaging unit 111 and the interposer substrate 502 are connected via the conductor 501 provided inside the first processor 11 and the second processor 12, respectively. Similarly, the first processor 11 and the interposer substrate 502 are connected via the conductor 501 provided inside the second processor 12.

Not limited to this example, as illustrated in FIG. 43B, the imaging unit 111 and the interposer substrate 502 may be connected via the outside of the first processor 11 and the second processor 12, and the first processor 11 and the interposer substrate 502 may be connected via the outside of the second processor 12.

As described above, in the seventh signal path example according to the fourth embodiment, the stacked structure in which the imaging unit 111, the first processor 11, and the second processor 12 are stacked or superimposed is adopted. Therefore, the layout of the signal path of data is facilitated between the imaging unit 111 and the first processor 11 and between the first processor 11 and the second processor 12. Furthermore, by adopting the stacked structure in which the imaging unit 111, the first processor 11, and the second processor 12 are stacked or superimposed, the imaging device 150 can be further downsized as compared with the fourth signal path example according to the fourth embodiment described above.

Eighth Signal Path Example According to Fourth Embodiment

Figure 44:
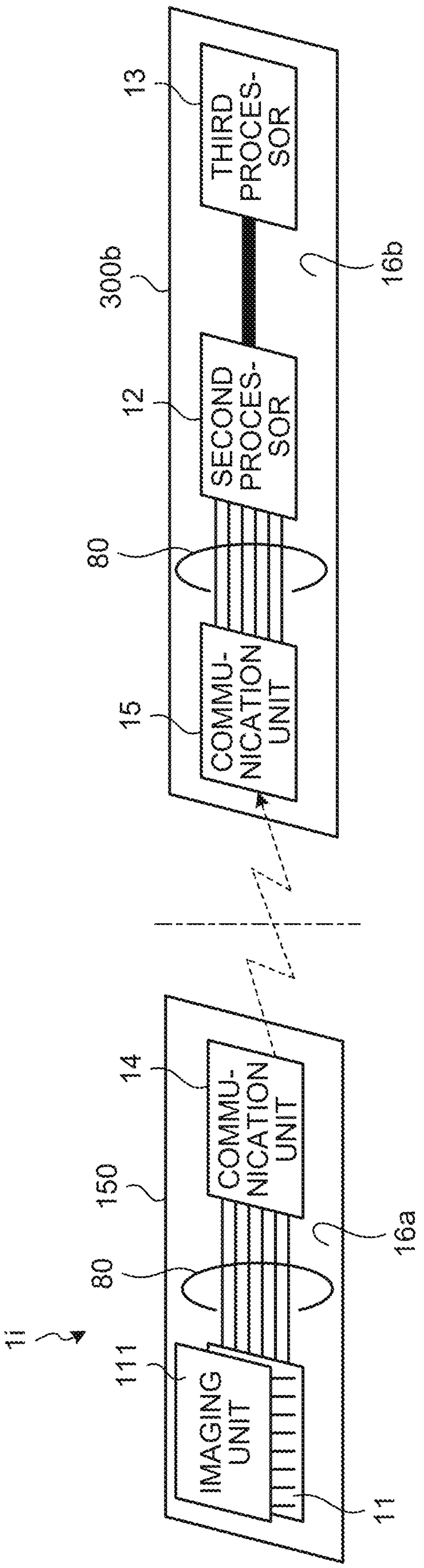
FIG. 44 is a schematic diagram illustrating an eighth signal path example of the information processing system according to the fourth embodiment.

An eighth signal path example according to the fourth embodiment will be described. FIG. 44 is a schematic diagram illustrating the eighth signal path example of the information processing system according to the fourth embodiment. In FIG. 44, an information processing system 1*i* is configured such that the second processor 12 is included in the information processing apparatus 300*b*. The imaging device 150 includes the stacked structure in which the imaging unit 111 and the first processor 11 are stacked or superimposed, and the communication unit 14.

In the example in FIG. 44, in the imaging device 150, the signal path between the first processor 11 and the communication unit 14 is configured with the parallel transfer signal line 80. Furthermore, in the information processing apparatus 300*b*, the signal path between the communication unit 15 and the second processor 12 is configured with the parallel transfer signal line 80. Furthermore, in the information processing apparatus 300*b*, the signal path between the second processor 12 and the third processor is configured with the high-speed serial transfer signal line 81.

According to the configuration illustrated in FIG. 44, by configuring the information processing apparatus 300*b* to have relatively abundant calculation resources, the processing by the second DNN 52 can be performed with higher accuracy and higher functionality in the second processor 12.

Note that, in the configuration illustrated in FIG. 44, the signal path between the first processor 11 and the communication unit 14 in the imaging device 150 and the signal path between the communication unit 15 and the second processor 12 in the information processing apparatus 300*b* may be the high-speed serial transfer signal line 81. The signal path between the second processor 12 and the third processor 13 may be the parallel transfer signal line 80.

Ninth Signal Path Example According to Fourth Embodiment

Figure 45A:
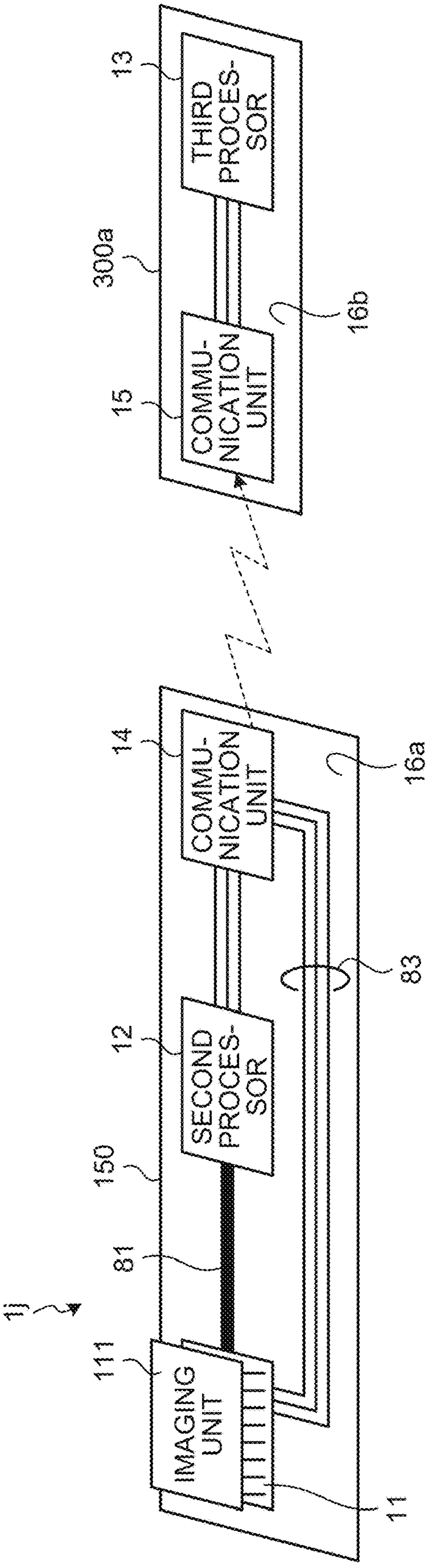
FIG. 45A is a schematic diagram illustrating a ninth signal path example of the information processing system according to the fourth embodiment.
Figure 45B:
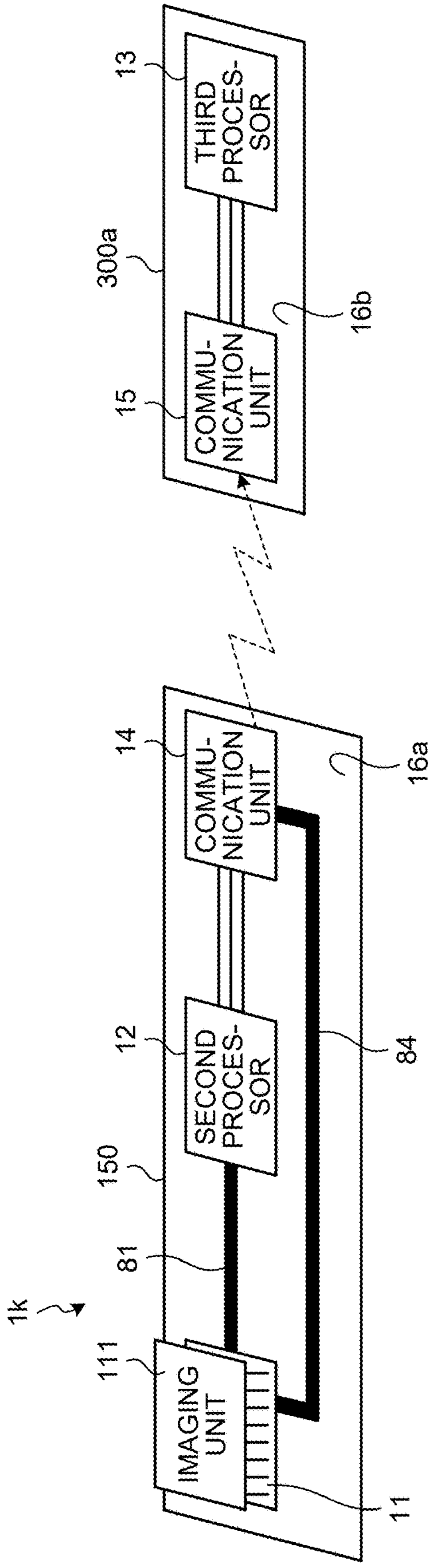
FIG. 45B is a schematic diagram illustrating the ninth signal path example of the information processing system according to the fourth embodiment.

A ninth signal path example according to the fourth embodiment will be described. FIGS. 45A and 45B are schematic diagrams illustrating the ninth signal path example of the information processing system according to the fourth embodiment. The ninth signal path example according to the fourth embodiment is an example in which the signal path connecting the first processor 11 and the communication unit 14 is added, for example, to the configuration of the information processing system 1*f* illustrated in FIG. 40.

FIG. 45A illustrates an example of an information processing system 1*j* in which the signal path between the first processor 11 and the communication unit 14 is a parallel transfer signal line 83 including a plurality of signal lines. Furthermore, FIG. 45B illustrates an example of an information processing system 1*k* in which the signal path between the first processor 11 and the communication unit 14 is one or more high-speed serial transfer signal lines 84. The configuration illustrated in FIG. 45B facilitates layout on the substrate 16*a* as compared with the configuration illustrated in FIG. 45A.

Note that the configuration of adding the signal path connecting the first processor 11 and the communication unit 14 is also applicable to the first to eighth signal path examples according to the fourth embodiment described above.

5. Fifth Embodiment

Next, a fifth embodiment of the present disclosure will be described. The fifth embodiment relates to a configuration of a memory used by the first processor 11 and the second processor 12. In the following description, it is assumed that the first processor 11 and the second processor 12 are configured on the same substrate 16*a*.

First Example of Fifth Embodiment

First, a first example of the fifth embodiment will be described. The first example of the fifth embodiment is an example in which the first processor 11 and the memory used by the first processor 11 are provided in a die or a chip of one semiconductor integrated circuit, and the second processor 12 and the memory used by the second processor 12 are provided in a die or a chip of another semiconductor integrated circuit.

Figure 46A:
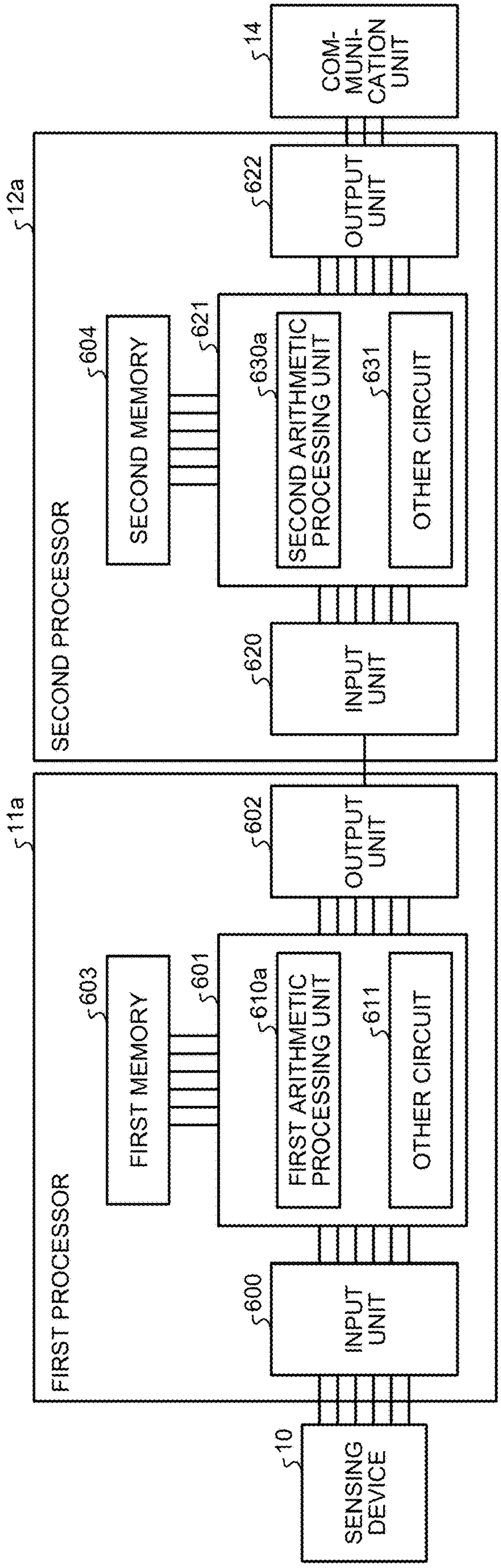
FIG. 46A is a schematic diagram illustrating an example of a configuration of a first example according to a fifth embodiment.
Figure 46B:
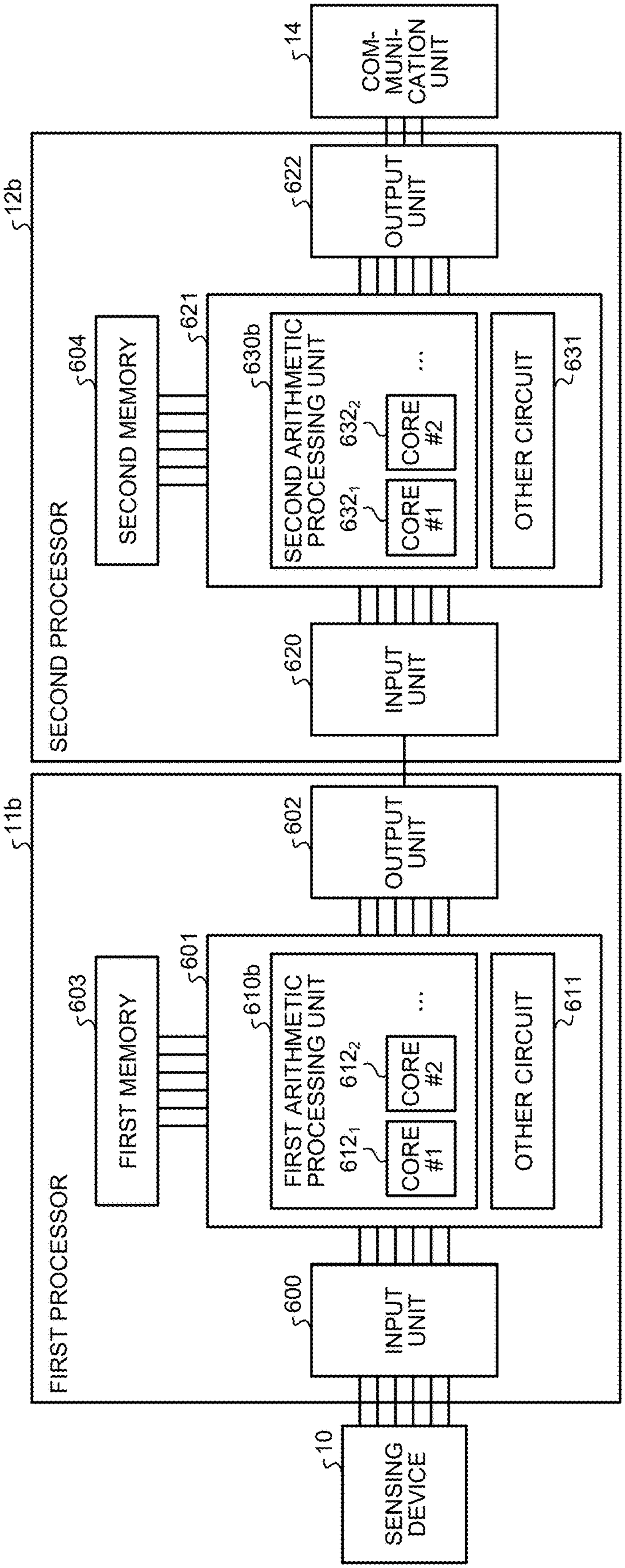
FIG. 46B is a schematic diagram illustrating an example of a configuration of the first example according the fifth embodiment.

FIGS. 46A and 46B are schematic diagrams illustrating an example of a configuration according to the first example of the fifth embodiment.

In FIG. 46A, a first processor 11*a* includes an input unit 600, an arithmetic circuit unit 601, an output unit 602, and a first memory 603. The arithmetic circuit unit 601 includes a first arithmetic processing unit 610*a* and an other circuit 611.

The input unit 600 is an input interface in the first processor 11*a*, and receives an output from the sensing device 10. The first arithmetic processing unit 610*a* has a single-core configuration and executes a predetermined arithmetic operation according to a program. The other circuit 611 may include a circuit (such as a clock circuit) used for arithmetic processing by the first arithmetic processing unit 610*a* and a circuit that performs arithmetic processing other than the first arithmetic processing unit 610*a*. The output unit 602 is an output interface in the first processor 11*a*, and outputs a computation result by the first arithmetic processing unit 610*a* to the outside of the first processor 11*a*.

The first memory 603 is a memory used for arithmetic processing by the first arithmetic processing unit 610*a*. For example, the first DNN 51 is stored in the first memory 603. The first arithmetic processing unit 610*a* reads the first DNN 51 from the first memory 603 and executes, for example, the DNN process by the first phase.

A second processor 12*a* includes an input unit 6220, an arithmetic circuit unit 621, an output unit 622, and a second memory 604. The arithmetic circuit unit 621 includes a second arithmetic processing unit 630*a* and the other circuit 631.

The input unit 620 is an input interface in the second processor 12*a*, and receives an output from the first processor 11. The second arithmetic processing unit 630*a* has a single-core configuration and executes a predetermined arithmetic operation according to a program. The other circuit 631 may include a circuit (such as a clock circuit) used for arithmetic processing by the second arithmetic processing unit 630*a* and a circuit that performs arithmetic processing other than the second arithmetic processing unit 630*a*. The output unit 622 is an output interface in the second processor 12*a*, and outputs a computation result by the second arithmetic processing unit 630*a* to the outside of the second processor 12 *a*.

The second memory 604 is a memory used for arithmetic processing by the second arithmetic processing unit 630*a*. For example, the second DNN 52 is stored in the second memory 604. The second arithmetic processing unit 630*a* reads the second DNN 52 from the second memory 604 and executes, for example, the DNN process by the second phase.

The first arithmetic processing unit 610*a* and the second arithmetic processing unit 630*a* may have a multi-core configuration. FIG. 46B illustrates a configuration of a first processor 11*b* and a second processor 12*b* in which a first arithmetic processing unit 610*b* and a second arithmetic processing unit 630*b* having the multi-core configuration are provided instead of the first arithmetic processing unit 610*a* and the second arithmetic processing unit 630*a* in FIG. 46A.

The first arithmetic processing unit 610*b* includes a plurality of cores $\mathbf{612}_1$, $\mathbf{612}_2$, and so on capable of executing arithmetic processing (also respectively indicated as Core #1, Core #2, and so on in the drawing). Similarly, the second arithmetic processing unit 630*b* includes a plurality of cores $\mathbf{632}_1$, $\mathbf{632}_2$, and so on capable of executing arithmetic processing (also respectively indicated as Core #1, Core #2, and so on in the drawing).

Note that, in the configuration illustrated in FIG. 46B, for example, the first processor 11*b* may have a network structure in which the first DNN is divided in the time direction and the first DNN is shared and executed by the plurality of cores $\mathbf{612}_1$, $\mathbf{612}_2$, and so on. Furthermore, the first DNN 51 may be divided in the depth direction of the network to have a network structure in which the first DNN 51 is shared and executed by the plurality of cores $\mathbf{612}_1$, $\mathbf{612}_2$, and so on. Furthermore, the first DNN 51 may be configured to be executed in parallel by the plurality of cores $\mathbf{612}_1$, $\mathbf{612}_2$, and so on.

According to the configuration in FIG. 46B, it is possible to further improve the arithmetic capability as compared with the configuration in FIG. 46A in which the first arithmetic processing unit 610*a* and the second arithmetic processing unit 630*a* are single cores.

Second Example of Fifth Embodiment

First, a second example of the fifth embodiment will be described. The second example of the fifth embodiment is an example in which the first processor 11 and the memory used by the first processor 11 are provided in dies or chips of different semiconductor integrated circuits, and the second processor 12 and the memory used by the second processor 12 are provided in dies or chips of different semiconductor integrated circuits.

Figure 47A:
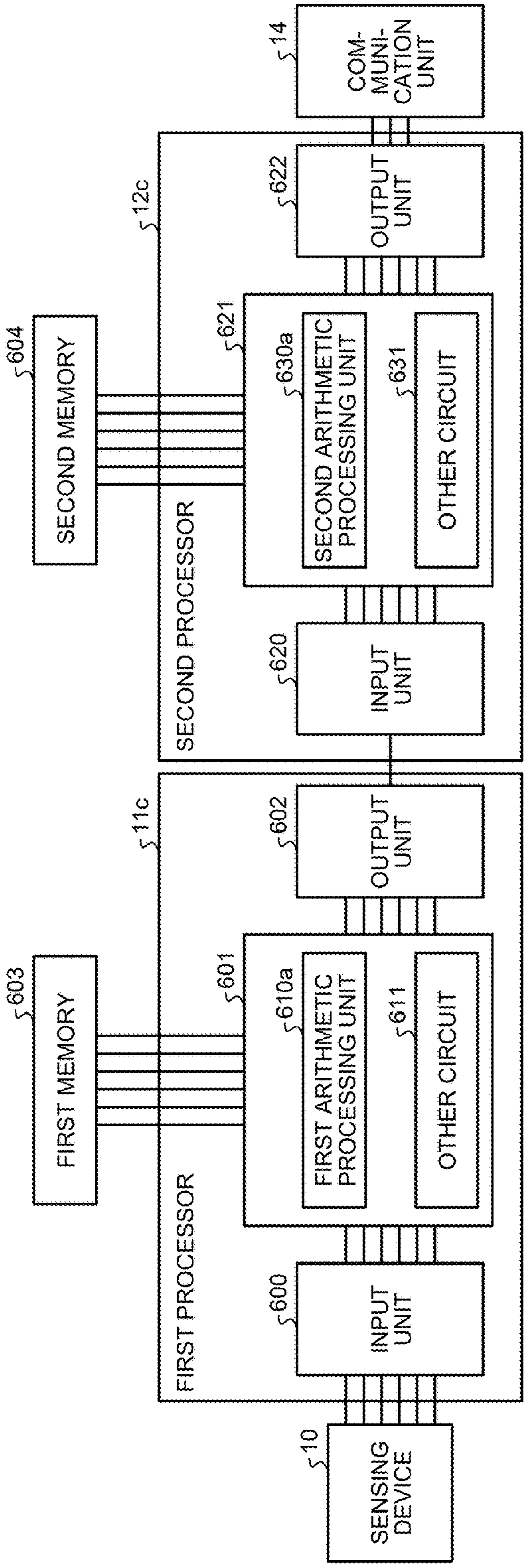
FIG. 47A is a schematic diagram illustrating an example of a configuration of a second example according to the fifth embodiment.
Figure 47B:
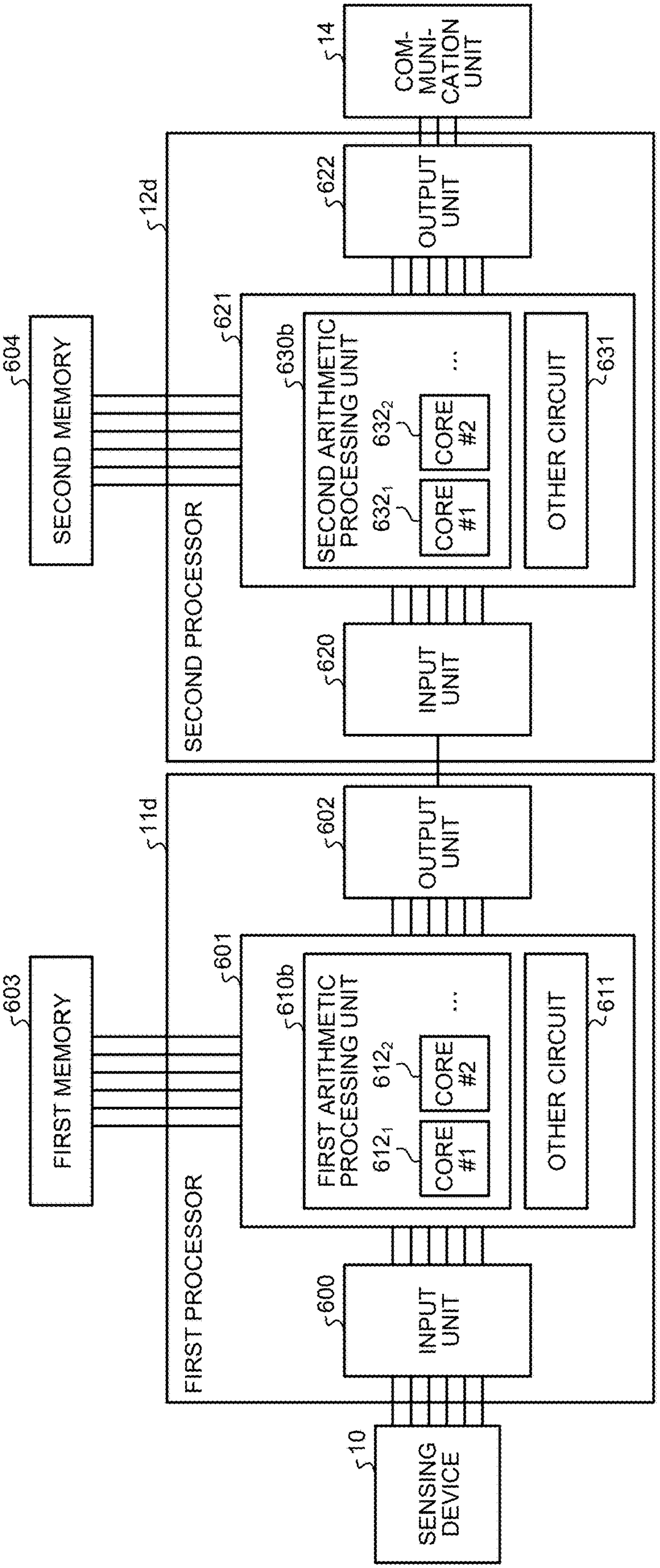
FIG. 47B is a schematic diagram illustrating an example of a configuration of the second example according to the fifth embodiment.

FIGS. 47A and 47B are schematic diagrams illustrating an example of a configuration according to the second example of the fifth embodiment.

In the example in FIG. 47A, a first processor 11*c* includes a single-core first arithmetic processing unit 610*a*, and the first memory 603 used by the first arithmetic processing unit 610*a* for arithmetic processing is provided outside the first processor 11*c*. Similarly, a second processor 12*c* includes the single-core second arithmetic processing unit 630*a*, and the second memory 604 used by the second arithmetic processing unit 630*a* for arithmetic processing is provided outside the second processor 12*c*.

In this manner, by configuring the first memory 603 and the second memory 604 in dies or chips different from those of the first processor 11*c* and the second processor 12*c*, it is easy to increase capacities of the first memory 603 and the second memory 604 as compared with the configurations illustrated in FIGS. 46A and 46B. In addition, since a die or a chip of a generally distributed memory can be used as the die or the chip of the first memory 603 and the second memory 604, it is possible to suppress the manufacturing cost.

Furthermore, in the configuration in FIG. 47A, for example, the first processor 11*c* and the first memory 603 can be stacked or superimposed to form the stacked structure. In this case, it is possible to reduce an outer shape of the substrate on which the first processor 11*c* and the first memory 603 are mounted or a device on which the substrate is mounted.

FIG. 47B illustrates a configuration example of a first processor 11*d* including a first arithmetic processing unit 610*b* having a plurality of cores $612_1$, $612_2$, and so on that perform arithmetic processing, instead of the first arithmetic processing unit 610*a* in FIG. 47A, and the first memory 603 is configured in a different die. In addition, FIG. 47B also illustrates a configuration example of a second processor 12*d* including a second arithmetic processing unit 630*b* having a plurality of cores $632_1$, $632_2$, and so on that perform arithmetic processing, instead of the second arithmetic processing unit 630*a* in FIG. 47A, and the second memory 604 is configured in a different die.

Also in the configuration illustrated in FIG. 47B, effects equivalent to those of the configuration in FIG. 47A can be obtained. Furthermore, in the configuration illustrated in FIG. 47B, the arithmetic capability can be further improved as compared with the configuration illustrated in FIG. 47A.

Third Example of Fifth Embodiment

First, a third example of the fifth embodiment will be described. The third of the fifth embodiment is an example in which the memory used by the first processor 11 and the memory used by the second processor 12 are made common. The memory commonly used by the first processor 11 and the second processor 12 is configured in a die different from the die in which the first processor 11 and the second processor 12 are configured.

Figure 48A:
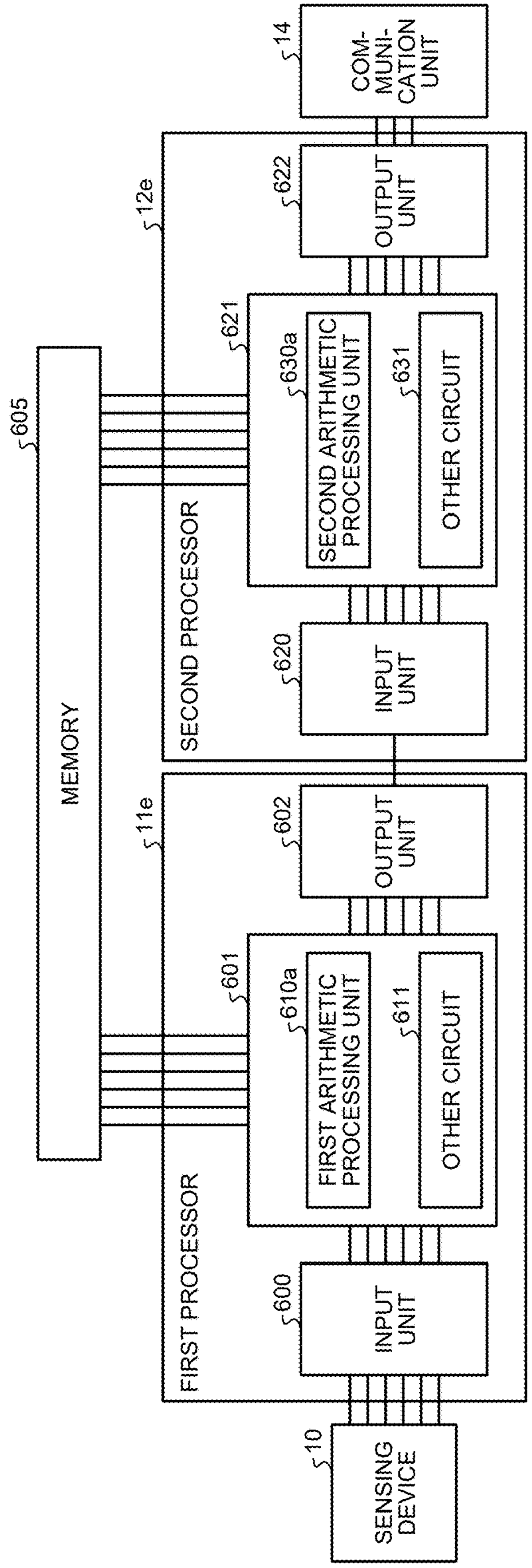
FIG. 48A is a schematic diagram illustrating an example of a configuration of a third example according to the fifth embodiment.
Figure 48B:
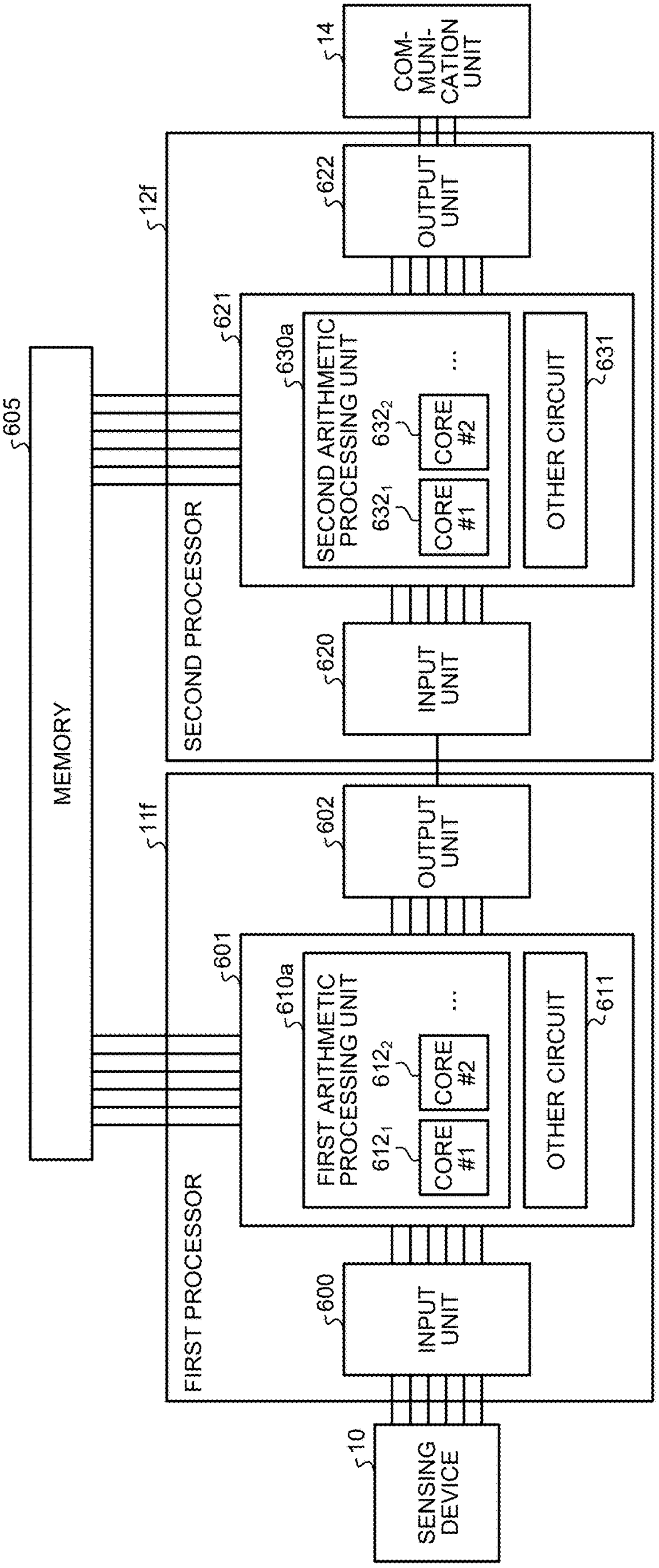
FIG. 48B is a schematic diagram illustrating an example of a configuration of the third example according to the fifth embodiment.

FIGS. 48A and 48B are schematic diagrams illustrating an example of a configuration according to the third example of the fifth embodiment.

In the example in FIG. 48A, a first processor 11*e* includes the single-core first arithmetic processing unit 610*a*, and a second processor 12*e* includes the single-core second arithmetic processing unit 630*a*. The memory 605 commonly used by the first arithmetic processing unit 610*a* and the second arithmetic processing unit 630*a* is provided outside the first processor 11*e* and the second processor 12*e*.

As described above, by using the memory 605 in which the memory used by the first processor 11*e* and the memory used by the second processor 12*e* are common and configuring the memory 605 in a die different from those of the first processor 11*e* and the second processor 12*e*, it is easy to increase the capacity of the memory 605 used by the first processor 11*e* and the second processor 12*e* as compared with the configuration illustrated in FIGS. 46A and 46B. In addition, the memory used by the first processor 11*e* and the memory used by the second processor 12*e* are made common, thereby facilitating the layout.

In this manner, by sharing the memory used by the first processor 11*e* and the second processor 12*e* and configuring the memory in a die different from the first processor 11*c* and the second processor 12*c*, it is easy to increase the capacity of the memory used by the first processor 11*e* and the second processor 12*e* as compared with the configurations illustrated in FIGS. 46A and 46B. In addition, since a commercially-available memory die can be used as the die of the memory 605, it is possible to suppress the manufacturing cost. In addition, since the number of memories can be reduced as compared with the configuration illustrated in FIGS. 47A and 47B, it is possible to reduce the outer shape of the substrate on which the first processor 11*e*, the second processor 12*e*, and the memory 605 are mounted or a device on which the substrate is mounted.

FIG. 48B illustrates an example of a first processor 11*f* including the first arithmetic processing unit 610*b* having a plurality of cores $612_1$, $612_2$, and so on that perform arithmetic processing, instead of the first arithmetic processing unit 610*a* in FIG. 48A, and a second processor 12*f* including a second arithmetic processing unit 630*b* having a plurality of cores $632_1$, $632_2$, and so on that perform arithmetic processing, instead of the second arithmetic processing unit 630*a*. The memory 605 commonly used by the first arithmetic processing unit 610*b* and the second arithmetic processing unit 630*b* is provided outside the first processor 11*f* and the second processor 12*f*.

Also in the configuration illustrated in FIG. 48B, effects equivalent to those of the configuration in FIG. 48A can be obtained. Furthermore, in the configuration illustrated in FIG. 48B, the arithmetic capability can be further improved as compared with the configuration illustrated in FIG. 48A.

Note that the effects described in the present specification are merely examples and not limited, and other effects may be provided.

The present technology can also have the following configurations.

(1) An information processing apparatus including
- a controller that determines, from a plurality of networks, a network executed on a one-to-one basis by each of a plurality of processors, in which
- the controller
- determines, among the plurality of networks, at least one network as a network receiving input data, and
- determines a network different from the network receiving the input data, among the plurality of networks, as a network that outputs output data according to the input data.

(2) The information processing apparatus according to the above (1), comprising
- the controller that determines a first network, among the plurality of networks, executed by a first processor among the plurality of processors, and the second network, among the plurality of networks, executed by a second processor among the plurality of processors, the first network receiving the input data, the second network receiving an output of the first network and outputting output data according to the input data.

(3) The information processing apparatus according to the above (2), in which
- the controller
- determines the first network and the second network according to required performance that is performance required for execution of processing by at least one of the first network and the second network.

(4) The information processing apparatus according to the above (3), in which
- the controller
- determines the first network and the second network based on at least one of the required performance for a hardware element and the required performance for an application element, the application element being required for the output data by an application that executes processing on the output data.

(5) The information processing apparatus according to the above (4), in which the hardware element includes capability and constraint of at least one of the first processor, the second processor, and hardware generating the input data, and the application element includes at least one of a rate of the output data, a transmission size, and a cost processing by the application.

(6) The information processing apparatus according to any one of the above (3) to (5), in which the controller determines the first network and the second network based on the required performance and a key performance indicator for a predetermined network.

(7) The information processing apparatus according to any one of the above (3) to (6), in which the controller determines the first network and the second network so as to perform a fixed point operation in the first network and a floating point operation in the second network.

(8) The information processing apparatus according to any one of the above (3) to (7), in which the controller determines processing by the first network and processing by the second network such that the processing by the second network is executed as a pipeline process on the processing by the first network.

(9) The information processing apparatus according to the above (2), in which a first function for the input data is applied to the first network included in a predetermined network, and a second function for a processing result of the first function is applied to the second network.

(10) The information processing apparatus according to the above (9), in which the controller determines the first function according to the second function.

(11) The information processing apparatus according to the above (9) or (10), in which the controller updates or changes the second function according to a learning result of the second network.

(12) The information processing apparatus according to any one of the above (9) to (11), in which the controller changes the second network according to the output of the first network.

(13) The information processing apparatus according to any one of the above (9) to (12), in which the controller determines, as the second network, a plurality of second networks that corresponds to a plurality of different second functions on a one-to-one basis and is capable of parallel processing.

(14) The information processing apparatus according to the above (13), in which the controller determines the plurality of second networks so as to commonly input an output of one of the first networks.

(15) The information processing apparatus according to the above (9), in which a plurality of first networks that corresponds to a plurality of different first functions on a one-to-one basis and is capable of parallel processing is determined as the first network.

(16) The information processing apparatus according to the above (15), in which the controller determines the second network so as to receive an output of each of the plurality of first networks.

(17) The information processing apparatus according to any one of the above (9) to (16), in which the controller determines the first network giving priority to speed with respect to processing of the first function, and determines the second network giving priority to at least one of accuracy and function with respect to processing of the second function.

(18) The information processing apparatus according to the above (17), in which the controller determines the first network and the second network so as to retrain the first network based on a processing result of the second network.

(19) The information processing apparatus according to any one of the above (9) to (18), in which the controller determines the first network and the second network so as to reduce data output from the first network, thereby reducing input to the second network.

(20) An information processing method executed by a computer, the information processing method including a control step of determining, among a plurality of networks, a network executed on a one-to-one basis by a plurality of processors, in which the control step includes determining at least one network among the plurality of networks as a network receiving input data, and determining another network different from the network receiving the input data, among the plurality of networks, as a network that outputs output data according to the input data.

(21) An information processing program causing a computer to execute a control step of determining, among a plurality of networks, a network executed on a one-to-one basis by a plurality of processors, in which the control step includes determining at least one network among the plurality of networks as a network receiving input data, and determining another network different from the network receiving the input data, among the plurality of networks, as a network that outputs output data according to the input data.

(22) An information processing system including an information processing apparatus including a first processor receiving input data and executing a network among a plurality of networks, a second processor executing one network different from the network receiving the input data among the plurality of networks and outputting output data according to the input data, and a controller that determines a network, among the plurality of networks, a network to be executed on a one-to-one basis by a plurality of processors including the first processor and the second processor.

(23) The information processing system according to the above (22), in which the controller determines a first network, among the plurality of networks, executed by the first processor among the plurality of processors, and a second network receiving an output of the first network and outputting output data according to the input data, the second processor among the plurality of processors executing the second network.

(24) The information processing system according to the above (23), in which the first processor and the second processor are configured in a same housing.

(25) The information processing system according to the above (23), in which the first processor is configured in a first housing and the second processor is configured in a second housing.

(26) The information processing system according to any one of (23) to (25), further including a sensor device that outputs the input data.

(27) The information processing system according to the above (26), in which the sensor device and the first processor are integrally configured.

(28) The information processing system according to any one of the above (23) to (27), in which the second processor and the first processor are connected via a communications network.

(29) The information processing system according to any one of the above (23) to (28), further including an other information processing apparatus different from the information processing apparatus, the other information processing apparatus being provided with an application that executes processing on the output data output from the second processor.

Furthermore, the present technology can also have the following configurations.

(30) An information processing apparatus comprising:

a controller configured to select, from a plurality of networks, one or more first networks executed on a one-to-one basis by one or more first processors different from each other, and select, from the plurality of networks, a second network executed by a second processor; and a transmission unit configured to transmit the one or more first networks to the one or more first processors on a one-to-one basis, and transmit the second network to the second processor, wherein the second processor executes the second network using output data as an input, the output data being output as a result of executing a network selected from the one or more first networks for at least one processor among the one or more first processors, and the controller selects, from the plurality of networks, the second network according to the output data.

(31) The information processing apparatus according to the above (30), wherein at least one of the one or more first processors is different from the second processor.

(32) The information processing apparatus according to the above (30) or (31), wherein the controller adaptively selects the second network according to the output data.

(33) The information processing apparatus according to any one of the above (30) to (32), wherein the controller determines the one or more first networks and the second network according to required performance that is performance required for execution of processing by at least one of the one or more first networks and the second network.

(34) The information processing apparatus according to the above (33), wherein the controller determines the one or more first networks and the second network based on at least one of the required performance for a hardware element and the required performance for an application element, the application element being required for the output data by an application that executes processing on the output data.

(35) The information processing apparatus according to the above (34), wherein the hardware element includes capability and constraint of at least one of the one or more first processors, the second processor, and hardware generating input data to be input to the one or more first networks, and the application element includes at least one of a rate of the output data, a transmission size, and a processing cost in the application.

(36) The information processing apparatus according to any one of the above (33) to (35), wherein the controller determines the one or more first networks and the second network based on the required performance and a key performance indicator for a predetermined network.

(37) The information processing apparatus according to any one of the above (33) to (36), wherein the controller determines the one or more first networks and the second network so as to perform a fixed point operation in the one or more first networks and a floating point operation in the second network.

(38) The information processing apparatus according to any one of the above (33) to (37), wherein the controller determines processing by the one or more first networks and processing by the second network such that the processing by the second network is executed as a pipeline process on the processing by each of the one or more first networks.

(39) The information processing apparatus according to the above (30), wherein one or more first functions for input data is applied to the one or more first networks on a one-to-one basis, the input data being input to the one or more first networks included in a predetermined network, and a second function for a processing result of the first function is applied to the second network.

(40) The information processing apparatus according to the above (39) wherein the controller determines each of the one or more first functions according to the second function.

(41) The information processing apparatus according to the above (39) or (40), wherein the controller updates or changes the second function according to a learning result of the second network.

(42) The information processing apparatus according to any one of the above (39) to (41), wherein the controller determines, as the second network, a plurality of the second networks that corresponds on a one-to-one basis to a plurality of the second functions different from each other and is capable of parallel processing.

(43) The information processing apparatus according to the above (42), wherein the controller determines the plurality of second networks so as to commonly input an output of one of the one or more first networks.

(44) The information processing apparatus according to the above (39), wherein as the one or more first networks, a plurality of the first networks that corresponds on a one-to-one basis to the one or more first functions different from each other and is capable of parallel processing is determined.

(45) The information processing apparatus according to the above (44), wherein the controller determines the second network so as to receive an output of each of the one or more first networks.

(46) The information processing apparatus according to any one of the above (39) to (45), wherein the controller determines each of the one or more first networks giving priority to speed with respect to processing of each of the one or more first functions, and determines the second network giving priority to at least one of accuracy and a function with respect to processing of the second function.

(47) The information processing apparatus according to the above (46), wherein the controller determines the one or more first networks and the second network so as to retrain the one or more first networks based on a processing result of the second network.

(48) The information processing apparatus according to any one of the above (39) to (47), wherein the controller determines the one or more first networks and the second network so as to reduce data output from the one or more first networks and input the data reduced to the second network.

(49) An information processing method executed by a computer, the information processing method comprising:

a control step of selecting, from a plurality of networks, one or more first networks executed on a one-to-one basis by one or more first processors different from each other, and selecting, from the plurality of networks, a second network executed by a second processor; and a transmitting step of transmitting the one or more first networks to the one or more first processors on a one-to-one basis and transmitting the second network to the second processor, wherein the second processor executes the second network using output data as an input, the output data being output as a result of executing a network selected from the one or more first networks for at least one processor among the one or more first processors, and the control step includes selecting, from the plurality of networks, the second network according to the output data.

(50) An information processing program causing a computer to execute:

a control step of selecting, from a plurality of networks, one or more first networks executed on a one-to-one basis by one or more first processors different from each other, and selecting, from the plurality of networks, a second network executed by a second processor; and a transmitting step of transmitting the one or more first networks to the one or more first processors on a one-to-one basis and transmitting the second network to the second processor, wherein the second processor executes the second network using output data as an input, the output data being output as a result of executing a network selected from the one or more first networks for at least one processor among the one or more first processors, and the control step includes selecting, from the plurality of networks, the second network according to the output data.

(51) An information processing system comprising an information processing apparatus including:

one or more first processors different from each other, the one or more first processors being configured to execute on a one-to-one basis one or more first networks selected from a plurality of networks;

a second processor configured to execute a second network selected from the plurality of networks;

a controller configured to select the one or more first networks from the plurality of networks and select the second network from the plurality of networks; and a transmission unit configured to transmit the one or more first networks to the one or more first processors on a one-to-one basis and transmit the second network to the second processor, wherein the second processor executes the second network using output data as an input, the output data being output as a result of executing a network selected from the one or more first networks for at least one processor among the one or more first processors, and the controller selects, from the plurality of networks, the second network according to the output data.

(52) The information processing system according to the above (51), wherein at least one processor of the one or more first processors and the second processor are configured in a same housing.

(53) The information processing system according to the above (51), wherein at least one of the one or more first processors is configured in a first housing and the second processor is configured in a second housing.

(54) The information processing system according to any one of the above (51) to (53), further comprising a sensor device configured to output input data input to the one or more first networks.

(55) The information processing system according to the above (54), wherein the sensor device and at least one processor of the one or more first processors are integrally configured.

(56) The information processing system according to any one of the above (51) to (55), wherein the second processor and each of the one or more first processors are connected via a communication network.

(57) The information processing system according to any one of the above (51) to (56), further comprising an other information processing apparatus different from the information processing apparatus, the other information processing apparatus being provided with an application configured to execute processing on the output data that is output from the second processor.

REFERENCE SIGNS LIST

1, 1*b*, 1*c*, 1*d*, 1*e*, 1*f*, 1*g*, 1*h*, 1*i*, 1*j*, 1*k* INFORMATION PROCESSING SYSTEM
10 SENSING DEVICE
11, 11-1, 11-2, 11-3, 11-11, 11-12, 11-13, 11-21, 11-22, 11-23, 11-31, 11-32, 11-33, $\mathbf{11}_1$, $\mathbf{11}_2$, $\mathbf{11}_N$, 11*a*, 11*b*, 11*c*, 11*d*, 11*e*, 11*f* FIRST PROCESSOR
12, 12*a*, 12*b*, 12*c*, 12*d*, 12*e*, 12*f* SECOND PROCESSOR
14, 15 COMMUNICATION UNIT
16*a*, 16*b* SUBSTRATE
20, 1000 NETWORK CONTROLLER
30 APPLICATION EXECUTION UNIT
50 DNN
51, 51-1, 51-2, 51-3, 51-11, 51-12, 51-13, 51-21, 51-22, 51-23, 51-31, 51-32, 51-33, 51-31', 51-32', 51-33', 51*b*, 51*c* FIRST DNN
52, 52-1, 52-2, 52-3, 52*a*, 52*b*, 52*c*, 52*d*, 52*e*, 52*f*, 52*g*, 52*h*, 521 SECOND DNN
72 RELEARNING UNIT
80, 83 PARALLEL TRANSFER SIGNAL LINE
81, 82, 84 HIGH-SPEED SERIAL TRANSFER SIGNAL LINE
100, 100*a* IMAGING DEVICE
111 IMAGING UNIT
121 CPU
122 DSP
123, 605 MEMORY
140, 140*a*, 140*b*, 140*c* HOST UNIT
141 MCU
142 MPU
143 ACCL
150 IMAGING DEVICE
200 ANALYSIS UNIT
201 DIVISION UNIT
202 TRANSMISSION UNIT
203 LEARNING UNIT
220 OPTIMIZATION UNIT
221 DEVICE SETTING DATABASE
222 COMPATIBILITY TEST PROCESSING UNIT
223, 1012 PACKAGER
224 DNN EXECUTION UNIT
225 CIS CONVERTER
226 HOST DNN CONVERTER
300*a*, 300*b*, 400 INFORMATION PROCESSING APPARATUS
310 CLOUD NETWORK
600 INPUT UNIT
601, 621 ARITHMETIC CIRCUIT UNIT
602, 622 OUTPUT UNIT
603 FIRST MEMORY
604 SECOND MEMORY
610*a*, 610*b* FIRST ARITHMETIC PROCESSING UNIT
630*a*, 630*b* SECOND ARITHMETIC PROCESSING UNIT
1100, 1100*a*, 1100*b*, 1100*c* SMART CAMERA
1110 DNN PROCESSOR

The invention claimed is:

1. An information processing apparatus comprising:

a controller configured to:

divide a neural network into a first neural network part and a second neural network part;

assign the first neural network part to a first processor of a plurality of processors, and assign the second neural network part to a second processor of the plurality of processors different from the first processor, wherein an input to the first processor is an output of a sensor, an input to the second processor is an output of the first processor, and an output of the second processor is an input to an information processor, wherein the controller assigns the first neural network part to the first processor based on first predetermined criteria, wherein the controller assigns the second neural network part to the second processor based on second predetermined criteria, and wherein the second predetermined criteria includes the output of the first processor.

2. The information processing apparatus according to claim 1, wherein the controller adaptively selects the second neural network part according to the output of the first processor.

3. The information processing apparatus according to claim 1, wherein the controller determines the first and second neural network parts according to required performance that is performance required for execution of processing by at least one of the first and second neural network parts.

4. The information processing apparatus according to claim 3, wherein the required performance is a required performance for a hardware element and a required performance for an application element, the application element being required for output data by an application that executes processing on the output data.

5. The information processing apparatus according to claim 4, wherein the hardware element includes capability and constraint of at least one of the first processor, the second processor, and the sensor, and the application element includes at least one of a rate of the output data, a transmission size, and a processing cost in the application.

6. The information processing apparatus according to claim 3, wherein the controller determines the first neural network part and the second neural network part based on the required performance and a key performance indicator for a predetermined neural network.

7. The information processing apparatus according to claim 3, wherein the controller determines the first neural network part and the second neural network part so as to perform a fixed point operation in the first neural network part and a floating point operation in the second neural network part.

8. The information processing apparatus according to claim 3, wherein the controller determines processing by the first neural network part and processing by the second neural network part such that the processing by the second neural network part is executed as a pipeline process on the processing by the first neural network part.

9. The information processing apparatus according to claim 1, wherein the controller updates or changes an operation of the second processor according to a learning result of the second neural network part.

10. The information processing apparatus according to claim 1, wherein the first neural network part is one of a plurality of first neural network parts, and the first processor is one of a plurality of first processors that are connected in series, and the second neural network part is one of a plurality of second neural network parts, and the second processor is one of a plurality of second processors that are connected in series.

11. The information processing apparatus according to claim 10, wherein each of the plurality of first processors performs a unique first processor specific function, and each of the plurality of second processors performs a unique second processor specific function.

12. The information processing apparatus according to claim 11, wherein the controller determines the second neural network part so as to receive an output of each of the plurality of first neural network parts.

13. The information processing apparatus according to claim 1, wherein the controller determines the first neural network part giving priority to speed with respect to processing of the first function, and determines the second neural network part giving priority to at least one of accuracy or a function with respect to processing of the second function.

14. The information processing apparatus according to claim 13, wherein the controller determines the first neural network part and the second neural network part so as to retrain the first neural network part based on a processing result of the second neural network part.

15. The information processing apparatus according to claim 1, wherein the controller determines the first neural network part and the second neural network part so as to reduce data output from the first neural network part and input the reduced data to the second neural network part.

16. An information processing method executed by a computer, the information processing method comprising:

dividing a neural network into a first neural network part and a second neural network part;

assigning the first neural network part to a first processor of a plurality of processors, and assign the second neural network part to a second processor of the plurality of processors different from the first processor, wherein an input to the first processor is an output of a sensor, an input to the second processor is an output of the first processor, and an output of the second processor is an input to an information processor, wherein the first neural network part is assigned to the first processor based on first predetermined criteria, wherein the second neural network part is assigned to the second processor based on second predetermined criteria, and wherein the second predetermined criteria includes the output of the first processor.

17. An information processing program causing a computer to execute a process comprising:

dividing a neural network into a first neural network part and a second neural network part;

assigning the first neural network part to a first processor of a plurality of processors, and assign the second neural network part to a second processor of the plurality of processors different from the first processor, wherein an input to the first processor is an output of a sensor, an input to the second processor is an output of the first processor, and an output of the second processor is an input to an information processor, wherein the first neural network part is assigned to the first processor based on first predetermined criteria, wherein the second neural network part is assigned to the second processor based on second predetermined criteria, and wherein the second predetermined criteria includes the output of the first processor.

18. An information processing system comprising the information processing apparatus according to claim 1;

the first and second processors; and a transmitter configured to transmit the first and second neural network parts to the first and second processors, respectively, wherein the controller selects, from the plurality of neural network parts, the second neural network part according to the output of the first processor.

19. The information processing system according to claim 18, wherein the first and second processors are configured in a same housing.

20. The information processing system according to claim 18, wherein the first and second processors are configured in a first and second housing, respectively.

21. The information processing system according to claim 18, further comprising the sensor.

22. The information processing system according to claim 21, wherein the sensor and the first processor are integrally configured.

23. The information processing system according to claim 18, wherein the first and second processors are connected via a communication network.

24. The information processing system according to claim 18, further comprising the information processor.

* * * * *